(12) United States Patent
Male et al.

(10) Patent No.: US 7,540,765 B2
(45) Date of Patent: Jun. 2, 2009

(54) INTEGRATED DSLAM TO POTS SPLITTER CONNECTOR

(75) Inventors: Leo Male, Shawnee, KS (US); Jim Scheer, Lee's Summit, MO (US); Erik Geldbach, Olathe, KS (US); Keith E. Younger, Overland Park, KS (US); Greg Edmoundson, Lee's Summit, MO (US)

(73) Assignee: Embarq Holdings Company, LLC, Overland Park, KS (US)

( * ) Notice: Subject to any disclaimer, the term of this patent is extended or adjusted under 35 U.S.C. 154(b) by 378 days.

(21) Appl. No.: 11/607,575

(22) Filed: Nov. 30, 2006

(65) Prior Publication Data

US 2008/0132113 A1    Jun. 5, 2008

(51) Int. Cl.
*H01R 11/00* (2006.01)

(52) U.S. Cl. .................... 439/498; 439/505; 370/352; 379/399.01

(58) Field of Classification Search ......... 439/502–506, 439/498; 370/352; 379/399.01
See application file for complete search history.

(56) References Cited

U.S. PATENT DOCUMENTS

| 6,452,923 | B1 * | 9/2002 | Gerszberg et al. | 370/352 |
| 6,510,152 | B1 * | 1/2003 | Gerszberg et al. | 370/352 |
| 6,975,620 | B2 * | 12/2005 | Corvino et al. | 370/352 |
| 7,184,428 | B1 * | 2/2007 | Gerszberg et al. | 370/352 |
| 7,270,551 | B2 * | 9/2007 | Busse et al. | 439/76.1 |
| 7,410,369 | B2 * | 8/2008 | Busse et al. | 439/76.1 |
| 2001/0028644 | A1 * | 10/2001 | Barzegar et al. | 370/352 |
| 2002/0105941 | A1 * | 8/2002 | Corvino et al. | 370/352 |
| 2002/0106075 | A1 * | 8/2002 | Foss et al. | 379/399.01 |
| 2004/0042510 | A1 * | 3/2004 | Bremer et al. | 370/539 |
| 2004/0047310 | A1 * | 3/2004 | Chen et al. | 370/329 |
| 2004/0120508 | A1 * | 6/2004 | Sajadi et al. | 379/399.01 |
| 2005/0147089 | A1 * | 7/2005 | Gerszberg et al. | 370/352 |
| 2005/0245134 | A1 * | 11/2005 | Stiscia | 439/610 |
| 2005/0254484 | A1 * | 11/2005 | Barzegar et al. | 370/352 |
| 2006/0210054 | A1 * | 9/2006 | Stiscia | 379/399.01 |

* cited by examiner

*Primary Examiner*—Gary F. Paumen
(74) *Attorney, Agent, or Firm*—Sonnenschein Nath & Rosenthal LLP

(57) ABSTRACT

The present integrated DSLAM to POTS splitter connector comprises a first set of wires each having a first end terminating in a first 50-pin connector for connecting to the DSLAM and second end terminating in a 64-pin connector for connecting to a first POTS splitter, one of the wires terminates in a first DPM; a second set of wires each having a first end terminating in a second 50-pin connector for connecting to the DSLAM, a second end terminating in a 64-pin connector for connecting to a second POTS splitter, one of the wires terminates in the first DPM and another in a second DPM; and a third set of wires each having a first end terminating in a third 50-pin connector for connecting to the DSLAM, a second end terminating in a 64-pin connector for connecting to a third POTS splitter, one of the wires terminates in second DPM.

10 Claims, 58 Drawing Sheets

Figure 3

| Connector | Pins | Cable | Color | Pins | Color | Circuit | Slot Number | Port | Connector | Cable | Pins | Color | Pins | Color | Circuit |
|---|---|---|---|---|---|---|---|---|---|---|---|---|---|---|---|
| Port-1 1-24 | 1 | A | Blue/White | 26 | White/Blue | 1 | 1 | 1 | 1 | A | 1 | Blue/White | 33 | White/Blue | 1 |
| Port-1 1-24 | 2 | A | Orange/White | 27 | White/Orange | 2 | 1 | 2 | 2 | B | 1 | Slate/White | 33 | White/Slate | 2 |
| Port-1 1-24 | 3 | A | Green/White | 28 | White/Green | 3 | 1 | 3 | 3 | C | 1 | Brown/Red | 33 | Red/Brown | 3 |
| Port-1 1-24 | 4 | A | Brown/White | 29 | White/Brown | 4 | 1 | 4 | 4 | D | 1 | Green/Black | 33 | Black/Green | 4 |
| Port-1 1-24 | 5 | A | Slate/White | 30 | White/Slate | 5 | 1 | 5 | 5 | E | 1 | Orange/Yellow | 33 | Yellow/Orange | 5 |
| Port-1 1-24 | 6 | A | Blue/Red | 31 | Red/Blue | 6 | 1 | 6 | 6 | F | 1 | Blue/Violet | 33 | Violet/Blue | 6 |
| Port-1 1-24 | 7 | A | Orange/Red | 32 | Red/Orange | 7 | 1 | 7 | 7 | H | 1 | Blue/White | 33 | White/Blue | 7 |
| Port-1 1-24 | 8 | A | Green/Red | 33 | Red/Green | 8 | 1 | 8 | 8 | – | 1 | Slate/White | 33 | White/Slate | 8 |
| Port-1 1-24 | 9 | A | Brown/Red | 34 | Red/Brown | 9 | 2 | 1 | 1 | A | 2 | Orange/White | 34 | White/Orange | 9 |
| Port-1 1-24 | 10 | A | Slate/Red | 35 | Red/Slate | 10 | 2 | 2 | 2 | B | 2 | Blue/Red | 34 | Red/Blue | 10 |
| Port-1 1-24 | 11 | A | Blue/Black | 36 | Black/Blue | 11 | 2 | 3 | 3 | C | 2 | Slate/Red | 34 | Red/Slate | 11 |
| Port-1 1-24 | 12 | A | Orange/Black | 37 | Black/Orange | 12 | 2 | 4 | 4 | D | 2 | Brown/Black | 34 | Black/Brown | 12 |
| Port-1 1-24 | 13 | A | Green/Black | 38 | Black/Green | 13 | 2 | 5 | 5 | E | 2 | Green/Yellow | 34 | Yellow/Green | 13 |
| Port-1 1-24 | 14 | A | Brown/Black | 39 | Black/Brown | 14 | 2 | 6 | 6 | F | 2 | Orange/Violet | 34 | Violet/Orange | 14 |
| Port-1 1-24 | 15 | A | Slate/Black | 40 | Black/Slate | 15 | 2 | 7 | 7 | H | 2 | Orange/White | 34 | White/Orange | 15 |
| Port-1 1-24 | 16 | A | Blue/Yellow | 41 | Yellow/Blue | 16 | 2 | 8 | 8 | – | 2 | Blue/Red | 34 | Red/Blue | 16 |
| Port-1 1-24 | 17 | A | Orange/Yellow | 42 | Yellow/Orange | 17 | 3 | 1 | 1 | A | 3 | Green/White | 35 | White/Green | 17 |
| Port-1 1-24 | 18 | A | Green/Yellow | 43 | Yellow/Green | 18 | 3 | 2 | 2 | B | 3 | Orange/Red | 35 | Red/Orange | 18 |
| Port-1 1-24 | 19 | A | Brown/Yellow | 44 | Yellow/Brown | 19 | 3 | 3 | 3 | C | 3 | Blue/Black | 35 | Black/Blue | 19 |
| Port-1 1-24 | 20 | A | Slate/Yellow | 45 | Yellow/Slate | 20 | 3 | 4 | 4 | D | 3 | Slate/Black | 35 | Black/Slate | 20 |
| Port-1 1-24 | 21 | A | Blue/Violet | 46 | Violet/Blue | 21 | 3 | 5 | 5 | E | 3 | Brown/Yellow | 35 | Yellow/Brown | 21 |
| Port-1 1-24 | 22 | A | Orange/Violet | 47 | Violet/Orange | 22 | 3 | 6 | 6 | F | 3 | Green/Violet | 35 | Violet/Green | 22 |
| Port-1 1-24 | 23 | A | Green/Violet | 48 | Violet/Green | 23 | 3 | 7 | 7 | H | 3 | Green/White | 35 | White/Green | 23 |
| Port-1 1-24 | 24 | A | Brown/Violet | 49 | Violet/Brown | 24 | 3 | 8 | 8 | – | 3 | Orange/Red | 35 | Red/Orange | 24 |

104, 112, 120 (left section); 106, 114, 122 (right section)

| | | | | | | | | | | | | | | |
|---|---|---|---|---|---|---|---|---|---|---|---|---|---|---|
| Port-1 25-48 | 1 | B | Blue/White | 26 | White/Blue | 25 | 4 | 1 | 1 | A | 4 | Brown/White | 36 | White/Brown | 25 |
| Port-1 25-48 | 2 | B | Orange/White | 27 | White/Orange | 26 | 4 | 2 | 2 | B | 4 | Green/Red | 36 | Red/Green | 26 |
| Port-1 25-48 | 3 | B | Green/White | 28 | White/Green | 27 | 4 | 3 | 3 | C | 4 | Orange/Black | 36 | Black/Orange | 27 |
| Port-1 25-48 | 4 | B | Brown/White | 29 | White/Brown | 28 | 4 | 4 | 4 | D | 4 | Blue/Yellow | 36 | Yellow/Blue | 28 |
| Port-1 25-48 | 5 | B | Slate/White | 30 | White/Slate | 29 | 4 | 5 | 5 | E | 4 | Slate/Yellow | 36 | Yellow/Slate | 29 |
| Port-1 25-48 | 6 | B | Blue/Red | 31 | Red/Blue | 30 | 4 | 6 | 6 | F | 4 | Brown/Violet | 36 | Violet/Brown | 30 |
| Port-1 25-48 | 7 | B | Orange/Red | 32 | Red/Orange | 31 | 4 | 7 | 7 | H | 4 | Brown/White | 36 | White/Brown | 31 |
| Port-1 25-48 | 8 | B | Green/Red | 33 | Red/Green | 32 | 4 | 8 | 8 | – | 4 | Green/Red | 36 | Red/Green | 32 |
| Port-1 25-48 | 9 | B | Brown/Red | 34 | Red/Brown | 33 | 5 | 1 | 1 | A | 5 | Slate/White | 37 | White/Slate | 33 |
| Port-1 25-48 | 10 | B | Slate/Red | 35 | Red/Slate | 34 | 5 | 2 | 2 | B | 5 | Brown/Red | 37 | Red/Brown | 34 |
| Port-1 25-48 | 11 | B | Blue/Black | 36 | Black/Blue | 35 | 5 | 3 | 3 | C | 5 | Green/Black | 37 | Black/Green | 35 |
| Port-1 25-48 | 12 | B | Orange/Black | 37 | Black/Orange | 36 | 5 | 4 | 4 | D | 5 | Orange/Yellow | 37 | Yellow/Orange | 36 |
| Port-1 25-48 | 13 | B | Green/Black | 38 | Black/Green | 37 | 5 | 5 | 5 | E | 5 | Blue/Violet | 37 | Violet/Blue | 37 |
| Port-1 25-48 | 14 | B | Brown/Black | 39 | Black/Brown | 38 | 5 | 6 | 6 | G | 5 | Blue/White | 37 | White/Blue | 38 |
| Port-1 25-48 | 15 | B | Slate/Black | 40 | Black/Slate | 39 | 5 | 7 | 7 | H | 5 | Slate/White | 37 | White/Slate | 39 |
| Port-1 25-48 | 16 | B | Blue/Yellow | 41 | Yellow/Blue | 40 | 5 | 8 | 8 | – | 5 | Brown/Red | 37 | Red/Brown | 40 |
| Port-1 25-48 | 17 | B | Orange/Yellow | 42 | Yellow/Orange | 41 | 6 | 1 | 1 | A | 6 | Blue/Red | 38 | Red/Blue | 41 |
| Port-1 25-48 | 18 | B | Green/Yellow | 43 | Yellow/Green | 42 | 6 | 2 | 2 | B | 6 | Slate/Red | 38 | Red/Slate | 42 |
| Port-1 25-48 | 19 | B | Brown/Yellow | 44 | Yellow/Brown | 43 | 6 | 3 | 3 | C | 6 | Brown/Black | 38 | Black/Brown | 43 |
| Port-1 25-48 | 20 | B | Slate/Yellow | 45 | Yellow/Slate | 44 | 6 | 4 | 4 | D | 6 | Green/Yellow | 38 | Yellow/Green | 44 |
| Port-1 25-48 | 21 | B | Blue/Violet | 46 | Violet/Blue | 45 | 6 | 5 | 5 | E | 6 | Orange/Violet | 38 | Violet/Orange | 45 |
| Port-1 25-48 | 22 | B | Orange/Violet | 47 | Violet/Orange | 46 | 6 | 6 | 6 | G | 6 | Orange/White | 38 | White/Orange | 46 |
| Port-1 25-48 | 23 | B | Green/Violet | 48 | Violet/Green | 47 | 6 | 7 | 7 | H | 6 | Blue/Red | 38 | Red/Blue | 47 |
| Port-1 25-48 | 24 | B | Brown/Violet | 49 | Violet/Brown | 48 | 6 | 8 | 8 | – | 6 | Slate/Red | 38 | Red/Slate | 48 |

| | | | | |
|---|---|---|---|---|
| Port-2 1-24 | 1 | C | Blue/White | 26 |
| Port-2 1-24 | 2 | C | Orange/White | 27 |
| Port-2 1-24 | 3 | C | Green/White | 28 |
| Port-2 1-24 | 4 | C | Brown/White | 29 |
| Port-2 1-24 | 5 | C | Slate/White | 30 |
| Port-2 1-24 | 6 | C | Blue/Red | 31 |
| Port-2 1-24 | 7 | C | Orange/Red | 32 |
| Port-2 1-24 | 8 | C | Green/Red | 33 |
| Port-2 1-24 | 9 | C | Brown/Red | 34 |
| Port-2 1-24 | 10 | C | Slate/Red | 35 |
| Port-2 1-24 | 11 | C | Blue/Black | 36 |
| Port-2 1-24 | 12 | C | Orange/Black | 37 |
| Port-2 1-24 | 13 | C | Green/Black | 38 |
| Port-2 1-24 | 14 | C | Brown/Black | 39 |
| Port-2 1-24 | 15 | C | Slate/Black | 40 |
| Port-2 1-24 | 16 | C | Blue/Yellow | 41 |
| Port-2 1-24 | 17 | C | Orange/Yellow | 42 |
| Port-2 1-24 | 18 | C | Green/Yellow | 43 |
| Port-2 1-24 | 19 | C | Brown/Yellow | 44 |
| Port-2 1-24 | 20 | C | Slate/Yellow | 45 |
| Port-2 1-24 | 21 | C | Blue/Violet | 46 |
| Port-2 1-24 | 22 | C | Orange/Violet | 47 |
| Port-2 1-24 | 23 | C | Green/Violet | 48 |
| Port-2 1-24 | 24 | C | Brown/Violet | 49 |

| | | | | | | |
|---|---|---|---|---|---|---|
| White/Blue | 49 | 7 | 1 | 1 | A | 7 |
| White/Orange | 50 | 7 | 2 | 2 | B | 7 |
| White/Green | 51 | 7 | 3 | 3 | C | 7 |
| White/Brown | 52 | 7 | 4 | 4 | D | 7 |
| White/Slate | 53 | 7 | 5 | 5 | E | 7 |
| Red/Blue | 54 | 7 | 6 | 6 | G | 7 |
| Red/Orange | 55 | 7 | 7 | 7 | H | 7 |
| Red/Green | 56 | 7 | 8 | 8 | – | 7 |
| Red/Brown | 57 | 8 | 1 | 1 | A | 8 |
| Red/Slate | 58 | 8 | 2 | 2 | B | 8 |
| Black/Blue | 59 | 8 | 3 | 3 | C | 8 |
| Black/Orange | 60 | 8 | 4 | 4 | D | 8 |
| Black/Green | 61 | 8 | 5 | 5 | E | 8 |
| Black/Brown | 62 | 8 | 6 | 6 | G | 8 |
| Black/Slate | 63 | 8 | 7 | 7 | H | 8 |
| Yellow/Blue | 64 | 8 | 8 | 8 | – | 8 |
| Yellow/Orange | 65 | 9 | 1 | 1 | A | 9 |
| Yellow/Green | 66 | 9 | 2 | 2 | B | 9 |
| Yellow/Brown | 67 | 9 | 3 | 3 | C | 9 |
| Yellow/Slate | 68 | 9 | 4 | 4 | D | 9 |
| Violet/Blue | 69 | 9 | 5 | 5 | F | 9 |
| Violet/Orange | 70 | 9 | 6 | 6 | G | 9 |
| Violet/Green | 71 | 9 | 7 | 7 | H | 9 |
| Violet/Brown | 72 | 9 | 8 | 8 | – | 9 |

106, 114, 122:

| | | |
|---|---|---|
| Orange/Red | 39 | Red/Orange | 49 |
| Blue/Black | 39 | Black/Blue | 50 |
| Slate/Black | 39 | Black/Slate | 51 |
| Brown/Yellow | 39 | Yellow/Brown | 52 |
| Green/Violet | 39 | Violet/Green | 53 |
| Green/White | 39 | White/Green | 54 |
| Orange/Red | 39 | Red/Orange | 55 |
| Blue/Black | 39 | Black/Blue | 56 |
| Green/Red | 40 | Red/Green | 57 |
| Orange/Black | 40 | Black/Orange | 58 |
| Blue/Yellow | 40 | Yellow/Blue | 59 |
| Slate/Yellow | 40 | Yellow/Slate | 60 |
| Brown/Violet | 40 | Violet/Brown | 61 |
| Brown/White | 40 | White/Brown | 62 |
| Green/Red | 40 | Red/Green | 63 |
| Orange/Black | 40 | Black/Orange | 64 |
| Brown/Red | 41 | Red/Brown | 65 |
| Green/Black | 41 | Black/Green | 66 |
| Orange/Yellow | 41 | Yellow/Orange | 67 |
| Blue/Violet | 41 | Violet/Blue | 68 |
| Blue/White | 41 | White/Blue | 69 |
| Slate/White | 41 | White/Slate | 70 |
| Brown/Red | 41 | Red/Brown | 71 |
| Green/Black | 41 | Black/Green | 72 |

Table 104, 112, 120:

| | | | | | |
|---|---|---|---|---|---|
| Port-2 25-48 | 1 | D | Blue/White | 26 | White/Blue | 73 |
| Port-2 25-48 | 2 | D | Orange/White | 27 | White/Orange | 74 |
| Port-2 25-48 | 3 | D | Green/White | 28 | White/Green | 75 |
| Port-2 25-48 | 4 | D | Brown/White | 29 | White/Brown | 76 |
| Port-2 25-48 | 5 | D | Slate/White | 30 | White/Slate | 77 |
| Port-2 25-48 | 6 | D | Blue/Red | 31 | Red/Blue | 78 |
| Port-2 25-48 | 7 | D | Orange/Red | 32 | Red/Orange | 79 |
| Port-2 25-48 | 8 | D | Green/Red | 33 | Red/Green | 80 |
| Port-2 25-48 | 9 | D | Brown/Red | 34 | Red/Brown | 81 |
| Port-2 25-48 | 10 | D | Slate/Red | 35 | Red/Slate | 82 |
| Port-2 25-48 | 11 | D | Blue/Black | 36 | Black/Blue | 83 |
| Port-2 25-48 | 12 | D | Orange/Black | 37 | Black/Orange | 84 |
| Port-2 25-48 | 13 | D | Green/Black | 38 | Black/Green | 85 |
| Port-2 25-48 | 14 | D | Brown/Black | 39 | Black/Brown | 86 |
| Port-2 25-48 | 15 | D | Slate/Black | 40 | Black/Slate | 87 |
| Port-2 25-48 | 16 | D | Blue/Yellow | 41 | Yellow/Blue | 88 |
| Port-2 25-48 | 17 | D | Orange/Yellow | 42 | Yellow/Orange | 89 |
| Port-2 25-48 | 18 | D | Green/Yellow | 43 | Yellow/Green | 90 |
| Port-2 25-48 | 19 | D | Brown/Yellow | 44 | Yellow/Brown | 91 |
| Port-2 25-48 | 20 | D | Slate/Yellow | 45 | Yellow/Slate | 92 |
| Port-2 25-48 | 21 | D | Blue/Violet | 46 | Violet/Blue | 93 |
| Port-2 25-48 | 22 | D | Orange/Violet | 47 | Violet/Orange | 94 |
| Port-2 25-48 | 23 | D | Green/Violet | 48 | Violet/Green | 95 |
| Port-2 25-48 | 24 | D | Brown/Violet | 49 | Violet/Brown | 96 |

Table 106, 114, 122:

| | | | | | | | |
|---|---|---|---|---|---|---|---|
| 10 | 1 | A | 10 | Slate/Red | 42 | Red/Slate | 73 |
| 10 | 2 | B | 10 | Brown/Black | 42 | Black/Brown | 74 |
| 10 | 3 | C | 10 | Green/Yellow | 42 | Yellow/Green | 75 |
| 10 | 4 | D | 10 | Orange/Violet | 42 | Violet/Orange | 76 |
| 10 | 5 | F | 10 | Orange/White | 42 | White/Orange | 77 |
| 10 | 6 | G | 10 | Blue/Red | 42 | Red/Blue | 78 |
| 10 | 7 | H | 10 | Slate/Red | 42 | Red/Slate | 79 |
| 10 | 8 | I | 10 | Brown/Black | 42 | Black/Brown | 80 |
| 11 | 1 | A | 11 | Blue/Black | 43 | Black/Blue | 81 |
| 11 | 2 | B | 11 | Slate/Black | 43 | Black/Slate | 82 |
| 11 | 3 | C | 11 | Brown/Yellow | 43 | Yellow/Brown | 83 |
| 11 | 4 | D | 11 | Green/Violet | 43 | Violet/Green | 84 |
| 11 | 5 | F | 11 | Green/White | 43 | White/Green | 85 |
| 11 | 6 | G | 11 | Orange/Red | 43 | Red/Orange | 86 |
| 11 | 7 | H | 11 | Blue/Black | 43 | Black/Blue | 87 |
| 11 | 8 | I | 11 | Slate/Black | 43 | Black/Slate | 88 |
| 12 | 1 | A | 12 | Orange/Black | 44 | Black/Orange | 89 |
| 12 | 2 | B | 12 | Blue/Yellow | 44 | Yellow/Blue | 90 |
| 12 | 3 | C | 12 | Slate/Yellow | 44 | Yellow/Slate | 91 |
| 12 | 4 | D | 12 | Brown/Violet | 44 | Violet/Brown | 92 |
| 12 | 5 | F | 12 | Brown/White | 44 | White/Brown | 93 |
| 12 | 6 | G | 12 | Green/Red | 44 | Red/Green | 94 |
| 12 | 7 | H | 12 | Orange/Black | 44 | Black/Orange | 95 |
| 12 | 8 | I | 12 | Blue/Yellow | 44 | Yellow/Blue | 96 |

Figure 3 (cont.)

| Port | # | E | Color | # | Color 2 | # |
|---|---|---|---|---|---|---|
| Port-3 1-24 | 1 | E | Blue/White | 26 | White/Blue | 97 |
| Port-3 1-24 | 2 | E | Orange/White | 27 | White/Orange | 98 |
| Port-3 1-24 | 3 | E | Green/White | 28 | White/Green | 99 |
| Port-3 1-24 | 4 | E | Brown/White | 29 | White/Brown | 100 |
| Port-3 1-24 | 5 | E | Slate/White | 30 | White/Slate | 101 |
| Port-3 1-24 | 6 | E | Blue/Red | 31 | Red/Blue | 102 |
| Port-3 1-24 | 7 | E | Orange/Red | 32 | Red/Orange | 103 |
| Port-3 1-24 | 8 | E | Green/Red | 33 | Red/Green | 104 |
| Port-3 1-24 | 9 | E | Brown/Red | 34 | Red/Brown | 105 |
| Port-3 1-24 | 10 | E | Slate/Red | 35 | Red/Slate | 106 |
| Port-3 1-24 | 11 | E | Blue/Black | 36 | Black/Blue | 107 |
| Port-3 1-24 | 12 | E | Orange/Black | 37 | Black/Orange | 108 |
| Port-3 1-24 | 13 | E | Green/Black | 38 | Black/Green | 109 |
| Port-3 1-24 | 14 | E | Brown/Black | 39 | Black/Brown | 110 |
| Port-3 1-24 | 15 | E | Slate/Black | 40 | Black/Slate | 111 |
| Port-3 1-24 | 16 | E | Blue/Yellow | 41 | Yellow/Blue | 112 |
| Port-3 1-24 | 17 | E | Orange/Yellow | 42 | Yellow/Orange | 113 |
| Port-3 1-24 | 18 | E | Green/Yellow | 43 | Yellow/Green | 114 |
| Port-3 1-24 | 19 | E | Brown/Yellow | 44 | Yellow/Brown | 115 |
| Port-3 1-24 | 20 | E | Slate/Yellow | 45 | Yellow/Slate | 116 |
| Port-3 1-24 | 21 | E | Blue/Violet | 46 | Violet/Blue | 117 |
| Port-3 1-24 | 22 | E | Orange/Violet | 47 | Violet/Orange | 118 |
| Port-3 1-24 | 23 | E | Green/Violet | 48 | Violet/Green | 119 |
| Port-3 1-24 | 24 | E | Brown/Violet | 49 | Violet/Brown | 120 |

104, 112, 120

| # | # | # | L | # | Color | # | Color 2 | # |
|---|---|---|---|---|---|---|---|---|
| 13 | 1 | 1 | A | 13 | Green/Black | 45 | Black/Green | 97 |
| 13 | 2 | 2 | B | 13 | Orange/Yellow | 45 | Yellow/Orange | 98 |
| 13 | 3 | 3 | C | 13 | Blue/Violet | 45 | Violet/Blue | 99 |
| 13 | 4 | 4 | E | 13 | Blue/White | 45 | White/Blue | 100 |
| 13 | 5 | 5 | F | 13 | Slate/White | 45 | White/Slate | 101 |
| 13 | 6 | 6 | G | 13 | Brown/Red | 45 | Red/Brown | 102 |
| 13 | 7 | 7 | H | 13 | Green/Black | 45 | Black/Green | 103 |
| 13 | 8 | 8 | I | 13 | Orange/Yellow | 45 | Yellow/Orange | 104 |
| 14 | 1 | 1 | A | 14 | Brown/Black | 46 | Black/Brown | 105 |
| 14 | 2 | 2 | B | 14 | Green/Yellow | 46 | Yellow/Green | 106 |
| 14 | 3 | 3 | C | 14 | Orange/Violet | 46 | Violet/Orange | 107 |
| 14 | 4 | 4 | E | 14 | Orange/White | 46 | White/Orange | 108 |
| 14 | 5 | 5 | F | 14 | Blue/Red | 46 | Red/Blue | 109 |
| 14 | 6 | 6 | G | 14 | Slate/Red | 46 | Red/Slate | 110 |
| 14 | 7 | 7 | H | 14 | Brown/Black | 46 | Black/Brown | 111 |
| 14 | 8 | 8 | I | 14 | Green/Yellow | 46 | Yellow/Green | 112 |
| 15 | 1 | 1 | A | 15 | Slate/Black | 47 | Black/Slate | 113 |
| 15 | 2 | 2 | B | 15 | Brown/Yellow | 47 | Yellow/Brown | 114 |
| 15 | 3 | 3 | C | 15 | Green/Violet | 47 | Violet/Green | 115 |
| 15 | 4 | 4 | E | 15 | Green/White | 47 | White/Green | 116 |
| 15 | 5 | 5 | F | 15 | Orange/Red | 47 | Red/Orange | 117 |
| 15 | 6 | 6 | G | 15 | Blue/Black | 47 | Black/Blue | 118 |
| 15 | 7 | 7 | H | 15 | Slate/Black | 47 | Black/Slate | 119 |
| 15 | 8 | 8 | I | 15 | Brown/Yellow | 47 | Yellow/Brown | 120 |

| | | | | | | |
|---|---|---|---|---|---|---|
| Port-3 25-48 | 1 | F | 26 | Blue/White | 121 | White/Blue |
| Port-3 25-48 | 2 | F | 27 | Orange/White | 122 | White/Orange |
| Port-3 25-48 | 3 | F | 28 | Green/White | 123 | White/Green |
| Port-3 25-48 | 4 | F | 29 | Brown/White | 124 | White/Brown |
| Port-3 25-48 | 5 | F | 30 | Slate/White | 125 | White/Slate |
| Port-3 25-48 | 6 | F | 31 | Blue/Red | 126 | Red/Blue |
| Port-3 25-48 | 7 | F | 32 | Orange/Red | 127 | Red/Orange |
| Port-3 25-48 | 8 | F | 33 | Green/Red | 128 | Red/Green |
| Port-3 25-48 | 9 | F | 34 | Brown/Red | 129 | Red/Brown |
| Port-3 25-48 | 10 | F | 35 | Slate/Red | 130 | Red/Slate |
| Port-3 25-48 | 11 | F | 36 | Blue/Black | 131 | Black/Blue |
| Port-3 25-48 | 12 | F | 37 | Orange/Black | 132 | Black/Orange |
| Port-3 25-48 | 13 | F | 38 | Green/Black | 133 | Black/Green |
| Port-3 25-48 | 14 | F | 39 | Brown/Black | 134 | Black/Brown |
| Port-3 25-48 | 15 | F | 40 | Slate/Black | 135 | Black/Slate |
| Port-3 25-48 | 16 | F | 41 | Blue/Yellow | 136 | Yellow/Blue |
| Port-3 25-48 | 17 | F | 42 | Orange/Yellow | 137 | Yellow/Orange |
| Port-3 25-48 | 18 | F | 43 | Green/Yellow | 138 | Yellow/Green |
| Port-3 25-48 | 19 | F | 44 | Brown/Yellow | 139 | Yellow/Brown |
| Port-3 25-48 | 20 | F | 45 | Slate/Yellow | 140 | Yellow/Slate |
| Port-3 25-48 | 21 | F | 46 | Blue/Violet | 141 | Violet/Blue |
| Port-3 25-48 | 22 | F | 47 | Orange/Violet | 142 | Violet/Orange |
| Port-3 25-48 | 23 | F | 48 | Green/Violet | 143 | Violet/Green |
| Port-3 25-48 | 24 | F | 49 | Brown/Violet | 144 | Violet/Brown |

106, 114, 122

| | | | | | | | | |
|---|---|---|---|---|---|---|---|---|
| 16 | 1 | 1 | A | 16 | Blue/Yellow | 48 | Yellow/Blue | 121 |
| 16 | 2 | 2 | B | 16 | Slate/Yellow | 48 | Yellow/Slate | 122 |
| 16 | 3 | 3 | C | 16 | Brown/Violet | 48 | Violet/Brown | 123 |
| 16 | 4 | 4 | E | 16 | Brown/White | 48 | White/Brown | 124 |
| 16 | 5 | 5 | F | 16 | Green/Red | 48 | Red/Green | 125 |
| 16 | 6 | 6 | G | 16 | Orange/Black | 48 | Black/Orange | 126 |
| 16 | 7 | 7 | H | 16 | Blue/Yellow | 48 | Yellow/Blue | 127 |
| 16 | 8 | 8 | I | 16 | Slate/Yellow | 48 | Yellow/Slate | 128 |
| 17 | 1 | 1 | A | 17 | Orange/Yellow | 49 | Yellow/Orange | 129 |
| 17 | 2 | 2 | B | 17 | Blue/Violet | 49 | Violet/Blue | 130 |
| 17 | 3 | 3 | D | 17 | Blue/White | 49 | White/Blue | 131 |
| 17 | 4 | 4 | E | 17 | Slate/White | 49 | White/Slate | 132 |
| 17 | 5 | 5 | F | 17 | Brown/Red | 49 | Red/Brown | 133 |
| 17 | 6 | 6 | G | 17 | Green/Black | 49 | Black/Green | 134 |
| 17 | 7 | 7 | H | 17 | Orange/Yellow | 49 | Yellow/Orange | 135 |
| 17 | 8 | 8 | I | 17 | Blue/Violet | 49 | Violet/Blue | 136 |
| 18 | 1 | 1 | A | 18 | Green/Yellow | 50 | Yellow/Green | 137 |
| 18 | 2 | 2 | B | 18 | Orange/Violet | 50 | Violet/Orange | 138 |
| 18 | 3 | 3 | D | 18 | Orange/White | 50 | White/Orange | 139 |
| 18 | 4 | 4 | E | 18 | Blue/Red | 50 | Red/Blue | 140 |
| 18 | 5 | 5 | F | 18 | Slate/Red | 50 | Red/Slate | 141 |
| 18 | 6 | 6 | G | 18 | Brown/Black | 50 | Black/Brown | 142 |
| 18 | 7 | 7 | H | 18 | Green/Yellow | 50 | Yellow/Green | 143 |
| 18 | 8 | 8 | I | 18 | Orange/Violet | 50 | Violet/Orange | 144 |

Figure 3 (cont.)

| | | | | | | | | | | | |
|---|---|---|---|---|---|---|---|---|---|---|---|
| Port-4 1-24 | 1 | G | Blue/White | 26 | White/Blue | 145 | | | 19 | 19 | 1 | 1 | A | 19 | Brown/Yellow | 51 | Yellow/Brown | 145 |
| Port-4 1-24 | 2 | G | Orange/White | 27 | White/Orange | 146 | | | 19 | 19 | 2 | 2 | B | 19 | Green/Violet | 51 | Violet/Green | 146 |
| Port-4 1-24 | 3 | G | Green/White | 28 | White/Green | 147 | | | 19 | 19 | 3 | 3 | D | 19 | Green/White | 51 | White/Green | 147 |
| Port-4 1-24 | 4 | G | Brown/White | 29 | White/Brown | 148 | | | 19 | 19 | 4 | 4 | E | 19 | Orange/Red | 51 | Red/Orange | 148 |
| Port-4 1-24 | 5 | G | Slate/White | 30 | White/Slate | 149 | | | 19 | 19 | 5 | 5 | F | 19 | Blue/Black | 51 | Black/Blue | 149 |
| Port-4 1-24 | 6 | G | Blue/Red | 31 | Red/Blue | 150 | | | 19 | 19 | 6 | 6 | G | 19 | Slate/Black | 51 | Black/Slate | 150 |
| Port-4 1-24 | 7 | G | Orange/Red | 32 | Red/Orange | 151 | | | 19 | 19 | 7 | 7 | H | 19 | Brown/Yellow | 51 | Yellow/Brown | 151 |
| Port-4 1-24 | 8 | G | Green/Red | 33 | Red/Green | 152 | | | 19 | 19 | 8 | 8 | I | 19 | Green/Violet | 51 | Violet/Green | 152 |
| Port-4 1-24 | 9 | G | Brown/Red | 34 | Red/Brown | 153 | | | 20 | 20 | 1 | 1 | A | 20 | Slate/Yellow | 52 | Yellow/Slate | 153 |
| Port-4 1-24 | 10 | G | Slate/Red | 35 | Red/Slate | 154 | | | 20 | 20 | 2 | 2 | B | 20 | Brown/Violet | 52 | Violet/Brown | 154 |
| Port-4 1-24 | 11 | G | Blue/Black | 36 | Black/Blue | 155 | | | 20 | 20 | 3 | 3 | D | 20 | Brown/White | 52 | White/Brown | 155 |
| Port-4 1-24 | 12 | G | Orange/Black | 37 | Black/Orange | 156 | | | 20 | 20 | 4 | 4 | E | 20 | Green/Red | 52 | Red/Green | 156 |
| Port-4 1-24 | 13 | G | Green/Black | 38 | Black/Green | 157 | | | 20 | 20 | 5 | 5 | F | 20 | Orange/Black | 52 | Black/Orange | 157 |
| Port-4 1-24 | 14 | G | Brown/Black | 39 | Black/Brown | 158 | | | 20 | 20 | 6 | 6 | G | 20 | Blue/Yellow | 52 | Yellow/Blue | 158 |
| Port-4 1-24 | 15 | G | Slate/Black | 40 | Black/Slate | 159 | | | 20 | 20 | 7 | 7 | H | 20 | Slate/Yellow | 52 | Yellow/Slate | 159 |
| Port-4 1-24 | 16 | G | Blue/Yellow | 41 | Yellow/Blue | 160 | | | 20 | 20 | 8 | 8 | I | 20 | Brown/Violet | 52 | Violet/Brown | 160 |
| Port-4 1-24 | 17 | G | Orange/Yellow | 42 | Yellow/Orange | 161 | | | 21 | 21 | 1 | 1 | A | 21 | Blue/Violet | 53 | Violet/Blue | 161 |
| Port-4 1-24 | 18 | G | Green/Yellow | 43 | Yellow/Green | 162 | | | 21 | 21 | 2 | 2 | C | 21 | Blue/White | 53 | White/Blue | 162 |
| Port-4 1-24 | 19 | G | Brown/Yellow | 44 | Yellow/Brown | 163 | | | 21 | 21 | 3 | 3 | D | 21 | Slate/White | 53 | White/Slate | 163 |
| Port-4 1-24 | 20 | G | Slate/Yellow | 45 | Yellow/Slate | 164 | | | 21 | 21 | 4 | 4 | E | 21 | Brown/Red | 53 | Red/Brown | 164 |
| Port-4 1-24 | 21 | G | Blue/Violet | 46 | Violet/Blue | 165 | | | 21 | 21 | 5 | 5 | F | 21 | Green/Black | 53 | Black/Green | 165 |
| Port-4 1-24 | 22 | G | Orange/Violet | 47 | Violet/Orange | 166 | | | 21 | 21 | 6 | 6 | G | 21 | Orange/Yellow | 53 | Yellow/Orange | 166 |
| Port-4 1-24 | 23 | G | Green/Violet | 48 | Violet/Green | 167 | | | 21 | 21 | 7 | 7 | H | 21 | Blue/Violet | 53 | Violet/Blue | 167 |
| Port-4 1-24 | 24 | G | Brown/Violet | 49 | Violet/Brown | 168 | | | 21 | 21 | 8 | 8 | J | 21 | Blue/White | 53 | White/Blue | 168 |

| | | | | |
|---|---|---|---|---|
| Port-4 25-48 | 1 | H | Blue/White | 26 | White/Blue | 169 |
| Port-4 25-48 | 2 | H | Orange/White | 27 | White/Orange | 170 |
| Port-4 25-48 | 3 | H | Green/White | 28 | White/Green | 171 |
| Port-4 25-48 | 4 | H | Brown/White | 29 | White/Brown | 172 |
| Port-4 25-48 | 5 | H | Slate/White | 30 | White/Slate | 173 |
| Port-4 25-48 | 6 | H | Blue/Red | 31 | Red/Blue | 174 |
| Port-4 25-48 | 7 | H | Orange/Red | 32 | Red/Orange | 175 |
| Port-4 25-48 | 8 | H | Green/Red | 33 | Red/Green | 176 |
| Port-4 25-48 | 9 | H | Brown/Red | 34 | Red/Brown | 177 |
| Port-4 25-48 | 10 | H | Slate/Red | 35 | Red/Slate | 178 |
| Port-4 25-48 | 11 | H | Blue/Black | 36 | Black/Blue | 179 |
| Port-4 25-48 | 12 | H | Orange/Black | 37 | Black/Orange | 180 |
| Port-4 25-48 | 13 | H | Green/Black | 38 | Black/Green | 181 |
| Port-4 25-48 | 14 | H | Brown/Black | 39 | Black/Brown | 182 |
| Port-4 25-48 | 15 | H | Slate/Black | 40 | Black/Slate | 183 |
| Port-4 25-48 | 16 | H | Blue/Yellow | 41 | Yellow/Blue | 184 |
| Port-4 25-48 | 17 | H | Orange/Yellow | 42 | Yellow/Orange | 185 |
| Port-4 25-48 | 18 | H | Green/Yellow | 43 | Yellow/Green | 186 |
| Port-4 25-48 | 19 | H | Brown/Yellow | 44 | Yellow/Brown | 187 |
| Port-4 25-48 | 20 | H | Slate/Yellow | 45 | Yellow/Slate | 188 |
| Port-4 25-48 | 21 | H | Blue/Violet | 46 | Violet/Blue | 189 |
| Port-4 25-48 | 22 | H | Orange/Violet | 47 | Violet/Orange | 190 |
| Port-4 25-48 | 23 | H | Green/Violet | 48 | Violet/Green | 191 |
| Port-4 25-48 | 24 | H | Brown/Violet | 49 | Violet/Brown | 192 |

106, 114, 122

| | | | | | | | |
|---|---|---|---|---|---|---|---|
| 22 | 1 | 1 | A | 22 | Orange/Violet | 54 | Violet/Orange | 169 |
| 22 | 2 | 2 | C | 22 | Orange/White | 54 | White/Orange | 170 |
| 22 | 3 | 3 | D | 22 | Blue/Red | 54 | Red/Blue | 171 |
| 22 | 4 | 4 | E | 22 | Slate/Red | 54 | Red/Slate | 172 |
| 22 | 5 | 5 | F | 22 | Brown/Black | 54 | Black/Brown | 173 |
| 22 | 6 | 6 | G | 22 | Green/Yellow | 54 | Yellow/Green | 174 |
| 22 | 7 | 7 | H | 22 | Orange/Violet | 54 | Violet/Orange | 175 |
| 22 | 8 | 8 | J | 22 | Orange/White | 54 | White/Orange | 176 |
| 23 | 1 | 1 | A | 23 | Green/Violet | 55 | Violet/Green | 177 |
| 23 | 2 | 2 | C | 23 | Green/White | 55 | White/Green | 178 |
| 23 | 3 | 3 | D | 23 | Orange/Red | 55 | Red/Orange | 179 |
| 23 | 4 | 4 | E | 23 | Blue/Black | 55 | Black/Blue | 180 |
| 23 | 5 | 5 | F | 23 | Slate/Black | 55 | Black/Slate | 181 |
| 23 | 6 | 6 | G | 23 | Brown/Yellow | 55 | Yellow/Brown | 182 |
| 23 | 7 | 7 | H | 23 | Green/Violet | 55 | Violet/Green | 183 |
| 23 | 8 | 8 | J | 23 | Green/White | 55 | White/Green | 184 |
| 24 | 1 | 1 | A | 24 | Brown/Violet | 56 | Violet/Brown | 185 |
| 24 | 2 | 2 | C | 24 | Brown/White | 56 | White/Brown | 186 |
| 24 | 3 | 3 | D | 24 | Green/Red | 56 | Red/Green | 187 |
| 24 | 4 | 4 | E | 24 | Orange/Black | 56 | Black/Orange | 188 |
| 24 | 5 | 5 | F | 24 | Blue/Yellow | 56 | Yellow/Blue | 189 |
| 24 | 6 | 6 | G | 24 | Slate/Yellow | 56 | Yellow/Slate | 190 |
| 24 | 7 | 7 | H | 24 | Brown/Violet | 56 | Violet/Brown | 191 |
| 24 | 8 | 8 | J | 24 | Brown/White | 56 | White/Brown | 192 |

| | | | | | | |
|---|---|---|---|---|---|---|
| Port-5 1-24 | 1 | — | Blue/White | 26 | White/Blue | 193 |
| Port-5 1-24 | 2 | — | Orange/White | 27 | White/Orange | 194 |
| Port-5 1-24 | 3 | — | Green/White | 28 | White/Green | 195 |
| Port-5 1-24 | 4 | — | Brown/White | 29 | White/Brown | 196 |
| Port-5 1-24 | 5 | — | Slate/White | 30 | White/Slate | 197 |
| Port-5 1-24 | 6 | — | Blue/Red | 31 | Red/Blue | 198 |
| Port-5 1-24 | 7 | — | Orange/Red | 32 | Red/Orange | 199 |
| Port-5 1-24 | 8 | — | Green/Red | 33 | Red/Green | 200 |
| Port-5 1-24 | 9 | — | Brown/Red | 34 | Red/Brown | 201 |
| Port-5 1-24 | 10 | — | Slate/Red | 35 | Red/Slate | 202 |
| Port-5 1-24 | 11 | — | Blue/Black | 36 | Black/Blue | 203 |
| Port-5 1-24 | 12 | — | Orange/Black | 37 | Black/Orange | 204 |
| Port-5 1-24 | 13 | — | Green/Black | 38 | Black/Green | 205 |
| Port-5 1-24 | 14 | — | Brown/Black | 39 | Black/Brown | 206 |
| Port-5 1-24 | 15 | — | Slate/Black | 40 | Black/Slate | 207 |
| Port-5 1-24 | 16 | — | Blue/Yellow | 41 | Yellow/Blue | 208 |
| Port-5 1-24 | 17 | — | Orange/Yellow | 42 | Yellow/Orange | 209 |
| Port-5 1-24 | 18 | — | Green/Yellow | 43 | Yellow/Green | 210 |
| Port-5 1-24 | 19 | — | Brown/Yellow | 44 | Yellow/Brown | 211 |
| Port-5 1-24 | 20 | — | Slate/Yellow | 45 | Yellow/Slate | 212 |
| Port-5 1-24 | 21 | — | Blue/Violet | 46 | Violet/Blue | 213 |
| Port-5 1-24 | 22 | — | Orange/Violet | 47 | Violet/Orange | 214 |
| Port-5 1-24 | 23 | — | Green/Violet | 48 | Violet/Green | 215 |
| Port-5 1-24 | 24 | — | Brown/Violet | 49 | Violet/Brown | 216 |

106, 114, 122

| | | | | | | | | |
|---|---|---|---|---|---|---|---|---|
| 25 | 1 | 1 | B | 25 | Blue/White | 57 | White/Blue | 193 |
| 25 | 2 | 2 | C | 25 | Slate/White | 57 | White/Slate | 194 |
| 25 | 3 | 3 | D | 25 | Brown/Red | 57 | Red/Brown | 195 |
| 25 | 4 | 4 | E | 25 | Green/Black | 57 | Black/Green | 196 |
| 25 | 5 | 5 | F | 25 | Orange/Yellow | 57 | Yellow/Orange | 197 |
| 25 | 6 | 6 | G | 25 | Blue/Violet | 57 | Violet/Blue | 198 |
| 25 | 7 | 7 | — | 25 | Blue/White | 57 | White/Blue | 199 |
| 25 | 8 | 8 | J | 25 | Brown/White | 57 | White/Brown | 200 |
| 26 | 1 | 1 | B | 26 | Orange/White | 58 | White/Orange | 201 |
| 26 | 2 | 2 | C | 26 | Blue/Red | 58 | Red/Blue | 202 |
| 26 | 3 | 3 | D | 26 | Slate/Red | 58 | Red/Slate | 203 |
| 26 | 4 | 4 | E | 26 | Brown/Black | 58 | Black/Brown | 204 |
| 26 | 5 | 5 | F | 26 | Green/Yellow | 58 | Yellow/Green | 205 |
| 26 | 6 | 6 | G | 26 | Orange/Violet | 58 | Violet/Orange | 206 |
| 26 | 7 | 7 | — | 26 | Orange/White | 58 | White/Orange | 207 |
| 26 | 8 | 8 | J | 26 | Blue/Red | 58 | Red/Blue | 208 |
| 27 | 1 | 1 | B | 27 | Green/White | 59 | White/Green | 209 |
| 27 | 2 | 2 | C | 27 | Orange/Red | 59 | Red/Orange | 210 |
| 27 | 3 | 3 | D | 27 | Blue/Black | 59 | Black/Blue | 211 |
| 27 | 4 | 4 | E | 27 | Slate/Black | 59 | Black/Slate | 212 |
| 27 | 5 | 5 | F | 27 | Brown/Yellow | 59 | Yellow/Brown | 213 |
| 27 | 6 | 6 | G | 27 | Green/Violet | 59 | Violet/Green | 214 |
| 27 | 7 | 7 | — | 27 | Green/White | 59 | White/Green | 215 |
| 27 | 8 | 8 | J | 27 | Orange/Red | 59 | Red/Orange | 216 |

Figure 3 (cont.)

| | | | | | | | | | | | | |
|---|---|---|---|---|---|---|---|---|---|---|---|---|
| Port-5 25-48 | 1 | J | Blue/White | 26 | White/Blue | 217 | | 28 | 1 | 1 | 28 | Brown/White | 60 | White/Brown | 217 |
| Port-5 25-48 | 2 | J | Orange/White | 27 | White/Orange | 218 | | 28 | 2 | 2 | 28 | Green/Red | 60 | Red/Green | 218 |
| Port-5 25-48 | 3 | J | Green/White | 28 | White/Green | 219 | | 28 | 3 | 3 | 28 | Orange/Black | 60 | Black/Orange | 219 |
| Port-5 25-48 | 4 | J | Brown/White | 29 | White/Brown | 220 | | 28 | 4 | 4 | 28 | Blue/Yellow | 60 | Yellow/Blue | 220 |
| Port-5 25-48 | 5 | J | Slate/White | 30 | White/Slate | 221 | | 28 | 5 | 5 | 28 | Slate/Yellow | 60 | Yellow/Slate | 221 |
| Port-5 25-48 | 6 | J | Blue/Red | 31 | Red/Blue | 222 | | 28 | 6 | 6 | 28 | Brown/Violet | 60 | Violet/Brown | 222 |
| Port-5 25-48 | 7 | J | Orange/Red | 32 | Red/Orange | 223 | | 28 | 7 | 7 | 28 | Brown/White | 60 | White/Brown | 223 |
| Port-5 25-48 | 8 | J | Green/Red | 33 | Red/Green | 224 | | 28 | 8 | 8 | 28 | Green/Red | 60 | Red/Green | 224 |
| Port-5 25-48 | 9 | J | Brown/Red | 34 | Red/Brown | 225 | | 1 | 1 | 1 | 1 | Brown/Red | 33 | Red/Brown | 1 |
| Port-5 25-48 | 10 | J | Slate/Red | 35 | Red/Slate | 226 | | 1 | 2 | 2 | 1 | Green/Black | 33 | Black/Green | 2 |
| Port-5 25-48 | 11 | J | Blue/Black | 36 | Black/Blue | 227 | | 1 | 3 | 3 | 1 | Orange/Yellow | 33 | Yellow/Orange | 3 |
| Port-5 25-48 | 12 | J | Orange/Black | 37 | Black/Orange | 228 | | 1 | 4 | 4 | 1 | Blue/Violet | 33 | Violet/Blue | 4 |
| Port-5 25-48 | 13 | J | Green/Black | 38 | Black/Green | 229 | | 1 | 5 | 5 | 1 | Blue/White | 33 | White/Blue | 5 |
| Port-5 25-48 | 14 | J | Brown/Black | 39 | Black/Brown | 230 | | 1 | 6 | 6 | 1 | Slate/White | 33 | White/Slate | 6 |
| Port-5 25-48 | 15 | J | Slate/Black | 40 | Black/Slate | 231 | | 1 | 7 | 7 | 1 | Brown/Red | 33 | Red/Brown | 7 |
| Port-5 25-48 | 16 | J | Blue/Yellow | 41 | Yellow/Blue | 232 | | 1 | 8 | 8 | 1 | Green/Black | 33 | Black/Green | 8 |
| Port-5 25-48 | 17 | J | Orange/Yellow | 42 | Yellow/Orange | 233 | | 2 | 1 | 1 | 2 | Slate/Red | 34 | Red/Slate | 9 |
| Port-5 25-48 | 18 | J | Green/Yellow | 43 | Yellow/Green | 234 | | 2 | 2 | 2 | 2 | Brown/Black | 34 | Black/Brown | 10 |
| Port-5 25-48 | 19 | J | Brown/Yellow | 44 | Yellow/Brown | 235 | | 2 | 3 | 3 | 2 | Green/Yellow | 34 | Yellow/Green | 11 |
| Port-5 25-48 | 20 | J | Slate/Yellow | 45 | Yellow/Slate | 236 | | 2 | 4 | 4 | 2 | Orange/Violet | 34 | Violet/Orange | 12 |
| Port-5 25-48 | 21 | J | Blue/Violet | 46 | Violet/Blue | 237 | | 2 | 5 | 5 | 2 | Orange/White | 34 | White/Orange | 13 |
| Port-5 25-48 | 22 | J | Orange/Violet | 47 | Violet/Orange | 238 | | 2 | 6 | 6 | 2 | Blue/Red | 34 | Red/Blue | 14 |
| Port-5 25-48 | 23 | J | Green/Violet | 48 | Violet/Green | 239 | | 2 | 7 | 7 | 2 | Slate/Red | 34 | Red/Slate | 15 |
| Port-5 25-48 | 24 | J | Brown/Violet | 49 | Violet/Brown | 240 | | 2 | 8 | 8 | 2 | Brown/Black | 34 | Black/Brown | 16 |

Figure 3 (cont.)

| | | | | | | | | | | | |
|---|---|---|---|---|---|---|---|---|---|---|---|
| Port-6 1-24 | 1 | K | Blue/White | 26 | White/Blue | 241 | 3 | 1 | 1 | J | 3 | Blue/Black | 35 | Black/Blue | 17 |
| Port-6 1-24 | 2 | K | Orange/White | 27 | White/Orange | 242 | 3 | 2 | 2 | K | 3 | Slate/Black | 35 | Black/Slate | 18 |
| Port-6 1-24 | 3 | K | Green/White | 28 | White/Green | 243 | 3 | 3 | 3 | L | 3 | Brown/Yellow | 35 | Yellow/Brown | 19 |
| Port-6 1-24 | 4 | K | Brown/White | 29 | White/Brown | 244 | 3 | 4 | 4 | M | 3 | Green/Violet | 35 | Violet/Green | 20 |
| Port-6 1-24 | 5 | K | Slate/White | 30 | White/Slate | 245 | 3 | 5 | 5 | O | 3 | Green/White | 35 | White/Green | 21 |
| Port-6 1-24 | 6 | K | Blue/Red | 31 | Red/Blue | 246 | 3 | 6 | 6 | P | 3 | Orange/Red | 35 | Red/Orange | 22 |
| Port-6 1-24 | 7 | K | Orange/Red | 32 | Red/Orange | 247 | 3 | 7 | 7 | Q | 3 | Blue/Black | 35 | Black/Blue | 23 |
| Port-6 1-24 | 8 | K | Green/Red | 33 | Red/Green | 248 | 3 | 8 | 8 | R | 3 | Slate/Black | 35 | Black/Slate | 24 |
| Port-6 1-24 | 9 | K | Brown/Red | 34 | Red/Brown | 249 | 4 | 1 | 1 | J | 4 | Orange/Black | 36 | Black/Orange | 25 |
| Port-6 1-24 | 10 | K | Slate/Red | 35 | Red/Slate | 250 | 4 | 2 | 2 | K | 4 | Blue/Yellow | 36 | Yellow/Blue | 26 |
| Port-6 1-24 | 11 | K | Blue/Black | 36 | Black/Blue | 251 | 4 | 3 | 3 | L | 4 | Slate/Yellow | 36 | Yellow/Slate | 27 |
| Port-6 1-24 | 12 | K | Orange/Black | 37 | Black/Orange | 252 | 4 | 4 | 4 | M | 4 | Brown/Violet | 36 | Violet/Brown | 28 |
| Port-6 1-24 | 13 | K | Green/Black | 38 | Black/Green | 253 | 4 | 5 | 5 | O | 4 | Brown/White | 36 | White/Brown | 29 |
| Port-6 1-24 | 14 | K | Brown/Black | 39 | Black/Brown | 254 | 4 | 6 | 6 | P | 4 | Green/Red | 36 | Red/Green | 30 |
| Port-6 1-24 | 15 | K | Slate/Black | 40 | Black/Slate | 255 | 4 | 7 | 7 | Q | 4 | Orange/Black | 36 | Black/Orange | 31 |
| Port-6 1-24 | 16 | K | Blue/Yellow | 41 | Yellow/Blue | 256 | 4 | 8 | 8 | R | 4 | Blue/Yellow | 36 | Yellow/Blue | 32 |
| Port-6 1-24 | 17 | K | Orange/Yellow | 42 | Yellow/Orange | 257 | 5 | 1 | 1 | J | 5 | Green/Black | 37 | Black/Green | 33 |
| Port-6 1-24 | 18 | K | Green/Yellow | 43 | Yellow/Green | 258 | 5 | 2 | 2 | K | 5 | Orange/Yellow | 37 | Yellow/Orange | 34 |
| Port-6 1-24 | 19 | K | Brown/Yellow | 44 | Yellow/Brown | 259 | 5 | 3 | 3 | L | 5 | Blue/Violet | 37 | Violet/Blue | 35 |
| Port-6 1-24 | 20 | K | Slate/Yellow | 45 | Yellow/Slate | 260 | 5 | 4 | 4 | N | 5 | Blue/White | 37 | White/Blue | 36 |
| Port-6 1-24 | 21 | K | Blue/Violet | 46 | Violet/Blue | 261 | 5 | 5 | 5 | O | 5 | Slate/White | 37 | White/Slate | 37 |
| Port-6 1-24 | 22 | K | Orange/Violet | 47 | Violet/Orange | 262 | 5 | 6 | 6 | P | 5 | Brown/Red | 37 | Red/Brown | 38 |
| Port-6 1-24 | 23 | K | Green/Violet | 48 | Violet/Green | 263 | 5 | 7 | 7 | Q | 5 | Green/Black | 37 | Black/Green | 39 |
| Port-6 1-24 | 24 | K | Brown/Violet | 49 | Violet/Brown | 264 | 5 | 8 | 8 | R | 5 | Orange/Yellow | 37 | Yellow/Orange | 40 |

Figure 3 (cont.)

| | | | | | | | | | | | | |
|---|---|---|---|---|---|---|---|---|---|---|---|---|
| Port-6 25-48 | 1 | L | Blue/White | 26 | White/Blue | 265 | | 6 | 1 | 1 | J | 6 | Brown/Black | 38 | Black/Brown | 41 |
| Port-6 25-48 | 2 | L | Orange/White | 27 | White/Orange | 266 | | 6 | 2 | 2 | K | 6 | Green/Yellow | 38 | Yellow/Green | 42 |
| Port-6 25-48 | 3 | L | Green/White | 28 | White/Green | 267 | | 6 | 3 | 3 | L | 6 | Orange/Violet | 38 | Violet/Orange | 43 |
| Port-6 25-48 | 4 | L | Brown/White | 29 | White/Brown | 268 | | 6 | 4 | 4 | N | 6 | Orange/White | 38 | White/Orange | 44 |
| Port-6 25-48 | 5 | L | Slate/White | 30 | White/Slate | 269 | | 6 | 5 | 5 | O | 6 | Blue/Red | 38 | Red/Blue | 45 |
| Port-6 25-48 | 6 | L | Blue/Red | 31 | Red/Blue | 270 | | 6 | 6 | 6 | P | 6 | Slate/Red | 38 | Red/Slate | 46 |
| Port-6 25-48 | 7 | L | Orange/Red | 32 | Red/Orange | 271 | | 6 | 7 | 7 | Q | 6 | Brown/Black | 38 | Black/Brown | 47 |
| Port-6 25-48 | 8 | L | Green/Red | 33 | Red/Green | 272 | | 6 | 8 | 8 | R | 6 | Green/Yellow | 38 | Yellow/Green | 48 |
| Port-6 25-48 | 9 | L | Brown/Red | 34 | Red/Brown | 273 | | 7 | 1 | 1 | J | 7 | Slate/Black | 39 | Black/Slate | 49 |
| Port-6 25-48 | 10 | L | Slate/Red | 35 | Red/Slate | 274 | | 7 | 2 | 2 | K | 7 | Brown/Yellow | 39 | Yellow/Brown | 50 |
| Port-6 25-48 | 11 | L | Blue/Black | 36 | Black/Blue | 275 | | 7 | 3 | 3 | L | 7 | Green/Violet | 39 | Violet/Green | 51 |
| Port-6 25-48 | 12 | L | Orange/Black | 37 | Black/Orange | 276 | | 7 | 4 | 4 | N | 7 | Green/White | 39 | White/Green | 52 |
| Port-6 25-48 | 13 | L | Green/Black | 38 | Black/Green | 277 | | 7 | 5 | 5 | O | 7 | Orange/Red | 39 | Red/Orange | 53 |
| Port-6 25-48 | 14 | L | Brown/Black | 39 | Black/Brown | 278 | | 7 | 6 | 6 | P | 7 | Blue/Black | 39 | Black/Blue | 54 |
| Port-6 25-48 | 15 | L | Slate/Black | 40 | Black/Slate | 279 | | 7 | 7 | 7 | Q | 7 | Slate/Black | 39 | Black/Slate | 55 |
| Port-6 25-48 | 16 | L | Blue/Yellow | 41 | Yellow/Blue | 280 | | 7 | 8 | 8 | R | 7 | Brown/Yellow | 39 | Yellow/Brown | 56 |
| Port-6 25-48 | 17 | L | Orange/Yellow | 42 | Yellow/Orange | 281 | | 8 | 1 | 1 | J | 8 | Blue/Yellow | 40 | Yellow/Blue | 57 |
| Port-6 25-48 | 18 | L | Green/Yellow | 43 | Yellow/Green | 282 | | 8 | 2 | 2 | K | 8 | Slate/Yellow | 40 | Yellow/Slate | 58 |
| Port-6 25-48 | 19 | L | Brown/Yellow | 44 | Yellow/Brown | 283 | | 8 | 3 | 3 | L | 8 | Brown/Violet | 40 | Violet/Brown | 59 |
| Port-6 25-48 | 20 | L | Slate/Yellow | 45 | Yellow/Slate | 284 | | 8 | 4 | 4 | N | 8 | Brown/White | 40 | White/Brown | 60 |
| Port-6 25-48 | 21 | L | Blue/Violet | 46 | Violet/Blue | 285 | | 8 | 5 | 5 | O | 8 | Green/Red | 40 | Red/Green | 61 |
| Port-6 25-48 | 22 | L | Orange/Violet | 47 | Violet/Orange | 286 | | 8 | 6 | 6 | P | 8 | Orange/Black | 40 | Black/Orange | 62 |
| Port-6 25-48 | 23 | L | Green/Violet | 48 | Violet/Green | 287 | | 8 | 7 | 7 | Q | 8 | Blue/Yellow | 40 | Yellow/Blue | 63 |
| Port-6 25-48 | 24 | L | Brown/Violet | 49 | Violet/Brown | 288 | | 8 | 8 | 8 | R | 8 | Slate/Yellow | 40 | Yellow/Slate | 64 |

| | | | | | | | | | | | | |
|---|---|---|---|---|---|---|---|---|---|---|---|---|
| Port-7 1-24 | 1 | M | Blue/White | 26 | White/Blue | 289 | 9 | 1 | 1 | J | 9 | Orange/Yellow | 41 | Yellow/Orange | 65 |
| Port-7 1-24 | 2 | M | Orange/White | 27 | White/Orange | 290 | 9 | 2 | 2 | K | 9 | Blue/Violet | 41 | Violet/Blue | 66 |
| Port-7 1-24 | 3 | M | Green/White | 28 | White/Green | 291 | 9 | 3 | 3 | M | 9 | Blue/White | 41 | White/Blue | 67 |
| Port-7 1-24 | 4 | M | Brown/White | 29 | White/Brown | 292 | 9 | 4 | 4 | N | 9 | Slate/White | 41 | White/Slate | 68 |
| Port-7 1-24 | 5 | M | Slate/White | 30 | White/Slate | 293 | 9 | 5 | 5 | O | 9 | Brown/Red | 41 | Red/Brown | 69 |
| Port-7 1-24 | 6 | M | Blue/Red | 31 | Red/Blue | 294 | 9 | 6 | 6 | P | 9 | Green/Black | 41 | Black/Green | 70 |
| Port-7 1-24 | 7 | M | Orange/Red | 32 | Red/Orange | 295 | 9 | 7 | 7 | Q | 9 | Orange/Yellow | 41 | Yellow/Orange | 71 |
| Port-7 1-24 | 8 | M | Green/Red | 33 | Red/Green | 296 | 9 | 8 | 8 | R | 9 | Blue/Violet | 41 | Violet/Blue | 72 |
| Port-7 1-24 | 9 | M | Brown/Red | 34 | Red/Brown | 297 | 10 | 1 | 1 | J | 10 | Green/Yellow | 42 | Yellow/Green | 73 |
| Port-7 1-24 | 10 | M | Slate/Red | 35 | Red/Slate | 298 | 10 | 2 | 2 | K | 10 | Orange/Violet | 42 | Violet/Orange | 74 |
| Port-7 1-24 | 11 | M | Blue/Black | 36 | Black/Blue | 299 | 10 | 3 | 3 | M | 10 | Orange/White | 42 | White/Orange | 75 |
| Port-7 1-24 | 12 | M | Orange/Black | 37 | Black/Orange | 300 | 10 | 4 | 4 | N | 10 | Blue/Red | 42 | Red/Blue | 76 |
| Port-7 1-24 | 13 | M | Green/Black | 38 | Black/Green | 301 | 10 | 5 | 5 | O | 10 | Slate/Red | 42 | Red/Slate | 77 |
| Port-7 1-24 | 14 | M | Brown/Black | 39 | Black/Brown | 302 | 10 | 6 | 6 | P | 10 | Brown/Black | 42 | Black/Brown | 78 |
| Port-7 1-24 | 15 | M | Slate/Black | 40 | Black/Slate | 303 | 10 | 7 | 7 | Q | 10 | Green/Yellow | 42 | Yellow/Green | 79 |
| Port-7 1-24 | 16 | M | Blue/Yellow | 41 | Yellow/Blue | 304 | 10 | 8 | 8 | R | 10 | Orange/Violet | 42 | Violet/Orange | 80 |
| Port-7 1-24 | 17 | M | Orange/Yellow | 42 | Yellow/Orange | 305 | 11 | 1 | 1 | J | 11 | Brown/Yellow | 43 | Yellow/Brown | 81 |
| Port-7 1-24 | 18 | M | Green/Yellow | 43 | Yellow/Green | 306 | 11 | 2 | 2 | K | 11 | Green/Violet | 43 | Violet/Green | 82 |
| Port-7 1-24 | 19 | M | Brown/Yellow | 44 | Yellow/Brown | 307 | 11 | 3 | 3 | M | 11 | Green/White | 43 | White/Green | 83 |
| Port-7 1-24 | 20 | M | Slate/Yellow | 45 | Yellow/Slate | 308 | 11 | 4 | 4 | N | 11 | Orange/Red | 43 | Red/Orange | 84 |
| Port-7 1-24 | 21 | M | Blue/Violet | 46 | Violet/Blue | 309 | 11 | 5 | 5 | O | 11 | Blue/Black | 43 | Black/Blue | 85 |
| Port-7 1-24 | 22 | M | Orange/Violet | 47 | Violet/Orange | 310 | 11 | 6 | 6 | P | 11 | Slate/Black | 43 | Black/Slate | 86 |
| Port-7 1-24 | 23 | M | Green/Violet | 48 | Violet/Green | 311 | 11 | 7 | 7 | Q | 11 | Brown/Yellow | 43 | Yellow/Brown | 87 |
| Port-7 1-24 | 24 | M | Brown/Violet | 49 | Violet/Brown | 312 | 11 | 8 | 8 | R | 11 | Green/Violet | 43 | Violet/Green | 88 |

| Port | # | N | Color | # | Color | # |
|---|---|---|---|---|---|---|
| Port-7 25-48 | 1 | N | Blue/White | 26 | White/Blue | 313 |
| Port-7 25-48 | 2 | N | Orange/White | 27 | White/Orange | 314 |
| Port-7 25-48 | 3 | N | Green/White | 28 | White/Green | 315 |
| Port-7 25-48 | 4 | N | Brown/White | 29 | White/Brown | 316 |
| Port-7 25-48 | 5 | N | Slate/White | 30 | White/Slate | 317 |
| Port-7 25-48 | 6 | N | Blue/Red | 31 | Red/Blue | 318 |
| Port-7 25-48 | 7 | N | Orange/Red | 32 | Red/Orange | 319 |
| Port-7 25-48 | 8 | N | Green/Red | 33 | Red/Green | 320 |
| Port-7 25-48 | 9 | N | Brown/Red | 34 | Red/Brown | 321 |
| Port-7 25-48 | 10 | N | Slate/Red | 35 | Red/Slate | 322 |
| Port-7 25-48 | 11 | N | Blue/Black | 36 | Black/Blue | 323 |
| Port-7 25-48 | 12 | N | Orange/Black | 37 | Black/Orange | 324 |
| Port-7 25-48 | 13 | N | Green/Black | 38 | Black/Green | 325 |
| Port-7 25-48 | 14 | N | Brown/Black | 39 | Black/Brown | 326 |
| Port-7 25-48 | 15 | N | Slate/Black | 40 | Black/Slate | 327 |
| Port-7 25-48 | 16 | N | Blue/Yellow | 41 | Yellow/Blue | 328 |
| Port-7 25-48 | 17 | N | Orange/Yellow | 42 | Yellow/Orange | 329 |
| Port-7 25-48 | 18 | N | Green/Yellow | 43 | Yellow/Green | 330 |
| Port-7 25-48 | 19 | N | Brown/Yellow | 44 | Yellow/Brown | 331 |
| Port-7 25-48 | 20 | N | Slate/Yellow | 45 | Yellow/Slate | 332 |
| Port-7 25-48 | 21 | N | Blue/Violet | 46 | Violet/Blue | 333 |
| Port-7 25-48 | 22 | N | Orange/Violet | 47 | Violet/Orange | 334 |
| Port-7 25-48 | 23 | N | Green/Violet | 48 | Violet/Green | 335 |
| Port-7 25-48 | 24 | N | Brown/Violet | 49 | Violet/Brown | 336 |

106, 114, 122:

| # | # | L | # | Color | # | Color | # |
|---|---|---|---|---|---|---|---|
| 1 | 1 | J | 12 | Slate/Yellow | 44 | Yellow/Slate | 89 |
| 2 | 2 | K | 12 | Brown/Violet | 44 | Violet/Brown | 90 |
| 3 | 3 | M | 12 | Brown/White | 44 | White/Brown | 91 |
| 4 | 4 | N | 12 | Green/Red | 44 | Red/Green | 92 |
| 5 | 5 | O | 12 | Orange/Black | 44 | Black/Orange | 93 |
| 6 | 6 | P | 12 | Blue/Yellow | 44 | Yellow/Blue | 94 |
| 7 | 7 | Q | 12 | Slate/Yellow | 44 | Yellow/Slate | 95 |
| 8 | 8 | R | 12 | Brown/Violet | 44 | Violet/Brown | 96 |
| 1 | 1 | J | 13 | Blue/Violet | 45 | Violet/Blue | 97 |
| 2 | 2 | L | 13 | Blue/White | 45 | White/Blue | 98 |
| 3 | 3 | M | 13 | Slate/White | 45 | White/Slate | 99 |
| 4 | 4 | N | 13 | Brown/Red | 45 | Red/Brown | 100 |
| 5 | 5 | O | 13 | Green/Black | 45 | Black/Green | 101 |
| 6 | 6 | P | 13 | Orange/Yellow | 45 | Yellow/Orange | 102 |
| 7 | 7 | Q | 13 | Blue/Violet | 45 | Violet/Blue | 103 |
| 8 | 8 | S | 13 | Blue/White | 45 | White/Blue | 104 |
| 1 | 1 | J | 14 | Orange/Violet | 46 | Violet/Orange | 105 |
| 2 | 2 | L | 14 | Orange/White | 46 | White/Orange | 106 |
| 3 | 3 | M | 14 | Blue/Red | 46 | Red/Blue | 107 |
| 4 | 4 | N | 14 | Slate/Red | 46 | Red/Slate | 108 |
| 5 | 5 | O | 14 | Brown/Black | 46 | Black/Brown | 109 |
| 6 | 6 | P | 14 | Green/Yellow | 46 | Yellow/Green | 110 |
| 7 | 7 | Q | 14 | Orange/Violet | 46 | Violet/Orange | 111 |
| 8 | 8 | S | 14 | Orange/White | 46 | White/Orange | 112 |

Figure 3 (cont.)

| | | | | | | | | | | | |
|---|---|---|---|---|---|---|---|---|---|---|---|
| Port-10 1-24 | 1 | O | Blue/White | 26 | White/Blue | 337 | 15 | 1 | 1 | J | 15 | Green/Violet | 47 | Violet/Green | 113 |
| Port-10 1-24 | 2 | O | Orange/White | 27 | White/Orange | 338 | 15 | 1 | 1 | L | 15 | Green/White | 47 | White/Green | 114 |
| Port-10 1-24 | 3 | O | Green/White | 28 | White/Green | 339 | 15 | 2 | 2 | M | 15 | Orange/Red | 47 | Red/Orange | 115 |
| Port-10 1-24 | 4 | O | Brown/White | 29 | White/Brown | 340 | 15 | 3 | 3 | N | 15 | Blue/Black | 47 | Black/Blue | 116 |
| Port-10 1-24 | 5 | O | Slate/White | 30 | White/Slate | 341 | 15 | 4 | 4 | O | 15 | Slate/Black | 47 | Black/Slate | 117 |
| Port-10 1-24 | 6 | O | Blue/Red | 31 | Red/Blue | 342 | 15 | 5 | 5 | P | 15 | Brown/Yellow | 47 | Yellow/Brown | 118 |
| Port-10 1-24 | 7 | O | Orange/Red | 32 | Red/Orange | 343 | 15 | 6 | 6 | Q | 15 | Green/Violet | 47 | Violet/Green | 119 |
| Port-10 1-24 | 8 | O | Green/Red | 33 | Red/Green | 344 | 15 | 7 | 7 | S | 15 | Green/White | 47 | White/Green | 120 |
| Port-10 1-24 | 9 | O | Brown/Red | 34 | Red/Brown | 345 | 15 | 8 | 8 | J | 16 | Brown/Violet | 48 | Violet/Brown | 121 |
| Port-10 1-24 | 10 | O | Slate/Red | 35 | Red/Slate | 346 | 16 | 1 | 1 | L | 16 | Brown/White | 48 | White/Brown | 122 |
| Port-10 1-24 | 11 | O | Blue/Black | 36 | Black/Blue | 347 | 16 | 2 | 2 | M | 16 | Green/Red | 48 | Red/Green | 123 |
| Port-10 1-24 | 12 | O | Orange/Black | 37 | Black/Orange | 348 | 16 | 3 | 3 | N | 16 | Orange/Black | 48 | Black/Orange | 124 |
| Port-10 1-24 | 13 | O | Green/Black | 38 | Black/Green | 349 | 16 | 4 | 4 | O | 16 | Blue/Yellow | 48 | Yellow/Blue | 125 |
| Port-10 1-24 | 14 | O | Brown/Black | 39 | Black/Brown | 350 | 16 | 5 | 5 | P | 16 | Slate/Yellow | 48 | Yellow/Slate | 126 |
| Port-10 1-24 | 15 | O | Slate/Black | 40 | Black/Slate | 351 | 16 | 6 | 6 | Q | 16 | Brown/Violet | 48 | Violet/Brown | 127 |
| Port-10 1-24 | 16 | O | Blue/Yellow | 41 | Yellow/Blue | 352 | 16 | 7 | 7 | S | 16 | Brown/White | 48 | White/Brown | 128 |
| Port-10 1-24 | 17 | O | Orange/Yellow | 42 | Yellow/Orange | 353 | 17 | 8 | 8 | K | 17 | Blue/White | 49 | White/Blue | 129 |
| Port-10 1-24 | 18 | O | Green/Yellow | 43 | Yellow/Green | 354 | 17 | 1 | 1 | L | 17 | Slate/White | 37 | White/Slate | 130 |
| Port-10 1-24 | 19 | O | Brown/Yellow | 44 | Yellow/Brown | 355 | 17 | 2 | 2 | M | 17 | Brown/Red | 49 | Red/Brown | 131 |
| Port-10 1-24 | 20 | O | Slate/Yellow | 45 | Yellow/Slate | 356 | 17 | 3 | 3 | N | 17 | Green/Black | 49 | Black/Green | 132 |
| Port-10 1-24 | 21 | O | Blue/Violet | 46 | Violet/Blue | 357 | 17 | 4 | 4 | O | 17 | Orange/Yellow | 49 | Yellow/Orange | 133 |
| Port-10 1-24 | 22 | O | Orange/Violet | 47 | Violet/Orange | 358 | 17 | 5 | 5 | P | 17 | Blue/Violet | 49 | Violet/Blue | 134 |
| Port-10 1-24 | 23 | O | Green/Violet | 48 | Violet/Green | 359 | 17 | 6 | 6 | R | 17 | Blue/White | 49 | White/Blue | 135 |
| Port-10 1-24 | 24 | O | Brown/Violet | 49 | Violet/Brown | 360 | 17 | 7 | 7 | S | 17 | Slate/White | 49 | White/Slate | 136 |

| | | | | | | | | | | | |
|---|---|---|---|---|---|---|---|---|---|---|---|
| Port-10 25-48 | 1 | P | Blue/White | 26 | White/Blue | 361 | | 18 | 1 | 1 | K | 18 | Orange/White | 50 | White/Orange | 137 |
| Port-10 25-48 | 2 | P | Orange/White | 27 | White/Orange | 362 | | 18 | 2 | 2 | L | 18 | Blue/Red | 50 | Red/Blue | 138 |
| Port-10 25-48 | 3 | P | Green/White | 28 | White/Green | 363 | | 18 | 3 | 3 | M | 18 | Slate/Red | 50 | Red/Slate | 139 |
| Port-10 25-48 | 4 | P | Brown/White | 29 | White/Brown | 364 | | 18 | 4 | 4 | N | 18 | Brown/Black | 50 | Black/Brown | 140 |
| Port-10 25-48 | 5 | P | Slate/White | 30 | White/Slate | 365 | | 18 | 5 | 5 | O | 18 | Green/Yellow | 50 | Yellow/Green | 141 |
| Port-10 25-48 | 6 | P | Blue/Red | 31 | Red/Blue | 366 | | 18 | 6 | 6 | P | 18 | Orange/Violet | 50 | Violet/Orange | 142 |
| Port-10 25-48 | 7 | P | Orange/Red | 32 | Red/Orange | 367 | | 18 | 7 | 7 | R | 18 | Orange/White | 50 | White/Orange | 143 |
| Port-10 25-48 | 8 | P | Green/Red | 33 | Red/Green | 368 | | 18 | 8 | 8 | S | 18 | Blue/Red | 50 | Red/Blue | 144 |
| Port-10 25-48 | 9 | P | Brown/Red | 34 | Red/Brown | 369 | | 19 | 1 | 1 | K | 19 | Green/White | 51 | White/Green | 145 |
| Port-10 25-48 | 10 | P | Slate/Red | 35 | Red/Slate | 370 | | 19 | 2 | 2 | L | 19 | Orange/Red | 51 | Red/Orange | 146 |
| Port-10 25-48 | 11 | P | Blue/Black | 36 | Black/Blue | 371 | | 19 | 3 | 3 | M | 19 | Blue/Black | 51 | Black/Blue | 147 |
| Port-10 25-48 | 12 | P | Orange/Black | 37 | Black/Orange | 372 | | 19 | 4 | 4 | N | 19 | Slate/Black | 51 | Black/Slate | 148 |
| Port-10 25-48 | 13 | P | Green/Black | 38 | Black/Green | 373 | | 19 | 5 | 5 | O | 19 | Brown/Yellow | 51 | Yellow/Brown | 149 |
| Port-10 25-48 | 14 | P | Brown/Black | 39 | Black/Brown | 374 | | 19 | 6 | 6 | P | 19 | Green/Violet | 51 | Violet/Green | 150 |
| Port-10 25-48 | 15 | P | Slate/Black | 40 | Black/Slate | 375 | | 19 | 7 | 7 | R | 19 | Green/White | 51 | White/Green | 151 |
| Port-10 25-48 | 16 | P | Blue/Yellow | 41 | Yellow/Blue | 376 | | 19 | 8 | 8 | S | 19 | Orange/Red | 51 | Red/Orange | 152 |
| Port-10 25-48 | 17 | P | Orange/Yellow | 42 | Yellow/Orange | 377 | | 20 | 1 | 1 | K | 20 | Brown/White | 52 | White/Brown | 153 |
| Port-10 25-48 | 18 | P | Green/Yellow | 43 | Yellow/Green | 378 | | 20 | 2 | 2 | L | 20 | Green/Red | 52 | Red/Green | 154 |
| Port-10 25-48 | 19 | P | Brown/Yellow | 44 | Yellow/Brown | 379 | | 20 | 3 | 3 | M | 20 | Orange/Black | 52 | Black/Orange | 155 |
| Port-10 25-48 | 20 | P | Slate/Yellow | 45 | Yellow/Slate | 380 | | 20 | 4 | 4 | N | 20 | Blue/Yellow | 52 | Yellow/Blue | 156 |
| Port-10 25-48 | 21 | P | Blue/Violet | 46 | Violet/Blue | 381 | | 20 | 5 | 5 | O | 20 | Slate/Yellow | 52 | Yellow/Slate | 157 |
| Port-10 25-48 | 22 | P | Orange/Violet | 47 | Violet/Orange | 382 | | 20 | 6 | 6 | P | 20 | Brown/Violet | 52 | Violet/Brown | 158 |
| Port-10 25-48 | 23 | P | Green/Violet | 48 | Violet/Green | 383 | | 20 | 7 | 7 | R | 20 | Brown/White | 52 | White/Brown | 159 |
| Port-10 25-48 | 24 | P | Brown/Violet | 49 | Violet/Brown | 384 | | 20 | 8 | 8 | S | 20 | Green/Red | 52 | Red/Green | 160 |

104, 112, 120 →  (left sub-table)
106, 114, 122 →  (right sub-table)

| Port-11 1-24 | # | Q | Color | Pin | Color | # | | | | | | Color | # | Color | # |
|---|---|---|---|---|---|---|---|---|---|---|---|---|---|---|---|
| Port-11 1-24 | 1  | Q | Blue/White     | 26 | White/Blue    | 385 | 21 | 1 | K | 21 | Slate/White    | 53 | White/Slate    | 161 |
| Port-11 1-24 | 2  | Q | Orange/White   | 27 | White/Orange  | 386 | 21 | 2 | L | 21 | Brown/Red      | 53 | Red/Brown      | 162 |
| Port-11 1-24 | 3  | Q | Green/White    | 28 | White/Green   | 387 | 21 | 3 | M | 21 | Green/Black    | 53 | Black/Green    | 163 |
| Port-11 1-24 | 4  | Q | Brown/White    | 29 | White/Brown   | 388 | 21 | 4 | N | 21 | Orange/Yellow  | 53 | Yellow/Orange  | 164 |
| Port-11 1-24 | 5  | Q | Slate/White    | 30 | White/Slate   | 389 | 21 | 5 | O | 21 | Blue/Violet    | 53 | Violet/Blue    | 165 |
| Port-11 1-24 | 6  | Q | Blue/Red       | 31 | Red/Blue      | 390 | 21 | 6 | Q | 21 | Blue/White     | 53 | White/Blue     | 166 |
| Port-11 1-24 | 7  | Q | Orange/Red     | 32 | Red/Orange    | 391 | 21 | 7 | R | 21 | Slate/White    | 53 | White/Slate    | 167 |
| Port-11 1-24 | 8  | Q | Green/Red      | 33 | Red/Green     | 392 | 21 | 8 | S | 21 | Brown/Red      | 53 | Red/Brown      | 168 |
| Port-11 1-24 | 9  | Q | Brown/Red      | 34 | Red/Brown     | 393 | 22 | 1 | K | 22 | Blue/Red       | 54 | Red/Blue       | 169 |
| Port-11 1-24 | 10 | Q | Slate/Red      | 35 | Red/Slate     | 394 | 22 | 2 | L | 22 | Slate/Red      | 54 | Red/Slate      | 170 |
| Port-11 1-24 | 11 | Q | Blue/Black     | 36 | Black/Blue    | 395 | 22 | 3 | M | 22 | Brown/Black    | 54 | Black/Brown    | 171 |
| Port-11 1-24 | 12 | Q | Orange/Black   | 37 | Black/Orange  | 396 | 22 | 4 | N | 22 | Green/Yellow   | 54 | Yellow/Green   | 172 |
| Port-11 1-24 | 13 | Q | Green/Black    | 38 | Black/Green   | 397 | 22 | 5 | O | 22 | Orange/Violet  | 54 | Violet/Orange  | 173 |
| Port-11 1-24 | 14 | Q | Brown/Black    | 39 | Black/Brown   | 398 | 22 | 6 | Q | 22 | Orange/White   | 54 | White/Orange   | 174 |
| Port-11 1-24 | 15 | Q | Slate/Black    | 40 | Black/Slate   | 399 | 22 | 7 | R | 22 | Blue/Red       | 54 | Red/Blue       | 175 |
| Port-11 1-24 | 16 | Q | Blue/Yellow    | 41 | Yellow/Blue   | 400 | 22 | 8 | S | 22 | Slate/Red      | 54 | Red/Slate      | 176 |
| Port-11 1-24 | 17 | Q | Orange/Yellow  | 42 | Yellow/Orange | 401 | 23 | 1 | K | 23 | Orange/Red     | 55 | Red/Orange     | 177 |
| Port-11 1-24 | 18 | Q | Green/Yellow   | 43 | Yellow/Green  | 402 | 23 | 2 | L | 23 | Blue/Black     | 55 | Black/Blue     | 178 |
| Port-11 1-24 | 19 | Q | Brown/Yellow   | 44 | Yellow/Brown  | 403 | 23 | 3 | M | 23 | Slate/Black    | 55 | Black/Slate    | 179 |
| Port-11 1-24 | 20 | Q | Slate/Yellow   | 45 | Yellow/Slate  | 404 | 23 | 4 | N | 23 | Brown/Yellow   | 55 | Yellow/Brown   | 180 |
| Port-11 1-24 | 21 | Q | Blue/Violet    | 46 | Violet/Blue   | 405 | 23 | 5 | O | 23 | Green/Violet   | 55 | Violet/Green   | 181 |
| Port-11 1-24 | 22 | Q | Orange/Violet  | 47 | Violet/Orange | 406 | 23 | 6 | Q | 23 | Green/White    | 55 | White/Green    | 182 |
| Port-11 1-24 | 23 | Q | Green/Violet   | 48 | Violet/Green  | 407 | 23 | 7 | R | 23 | Orange/Red     | 55 | Red/Orange     | 183 |
| Port-11 1-24 | 24 | Q | Brown/Violet   | 49 | Violet/Brown  | 408 | 23 | 8 | S | 23 | Blue/Black     | 55 | Black/Blue     | 184 |

| | | | | | | | | | | | | | |
|---|---|---|---|---|---|---|---|---|---|---|---|---|---|
| Port-11 | 25-48 | 1 | R | Blue/White | 26 | White/Blue | 409 | 24 | 1 | 1 | K | 24 | Green/Red | 56 | Red/Green | 185 |
| Port-11 | 25-48 | 2 | R | Orange/White | 27 | White/Orange | 410 | 24 | 2 | 2 | L | 24 | Orange/Black | 56 | Black/Orange | 186 |
| Port-11 | 25-48 | 3 | R | Green/White | 28 | White/Green | 411 | 24 | 3 | 3 | M | 24 | Blue/Yellow | 56 | Yellow/Blue | 187 |
| Port-11 | 25-48 | 4 | R | Brown/White | 29 | White/Brown | 412 | 24 | 4 | 4 | N | 24 | Slate/Yellow | 56 | Yellow/Slate | 188 |
| Port-11 | 25-48 | 5 | R | Slate/White | 30 | White/Slate | 413 | 24 | 5 | 5 | O | 24 | Brown/Violet | 56 | Violet/Brown | 189 |
| Port-11 | 25-48 | 6 | R | Blue/Red | 31 | Red/Blue | 414 | 24 | 6 | 6 | Q | 24 | Brown/White | 56 | White/Brown | 190 |
| Port-11 | 25-48 | 7 | R | Orange/Red | 32 | Red/Orange | 415 | 24 | 7 | 7 | R | 24 | Green/Red | 56 | Red/Green | 191 |
| Port-11 | 25-48 | 8 | R | Green/Red | 33 | Red/Green | 416 | 24 | 8 | 8 | S | 24 | Orange/Black | 56 | Black/Orange | 192 |
| Port-11 | 25-48 | 9 | R | Brown/Red | 34 | Red/Brown | 417 | 25 | 1 | 1 | K | 25 | Brown/Red | 57 | Red/Brown | 193 |
| Port-11 | 25-48 | 10 | R | Slate/Red | 35 | Red/Slate | 418 | 25 | 2 | 2 | L | 25 | Green/Black | 57 | Black/Green | 194 |
| Port-11 | 25-48 | 11 | R | Blue/Black | 36 | Black/Blue | 419 | 25 | 3 | 3 | M | 25 | Orange/Yellow | 57 | Yellow/Orange | 195 |
| Port-11 | 25-48 | 12 | R | Orange/Black | 37 | Black/Orange | 420 | 25 | 4 | 4 | N | 25 | Blue/Violet | 57 | Violet/Blue | 196 |
| Port-11 | 25-48 | 13 | R | Green/Black | 38 | Black/Green | 421 | 25 | 5 | 5 | P | 25 | Blue/White | 57 | White/Blue | 197 |
| Port-11 | 25-48 | 14 | R | Brown/Black | 39 | Black/Brown | 422 | 25 | 6 | 6 | Q | 25 | Slate/White | 57 | White/Slate | 198 |
| Port-11 | 25-48 | 15 | R | Slate/Black | 40 | Black/Slate | 423 | 25 | 7 | 7 | R | 25 | Brown/Red | 57 | Red/Brown | 199 |
| Port-11 | 25-48 | 16 | R | Blue/Yellow | 41 | Yellow/Blue | 424 | 25 | 8 | 8 | S | 25 | Green/Black | 57 | Black/Green | 200 |
| Port-11 | 25-48 | 17 | R | Orange/Yellow | 42 | Yellow/Orange | 425 | 26 | 1 | 1 | K | 26 | Slate/Red | 58 | Red/Slate | 201 |
| Port-11 | 25-48 | 18 | R | Green/Yellow | 43 | Yellow/Green | 426 | 26 | 2 | 2 | L | 26 | Brown/Black | 58 | Black/Brown | 202 |
| Port-11 | 25-48 | 19 | R | Brown/Yellow | 44 | Yellow/Brown | 427 | 26 | 3 | 3 | M | 26 | Green/Yellow | 58 | Yellow/Green | 203 |
| Port-11 | 25-48 | 20 | R | Slate/Yellow | 45 | Yellow/Slate | 428 | 26 | 4 | 4 | N | 26 | Orange/Violet | 58 | Violet/Orange | 204 |
| Port-11 | 25-48 | 21 | R | Blue/Violet | 46 | Violet/Blue | 429 | 26 | 5 | 5 | P | 26 | Orange/White | 58 | White/Orange | 205 |
| Port-11 | 25-48 | 22 | R | Orange/Violet | 47 | Violet/Orange | 430 | 26 | 6 | 6 | Q | 26 | Blue/Red | 58 | Red/Blue | 206 |
| Port-11 | 25-48 | 23 | R | Green/Violet | 48 | Violet/Green | 431 | 26 | 7 | 7 | R | 26 | Slate/Red | 58 | Red/Slate | 207 |
| Port-11 | 25-48 | 24 | R | Brown/Violet | 49 | Violet/Brown | 432 | 26 | 8 | 8 | S | 26 | Brown/Black | 58 | Black/Brown | 208 |

Figure 3 (cont.)

| | | | 104, 112, 120 | | | | | | | | | 106, 114, 122 | | |
|---|---|---|---|---|---|---|---|---|---|---|---|---|---|---|
| Port-12 1-24 | 1 | S | Blue/White | 26 | White/Blue | 433 | 27 | 1 | 1 | K | 27 | Blue/Black | 59 | Black/Blue | 209 |
| Port-12 1-24 | 2 | S | Orange/White | 27 | White/Orange | 434 | 27 | 2 | 2 | L | 27 | Slate/Black | 59 | Black/Slate | 210 |
| Port-12 1-24 | 3 | S | Green/White | 28 | White/Green | 435 | 27 | 3 | 3 | M | 27 | Brown/Yellow | 59 | Yellow/Brown | 211 |
| Port-12 1-24 | 4 | S | Brown/White | 29 | White/Brown | 436 | 27 | 4 | 4 | N | 27 | Green/Violet | 59 | Violet/Green | 212 |
| Port-12 1-24 | 5 | S | Slate/White | 30 | White/Slate | 437 | 27 | 5 | 5 | P | 27 | Green/White | 59 | White/Green | 213 |
| Port-12 1-24 | 6 | S | Blue/Red | 31 | Red/Blue | 438 | 27 | 6 | 6 | Q | 27 | Orange/Red | 59 | Red/Orange | 214 |
| Port-12 1-24 | 7 | S | Orange/Red | 32 | Red/Orange | 439 | 27 | 7 | 7 | R | 27 | Blue/Black | 59 | Black/Blue | 215 |
| Port-12 1-24 | 8 | S | Green/Red | 33 | Red/Green | 440 | 27 | 8 | 8 | S | 27 | Slate/Black | 59 | Black/Slate | 216 |
| Port-12 1-24 | 9 | S | Brown/Red | 34 | Red/Brown | 441 | 28 | 1 | 1 | K | 28 | Orange/Black | 60 | Black/Orange | 217 |
| Port-12 1-24 | 10 | S | Slate/Red | 35 | Red/Slate | 442 | 28 | 2 | 2 | L | 28 | Blue/Yellow | 60 | Yellow/Blue | 218 |
| Port-12 1-24 | 11 | S | Blue/Black | 36 | Black/Blue | 443 | 28 | 3 | 3 | M | 28 | Slate/Yellow | 60 | Yellow/Slate | 219 |
| Port-12 1-24 | 12 | S | Orange/Black | 37 | Black/Orange | 444 | 28 | 4 | 4 | N | 28 | Brown/Violet | 60 | Violet/Brown | 220 |
| Port-12 1-24 | 13 | S | Green/Black | 38 | Black/Green | 445 | 28 | 5 | 5 | P | 28 | Brown/White | 60 | White/Brown | 221 |
| Port-12 1-24 | 14 | S | Brown/Black | 39 | Black/Brown | 446 | 28 | 6 | 6 | Q | 28 | Green/Red | 60 | Red/Green | 222 |
| Port-12 1-24 | 15 | S | Slate/Black | 40 | Black/Slate | 447 | 28 | 7 | 7 | R | 28 | Orange/Black | 60 | Black/Orange | 223 |
| Port-12 1-24 | 16 | S | Blue/Yellow | 41 | Yellow/Blue | 448 | 28 | 8 | 8 | S | 28 | Blue/Yellow | 60 | Yellow/Blue | 224 |
| Port-12 1-24 | 17 | S | Orange/Yellow | 42 | Yellow/Orange | 449 | 1 | 1 | 1 | S | 1 | Orange/Yellow | 33 | Yellow/Orange | 1 |
| Port-12 1-24 | 18 | S | Green/Yellow | 43 | Yellow/Green | 450 | 1 | 2 | 2 | T | 1 | Blue/Violet | 33 | Violet/Blue | 2 |
| Port-12 1-24 | 19 | S | Brown/Yellow | 44 | Yellow/Brown | 451 | 1 | 3 | 3 | V | 1 | Blue/White | 33 | White/Blue | 3 |
| Port-12 1-24 | 20 | S | Slate/Yellow | 45 | Yellow/Slate | 452 | 1 | 4 | 4 | W | 1 | Slate/White | 33 | White/Slate | 4 |
| Port-12 1-24 | 21 | S | Blue/Violet | 46 | Violet/Blue | 453 | 1 | 5 | 5 | X | 1 | Brown/Red | 33 | Red/Brown | 5 |
| Port-12 1-24 | 22 | S | Orange/Violet | 47 | Violet/Orange | 454 | 1 | 6 | 6 | Y | 1 | Green/Black | 33 | Black/Green | 6 |
| Port-12 1-24 | 23 | S | Green/Violet | 48 | Violet/Green | 455 | 1 | 7 | 7 | Z | 1 | Orange/Yellow | 33 | Yellow/Orange | 7 |
| Port-12 1-24 | 24 | S | Brown/Violet | 49 | Violet/Brown | 456 | 1 | 8 | 8 | AA | 1 | Blue/Violet | 33 | Violet/Blue | 8 |

| | | | | | | | | | | | | |
|---|---|---|---|---|---|---|---|---|---|---|---|---|
| Port-12 25-48 | 1 | T | Blue/White | 26 | White/Blue | 457 | 2 | 1 | 1 | S | 2 | Green/Yellow | 34 | Yellow/Green | 9 |
| Port-12 25-48 | 2 | T | Orange/White | 27 | White/Orange | 458 | 2 | 2 | 2 | T | 2 | Orange/Violet | 34 | Violet/Orange | 10 |
| Port-12 25-48 | 3 | T | Green/White | 28 | White/Green | 459 | 2 | 3 | 3 | V | 2 | Orange/White | 34 | White/Orange | 11 |
| Port-12 25-48 | 4 | T | Brown/White | 29 | White/Brown | 460 | 2 | 4 | 4 | W | 2 | Blue/Red | 34 | Red/Blue | 12 |
| Port-12 25-48 | 5 | T | Slate/White | 30 | White/Slate | 461 | 2 | 5 | 5 | X | 2 | Slate/Red | 34 | Red/Slate | 13 |
| Port-12 25-48 | 6 | T | Blue/Red | 31 | Red/Blue | 462 | 2 | 6 | 6 | Y | 2 | Brown/Black | 34 | Black/Brown | 14 |
| Port-12 25-48 | 7 | T | Orange/Red | 32 | Red/Orange | 463 | 2 | 7 | 7 | Z | 2 | Green/Yellow | 34 | Yellow/Green | 15 |
| Port-12 25-48 | 8 | T | Green/Red | 33 | Red/Green | 464 | 2 | 8 | 8 | AA | 2 | Orange/Violet | 34 | Violet/Orange | 16 |
| Port-12 25-48 | 9 | T | Brown/Red | 34 | Red/Brown | 465 | 3 | 1 | 1 | S | 3 | Brown/Yellow | 35 | Yellow/Brown | 17 |
| Port-12 25-48 | 10 | T | Slate/Red | 35 | Red/Slate | 466 | 3 | 2 | 2 | T | 3 | Green/Violet | 35 | Violet/Green | 18 |
| Port-12 25-48 | 11 | T | Blue/Black | 36 | Black/Blue | 467 | 3 | 3 | 3 | V | 3 | Green/White | 35 | White/Green | 19 |
| Port-12 25-48 | 12 | T | Orange/Black | 37 | Black/Orange | 468 | 3 | 4 | 4 | W | 3 | Orange/Red | 35 | Red/Orange | 20 |
| Port-12 25-48 | 13 | T | Green/Black | 38 | Black/Green | 469 | 3 | 5 | 5 | X | 3 | Blue/Blue | 35 | Black/Blue | 21 |
| Port-12 25-48 | 14 | T | Brown/Black | 39 | Black/Brown | 470 | 3 | 6 | 6 | Y | 3 | Slate/Black | 35 | Black/Slate | 22 |
| Port-12 25-48 | 15 | T | Slate/Black | 40 | Black/Slate | 471 | 3 | 7 | 7 | Z | 3 | Brown/Yellow | 35 | Yellow/Brown | 23 |
| Port-12 25-48 | 16 | T | Blue/Yellow | 41 | Yellow/Blue | 472 | 3 | 8 | 8 | AA | 3 | Green/Violet | 35 | Violet/Green | 24 |
| Port-12 25-48 | 17 | T | Orange/Yellow | 42 | Yellow/Orange | 473 | 4 | 1 | 1 | S | 4 | Slate/Yellow | 36 | Yellow/Slate | 25 |
| Port-12 25-48 | 18 | T | Green/Yellow | 43 | Yellow/Green | 474 | 4 | 2 | 2 | T | 4 | Brown/Violet | 36 | Violet/Brown | 26 |
| Port-12 25-48 | 19 | T | Brown/Yellow | 44 | Yellow/Brown | 475 | 4 | 3 | 3 | V | 4 | Brown/White | 36 | White/Brown | 27 |
| Port-12 25-48 | 20 | T | Slate/Yellow | 45 | Yellow/Slate | 476 | 4 | 4 | 4 | W | 4 | Green/Red | 36 | Red/Green | 28 |
| Port-12 25-48 | 21 | T | Blue/Violet | 46 | Violet/Blue | 477 | 4 | 5 | 5 | X | 4 | Orange/Black | 36 | Black/Orange | 29 |
| Port-12 25-48 | 22 | T | Orange/Violet | 47 | Violet/Orange | 478 | 4 | 6 | 6 | Y | 4 | Blue/Yellow | 36 | Yellow/Blue | 30 |
| Port-12 25-48 | 23 | T | Green/Violet | 48 | Violet/Green | 479 | 4 | 7 | 7 | Z | 4 | Slate/Yellow | 36 | Yellow/Slate | 31 |
| Port-12 25-48 | 24 | T | Brown/Violet | 49 | Violet/Brown | 480 | 4 | 8 | 8 | AA | 4 | Brown/Violet | 36 | Violet/Brown | 32 |

Figure 3 (cont.)

| | | | | | | | | | | | | |
|---|---|---|---|---|---|---|---|---|---|---|---|---|
| Port-13 1-24 | 1 | U | Blue/White | 26 | White/Blue | | 5 | 1 | 1 | S | 5 | Blue/Violet | 37 | Violet/Blue | 33 |
| Port-13 1-24 | 2 | U | Orange/White | 27 | White/Orange | | 5 | 2 | 2 | U | 5 | Blue/White | 37 | White/Blue | 34 |
| Port-13 1-24 | 3 | U | Green/White | 28 | White/Green | | 5 | 3 | 3 | V | 5 | Slate/White | 37 | White/Slate | 35 |
| Port-13 1-24 | 4 | U | Brown/White | 29 | White/Brown | | 5 | 4 | 4 | W | 5 | Brown/Red | 37 | Red/Brown | 36 |
| Port-13 1-24 | 5 | U | Slate/White | 30 | White/Slate | | 5 | 5 | 5 | X | 5 | Green/Black | 37 | Black/Green | 37 |
| Port-13 1-24 | 6 | U | Blue/Red | 31 | Red/Blue | | 5 | 6 | 6 | Y | 5 | Orange/Yellow | 37 | Yellow/Orange | 38 |
| Port-13 1-24 | 7 | U | Orange/Red | 32 | Red/Orange | | 5 | 7 | 7 | Z | 5 | Blue/Violet | 37 | Violet/Blue | 39 |
| Port-13 1-24 | 8 | U | Green/Red | 33 | Red/Green | | 5 | 8 | 8 | BB | 5 | Blue/White | 37 | White/Blue | 40 |
| Port-13 1-24 | 9 | U | Brown/Red | 34 | Red/Brown | | 6 | 1 | 1 | S | 6 | Orange/Violet | 38 | Violet/Orange | 41 |
| Port-13 1-24 | 10 | U | Slate/Red | 35 | Red/Slate | | 6 | 2 | 2 | U | 6 | Orange/White | 38 | White/Orange | 42 |
| Port-13 1-24 | 11 | U | Blue/Black | 36 | Black/Blue | | 6 | 3 | 3 | V | 6 | Blue/Red | 38 | Red/Blue | 43 |
| Port-13 1-24 | 12 | U | Orange/Black | 37 | Black/Orange | | 6 | 4 | 4 | W | 6 | Slate/Red | 38 | Red/Slate | 44 |
| Port-13 1-24 | 13 | U | Green/Black | 38 | Black/Green | | 6 | 5 | 5 | X | 6 | Brown/Black | 38 | Black/Brown | 45 |
| Port-13 1-24 | 14 | U | Brown/Black | 39 | Black/Brown | | 6 | 6 | 6 | Y | 6 | Green/Yellow | 38 | Yellow/Green | 46 |
| Port-13 1-24 | 15 | U | Slate/Black | 40 | Black/Slate | | 6 | 7 | 7 | Z | 6 | Orange/Violet | 38 | Violet/Orange | 47 |
| Port-13 1-24 | 16 | U | Blue/Yellow | 41 | Yellow/Blue | | 6 | 8 | 8 | BB | 6 | Orange/White | 38 | White/Orange | 48 |
| Port-13 1-24 | 17 | U | Orange/Yellow | 42 | Yellow/Orange | | 7 | 1 | 1 | S | 7 | Green/Violet | 39 | Violet/Green | 49 |
| Port-13 1-24 | 18 | U | Green/Yellow | 43 | Yellow/Green | | 7 | 2 | 2 | U | 7 | Green/White | 39 | White/Green | 50 |
| Port-13 1-24 | 19 | U | Brown/Yellow | 44 | Yellow/Brown | | 7 | 3 | 3 | V | 7 | Orange/Red | 39 | Red/Orange | 51 |
| Port-13 1-24 | 20 | U | Slate/Yellow | 45 | Yellow/Slate | | 7 | 4 | 4 | W | 7 | Blue/Black | 39 | Black/Blue | 52 |
| Port-13 1-24 | 21 | U | Blue/Violet | 46 | Violet/Blue | | 7 | 5 | 5 | X | 7 | Slate/Black | 39 | Black/Slate | 53 |
| Port-13 1-24 | 22 | U | Orange/Violet | 47 | Violet/Orange | | 7 | 6 | 6 | Y | 7 | Brown/Yellow | 39 | Yellow/Brown | 54 |
| Port-13 1-24 | 23 | U | Green/Violet | 48 | Violet/Green | | 7 | 7 | 7 | Z | 7 | Green/Violet | 39 | Violet/Green | 55 |
| Port-13 1-24 | 24 | U | Brown/Violet | 49 | Violet/Brown | | 7 | 8 | 8 | BB | 7 | Green/White | 39 | White/Green | 56 |

| 104, 112, 120 | | | | | | | 106, 114, 122 | | | | | | | |
|---|---|---|---|---|---|---|---|---|---|---|---|---|---|---|
| Port-13 25-48 | 1 | V | Blue/White | 26 | White/Blue | 505 | 8 | 1 | 1 | S | 8 | Brown/Violet | 40 | Violet/Brown | 57 |
| Port-13 25-48 | 2 | V | Orange/White | 27 | White/Orange | 506 | 8 | 2 | 2 | U | 8 | Brown/White | 40 | White/Brown | 58 |
| Port-13 25-48 | 3 | V | Green/White | 28 | White/Green | 507 | 8 | 3 | 3 | V | 8 | Green/Red | 40 | Red/Green | 59 |
| Port-13 25-48 | 4 | V | Brown/White | 29 | White/Brown | 508 | 8 | 4 | 4 | W | 8 | Orange/Black | 40 | Black/Orange | 60 |
| Port-13 25-48 | 5 | V | Slate/White | 30 | White/Slate | 509 | 8 | 5 | 5 | X | 8 | Blue/Yellow | 40 | Yellow/Blue | 61 |
| Port-13 25-48 | 6 | V | Blue/Red | 31 | Red/Blue | 510 | 8 | 6 | 6 | Y | 8 | Slate/Yellow | 40 | Yellow/Slate | 62 |
| Port-13 25-48 | 7 | V | Orange/Red | 32 | Red/Orange | 511 | 8 | 7 | 7 | Z | 8 | Brown/Violet | 40 | Violet/Brown | 63 |
| Port-13 25-48 | 8 | V | Green/Red | 33 | Red/Green | 512 | 8 | 8 | 8 | BB | 8 | Brown/White | 40 | White/Brown | 64 |
| Port-13 25-48 | 9 | V | Brown/Red | 34 | Red/Brown | 513 | 9 | 1 | 1 | T | 8 | Blue/White | 41 | White/Blue | 65 |
| Port-13 25-48 | 10 | V | Slate/Red | 35 | Red/Slate | 514 | 9 | 2 | 2 | U | 9 | Slate/White | 41 | White/Slate | 66 |
| Port-13 25-48 | 11 | V | Blue/Black | 36 | Black/Blue | 515 | 9 | 3 | 3 | V | 9 | Brown/Red | 41 | Red/Brown | 67 |
| Port-13 25-48 | 12 | V | Orange/Black | 37 | Black/Orange | 516 | 9 | 4 | 4 | W | 9 | Green/Black | 41 | Black/Green | 68 |
| Port-13 25-48 | 13 | V | Green/Black | 38 | Black/Green | 517 | 9 | 5 | 5 | X | 9 | Orange/Yellow | 41 | Yellow/Orange | 69 |
| Port-13 25-48 | 14 | V | Brown/Black | 39 | Black/Brown | 518 | 9 | 6 | 6 | Y | 9 | Blue/Violet | 41 | Violet/Blue | 70 |
| Port-13 25-48 | 15 | V | Slate/Black | 40 | Black/Slate | 519 | 9 | 7 | 7 | AA | 9 | Blue/White | 41 | White/Blue | 71 |
| Port-13 25-48 | 16 | V | Blue/Yellow | 41 | Yellow/Blue | 520 | 9 | 8 | 8 | BB | 9 | Slate/White | 41 | White/Slate | 72 |
| Port-13 25-48 | 17 | V | Orange/Yellow | 42 | Yellow/Orange | 521 | 10 | 1 | 1 | T | 10 | Orange/White | 42 | White/Orange | 73 |
| Port-13 25-48 | 18 | V | Green/Yellow | 43 | Yellow/Green | 522 | 10 | 2 | 2 | U | 10 | Blue/Red | 42 | Red/Blue | 74 |
| Port-13 25-48 | 19 | V | Brown/Yellow | 44 | Yellow/Brown | 523 | 10 | 3 | 3 | V | 10 | Slate/Red | 42 | Red/Slate | 75 |
| Port-13 25-48 | 20 | V | Slate/Yellow | 45 | Yellow/Slate | 524 | 10 | 4 | 4 | W | 10 | Brown/Black | 42 | Black/Brown | 76 |
| Port-13 25-48 | 21 | V | Blue/Violet | 46 | Violet/Blue | 525 | 10 | 5 | 5 | X | 10 | Green/Yellow | 42 | Yellow/Green | 77 |
| Port-13 25-48 | 22 | V | Orange/Violet | 47 | Violet/Orange | 526 | 10 | 6 | 6 | Y | 10 | Orange/Violet | 42 | Violet/Orange | 78 |
| Port-13 25-48 | 23 | V | Green/Violet | 48 | Violet/Green | 527 | 10 | 7 | 7 | AA | 10 | Orange/White | 42 | White/Orange | 79 |
| Port-13 25-48 | 24 | V | Brown/Violet | 49 | Violet/Brown | 528 | 10 | 8 | 8 | BB | 10 | Blue/Red | 42 | Red/Blue | 80 |

Figure 3 (cont.)

| | | | | | | | | | | | | | |
|---|---|---|---|---|---|---|---|---|---|---|---|---|---|
| Port-14 1-24 | 1 | W | Blue/White | 26 | White/Blue | 529 | 11 | 1 | 1 | T | 11 | Green/White | 43 | White/Green | 81 |
| Port-14 1-24 | 2 | W | Orange/White | 27 | White/Orange | 530 | 11 | 2 | 2 | U | 11 | Orange/Red | 43 | Red/Orange | 82 |
| Port-14 1-24 | 3 | W | Green/White | 28 | White/Green | 531 | 11 | 3 | 3 | V | 11 | Blue/Black | 43 | Black/Blue | 83 |
| Port-14 1-24 | 4 | W | Brown/White | 29 | White/Brown | 532 | 11 | 4 | 4 | W | 11 | Slate/Black | 43 | Black/Slate | 84 |
| Port-14 1-24 | 5 | W | Slate/White | 30 | White/Slate | 533 | 11 | 5 | 5 | X | 11 | Brown/Yellow | 43 | Yellow/Brown | 85 |
| Port-14 1-24 | 6 | W | Blue/Red | 31 | Red/Blue | 534 | 11 | 6 | 6 | Y | 11 | Green/Violet | 43 | Violet/Green | 86 |
| Port-14 1-24 | 7 | W | Orange/Red | 32 | Red/Orange | 535 | 11 | 7 | 7 | AA | 11 | Green/White | 43 | White/Green | 87 |
| Port-14 1-24 | 8 | W | Green/Red | 33 | Red/Green | 536 | 11 | 8 | 8 | BB | 11 | Orange/Red | 43 | Red/Orange | 88 |
| Port-14 1-24 | 9 | W | Brown/Red | 34 | Red/Brown | 537 | 12 | 1 | 1 | T | 12 | Brown/White | 44 | White/Brown | 89 |
| Port-14 1-24 | 10 | W | Slate/Red | 35 | Red/Slate | 538 | 12 | 2 | 2 | U | 12 | Green/Red | 44 | Red/Green | 90 |
| Port-14 1-24 | 11 | W | Blue/Black | 36 | Black/Blue | 539 | 12 | 3 | 3 | V | 12 | Orange/Black | 44 | Black/Orange | 91 |
| Port-14 1-24 | 12 | W | Orange/Black | 37 | Black/Orange | 540 | 12 | 4 | 4 | W | 12 | Blue/Yellow | 44 | Yellow/Blue | 92 |
| Port-14 1-24 | 13 | W | Green/Black | 38 | Black/Green | 541 | 12 | 5 | 5 | X | 12 | Slate/Yellow | 44 | Yellow/Slate | 93 |
| Port-14 1-24 | 14 | W | Brown/Black | 39 | Black/Brown | 542 | 12 | 6 | 6 | Y | 12 | Brown/Violet | 44 | Violet/Brown | 94 |
| Port-14 1-24 | 15 | W | Slate/Black | 40 | Black/Slate | 543 | 12 | 7 | 7 | AA | 12 | Brown/White | 44 | White/Brown | 95 |
| Port-14 1-24 | 16 | W | Blue/Yellow | 41 | Yellow/Blue | 544 | 12 | 8 | 8 | BB | 12 | Green/Red | 44 | Red/Green | 96 |
| Port-14 1-24 | 17 | W | Orange/Yellow | 42 | Yellow/Orange | 545 | 13 | 1 | 1 | T | 13 | Slate/White | 45 | White/Slate | 97 |
| Port-14 1-24 | 18 | W | Green/Yellow | 43 | Yellow/Green | 546 | 13 | 2 | 2 | U | 13 | Brown/Red | 45 | Red/Brown | 98 |
| Port-14 1-24 | 19 | W | Brown/Yellow | 44 | Yellow/Brown | 547 | 13 | 3 | 3 | V | 13 | Green/Black | 45 | Black/Green | 99 |
| Port-14 1-24 | 20 | W | Slate/Yellow | 45 | Yellow/Slate | 548 | 13 | 4 | 4 | W | 13 | Orange/Yellow | 45 | Yellow/Orange | 100 |
| Port-14 1-24 | 21 | W | Blue/Violet | 46 | Violet/Blue | 549 | 13 | 5 | 5 | X | 13 | Blue/Violet | 45 | Violet/Blue | 101 |
| Port-14 1-24 | 22 | W | Orange/Violet | 47 | Violet/Orange | 550 | 13 | 6 | 6 | Z | 13 | Blue/White | 45 | White/Blue | 102 |
| Port-14 1-24 | 23 | W | Green/Violet | 48 | Violet/Green | 551 | 13 | 7 | 7 | AA | 13 | Slate/White | 45 | White/Slate | 103 |
| Port-14 1-24 | 24 | W | Brown/Violet | 49 | Violet/Brown | 552 | 13 | 8 | 8 | BB | 13 | Brown/Red | 45 | Red/Brown | 104 |

| Port | # | X | Color | # |
|---|---|---|---|---|
| Port-14 25-48 | 1 | X | Blue/White | 26 |
| Port-14 25-48 | 2 | X | Orange/White | 27 |
| Port-14 25-48 | 3 | X | Green/White | 28 |
| Port-14 25-48 | 4 | X | Brown/White | 29 |
| Port-14 25-48 | 5 | X | Slate/White | 30 |
| Port-14 25-48 | 6 | X | Blue/Red | 31 |
| Port-14 25-48 | 7 | X | Orange/Red | 32 |
| Port-14 25-48 | 8 | X | Green/Red | 33 |
| Port-14 25-48 | 9 | X | Brown/Red | 34 |
| Port-14 25-48 | 10 | X | Slate/Red | 35 |
| Port-14 25-48 | 11 | X | Blue/Black | 36 |
| Port-14 25-48 | 12 | X | Orange/Black | 37 |
| Port-14 25-48 | 13 | X | Green/Black | 38 |
| Port-14 25-48 | 14 | X | Brown/Black | 39 |
| Port-14 25-48 | 15 | X | Slate/Black | 40 |
| Port-14 25-48 | 16 | X | Blue/Yellow | 41 |
| Port-14 25-48 | 17 | X | Orange/Yellow | 42 |
| Port-14 25-48 | 18 | X | Green/Yellow | 43 |
| Port-14 25-48 | 19 | X | Brown/Yellow | 44 |
| Port-14 25-48 | 20 | X | Slate/Yellow | 45 |
| Port-14 25-48 | 21 | X | Blue/Violet | 46 |
| Port-14 25-48 | 22 | X | Orange/Violet | 47 |
| Port-14 25-48 | 23 | X | Green/Violet | 48 |
| Port-14 25-48 | 24 | X | Brown/Violet | 49 |

| # | Color | # |
|---|---|---|
| 553 | White/Blue | |
| 554 | White/Orange | |
| 555 | White/Green | |
| 556 | White/Brown | |
| 557 | White/Slate | |
| 558 | Red/Blue | |
| 559 | Red/Orange | |
| 560 | Red/Green | |
| 561 | Red/Brown | |
| 562 | Red/Slate | |
| 563 | Black/Blue | |
| 564 | Black/Orange | |
| 565 | Black/Green | |
| 566 | Black/Brown | |
| 567 | Black/Slate | |
| 568 | Yellow/Blue | |
| 569 | Yellow/Orange | |
| 570 | Yellow/Green | |
| 571 | Yellow/Brown | |
| 572 | Yellow/Slate | |
| 573 | Violet/Blue | |
| 574 | Violet/Orange | |
| 575 | Violet/Green | |
| 576 | Violet/Brown | |

106, 114, 122 →

| | | | | | | | Color | # |
|---|---|---|---|---|---|---|---|---|
| 14 | 1 | 1 | T | 14 | Blue/Red | 46 | Red/Blue | 105 |
| 14 | 2 | 2 | U | 14 | Slate/Red | 46 | Red/Slate | 106 |
| 14 | 3 | 3 | V | 14 | Brown/Black | 46 | Black/Brown | 107 |
| 14 | 4 | 4 | W | 14 | Green/Yellow | 46 | Yellow/Green | 108 |
| 14 | 5 | 5 | X | 14 | Orange/Violet | 46 | Violet/Orange | 109 |
| 14 | 6 | 6 | Z | 14 | Orange/White | 46 | White/Orange | 110 |
| 14 | 7 | 7 | AA | 14 | Blue/Red | 46 | Red/Blue | 111 |
| 14 | 8 | 8 | BB | 14 | Slate/Red | 46 | Red/Slate | 112 |
| 15 | 1 | 1 | T | 15 | Orange/Red | 47 | Red/Orange | 113 |
| 15 | 2 | 2 | U | 15 | Blue/Black | 47 | Black/Blue | 114 |
| 15 | 3 | 3 | V | 15 | Slate/Black | 47 | Black/Slate | 115 |
| 15 | 4 | 4 | W | 15 | Brown/Yellow | 47 | Yellow/Brown | 116 |
| 15 | 5 | 5 | X | 15 | Green/Violet | 47 | Violet/Green | 117 |
| 15 | 6 | 6 | Z | 15 | Green/White | 47 | White/Green | 118 |
| 15 | 7 | 7 | AA | 15 | Orange/Red | 47 | Red/Orange | 119 |
| 15 | 8 | 8 | BB | 15 | Blue/Black | 47 | Black/Blue | 120 |
| 16 | 1 | 1 | T | 16 | Green/Red | 48 | Red/Green | 121 |
| 16 | 2 | 2 | U | 16 | Orange/Black | 48 | Black/Orange | 122 |
| 16 | 3 | 3 | V | 16 | Blue/Yellow | 48 | Yellow/Blue | 123 |
| 16 | 4 | 4 | W | 16 | Slate/Yellow | 48 | Yellow/Slate | 124 |
| 16 | 5 | 5 | X | 16 | Brown/Violet | 48 | Violet/Brown | 125 |
| 16 | 6 | 6 | Z | 16 | Brown/White | 48 | White/Brown | 126 |
| 16 | 7 | 7 | AA | 16 | Green/Red | 48 | Red/Green | 127 |
| 16 | 8 | 8 | BB | 16 | Orange/Black | 48 | Black/Orange | 128 |

Figure 3 (cont.)

| | | | | | | | | | | | |
|---|---|---|---|---|---|---|---|---|---|---|---|
| Port-15 1-24 | 1 | Y | Blue/White | 26 | White/Blue | 577 | 17 | 1 | T | 17 | Brown/Red | 49 | Red/Brown | 129 |
| Port-15 1-24 | 2 | Y | Orange/White | 27 | White/Orange | 578 | 17 | 2 | U | 17 | Green/Black | 49 | Black/Green | 130 |
| Port-15 1-24 | 3 | Y | Green/White | 28 | White/Green | 579 | 17 | 3 | V | 17 | Orange/Yellow | 49 | Yellow/Orange | 131 |
| Port-15 1-24 | 4 | Y | Brown/White | 29 | White/Brown | 580 | 17 | 4 | W | 17 | Blue/Violet | 49 | Violet/Blue | 132 |
| Port-15 1-24 | 5 | Y | Slate/White | 30 | White/Slate | 581 | 17 | 5 | Y | 17 | Blue/White | 49 | White/Blue | 133 |
| Port-15 1-24 | 6 | Y | Blue/Red | 31 | Red/Blue | 582 | 17 | 6 | Z | 17 | Slate/White | 49 | White/Slate | 134 |
| Port-15 1-24 | 7 | Y | Orange/Red | 32 | Red/Orange | 583 | 17 | 7 | AA | 17 | Brown/Red | 49 | Red/Brown | 135 |
| Port-15 1-24 | 8 | Y | Green/Red | 33 | Red/Green | 584 | 17 | 8 | BB | 17 | Green/Black | 49 | Black/Green | 136 |
| Port-15 1-24 | 9 | Y | Brown/Red | 34 | Red/Brown | 585 | 18 | 1 | T | 18 | Slate/Red | 50 | Red/Slate | 137 |
| Port-15 1-24 | 10 | Y | Slate/Red | 35 | Red/Slate | 586 | 18 | 2 | U | 18 | Brown/Black | 50 | Black/Brown | 138 |
| Port-15 1-24 | 11 | Y | Blue/Black | 36 | Black/Blue | 587 | 18 | 3 | V | 18 | Green/Yellow | 50 | Yellow/Green | 139 |
| Port-15 1-24 | 12 | Y | Orange/Black | 37 | Black/Orange | 588 | 18 | 4 | W | 18 | Orange/Violet | 50 | Violet/Orange | 140 |
| Port-15 1-24 | 13 | Y | Green/Black | 38 | Black/Green | 589 | 18 | 5 | Y | 18 | Orange/White | 50 | White/Orange | 141 |
| Port-15 1-24 | 14 | Y | Brown/Black | 39 | Black/Brown | 590 | 18 | 6 | Z | 18 | Blue/Red | 50 | Red/Blue | 142 |
| Port-15 1-24 | 15 | Y | Slate/Black | 40 | Black/Slate | 591 | 18 | 7 | AA | 18 | Slate/Red | 50 | Red/Slate | 143 |
| Port-15 1-24 | 16 | Y | Blue/Yellow | 41 | Yellow/Blue | 592 | 18 | 8 | BB | 18 | Brown/Black | 50 | Black/Brown | 144 |
| Port-15 1-24 | 17 | Y | Orange/Yellow | 42 | Yellow/Orange | 593 | 19 | 1 | T | 19 | Blue/Black | 51 | Black/Blue | 145 |
| Port-15 1-24 | 18 | Y | Green/Yellow | 43 | Yellow/Green | 594 | 19 | 2 | U | 19 | Slate/Black | 51 | Black/Slate | 146 |
| Port-15 1-24 | 19 | Y | Brown/Yellow | 44 | Yellow/Brown | 595 | 19 | 3 | V | 19 | Brown/Yellow | 51 | Yellow/Brown | 147 |
| Port-15 1-24 | 20 | Y | Slate/Yellow | 45 | Yellow/Slate | 596 | 19 | 4 | W | 19 | Green/Violet | 51 | Violet/Green | 148 |
| Port-15 1-24 | 21 | Y | Blue/Violet | 46 | Violet/Blue | 597 | 19 | 5 | Y | 19 | Green/White | 51 | White/Green | 149 |
| Port-15 1-24 | 22 | Y | Orange/Violet | 47 | Violet/Orange | 598 | 19 | 6 | Z | 19 | Orange/Red | 51 | Red/Orange | 150 |
| Port-15 1-24 | 23 | Y | Green/Violet | 48 | Violet/Green | 599 | 19 | 7 | AA | 19 | Blue/Black | 51 | Black/Blue | 151 |
| Port-15 1-24 | 24 | Y | Brown/Violet | 49 | Violet/Brown | 600 | 19 | 8 | BB | 19 | Slate/Black | 51 | Black/Slate | 152 |

| Port | # | | Color | # |
|---|---|---|---|---|
| Port-15 25-48 | 1 | N | Blue/White | 601 |
| Port-15 25-48 | 2 | N | Orange/White | 602 |
| Port-15 25-48 | 3 | N | Green/White | 603 |
| Port-15 25-48 | 4 | N | Brown/White | 604 |
| Port-15 25-48 | 5 | N | Slate/White | 605 |
| Port-15 25-48 | 6 | N | Blue/Red | 606 |
| Port-15 25-48 | 7 | N | Orange/Red | 607 |
| Port-15 25-48 | 8 | N | Green/Red | 608 |
| Port-15 25-48 | 9 | N | Brown/Red | 609 |
| Port-15 25-48 | 10 | N | Slate/Red | 610 |
| Port-15 25-48 | 11 | N | Blue/Black | 611 |
| Port-15 25-48 | 12 | N | Orange/Black | 612 |
| Port-15 25-48 | 13 | N | Green/Black | 613 |
| Port-15 25-48 | 14 | N | Brown/Black | 614 |
| Port-15 25-48 | 15 | N | Slate/Black | 615 |
| Port-15 25-48 | 16 | N | Blue/Yellow | 616 |
| Port-15 25-48 | 17 | N | Orange/Yellow | 617 |
| Port-15 25-48 | 18 | N | Green/Yellow | 618 |
| Port-15 25-48 | 19 | N | Brown/Yellow | 619 |
| Port-15 25-48 | 20 | N | Slate/Yellow | 620 |
| Port-15 25-48 | 21 | N | Blue/Violet | 621 |
| Port-15 25-48 | 22 | N | Orange/Violet | 622 |
| Port-15 25-48 | 23 | N | Green/Violet | 623 |
| Port-15 25-48 | 24 | N | Brown/Violet | 624 |

106, 114, 122:

| # | # | # | L | # | Color | # | Color | # |
|---|---|---|---|---|---|---|---|---|
| 20 | 1 | 1 | T | 20 | Orange/Black | 52 | Black/Orange | 153 |
| 20 | 2 | 2 | U | 20 | Blue/Yellow | 52 | Yellow/Blue | 154 |
| 20 | 3 | 3 | V | 20 | Slate/Yellow | 52 | Yellow/Slate | 155 |
| 20 | 4 | 4 | W | 20 | Brown/Violet | 52 | Violet/Brown | 156 |
| 20 | 5 | 5 | Y | 20 | Brown/White | 52 | White/Brown | 157 |
| 20 | 6 | 6 | Z | 20 | Green/Red | 52 | Red/Green | 158 |
| 20 | 7 | 7 | AA | 20 | Orange/Black | 52 | Black/Orange | 159 |
| 20 | 8 | 8 | BB | 20 | Blue/Yellow | 52 | Yellow/Blue | 160 |
| 21 | 1 | 1 | T | 21 | Green/Black | 53 | Black/Green | 161 |
| 21 | 2 | 2 | U | 21 | Orange/Yellow | 53 | Yellow/Orange | 162 |
| 21 | 3 | 3 | V | 21 | Blue/Violet | 53 | Violet/Blue | 163 |
| 21 | 4 | 4 | X | 21 | Blue/White | 53 | White/Blue | 164 |
| 21 | 5 | 5 | Y | 21 | Slate/White | 53 | White/Slate | 165 |
| 21 | 6 | 6 | Z | 21 | Brown/Red | 53 | Red/Brown | 166 |
| 21 | 7 | 7 | AA | 21 | Green/Black | 53 | Black/Green | 167 |
| 21 | 8 | 8 | BB | 21 | Orange/Yellow | 53 | Yellow/Orange | 168 |
| 22 | 1 | 1 | T | 22 | Brown/Black | 54 | Black/Brown | 169 |
| 22 | 2 | 2 | U | 22 | Green/Yellow | 54 | Yellow/Green | 170 |
| 22 | 3 | 3 | V | 22 | Orange/Violet | 54 | Violet/Orange | 171 |
| 22 | 4 | 4 | X | 22 | Orange/White | 54 | White/Orange | 172 |
| 22 | 5 | 5 | Y | 22 | Blue/Red | 54 | Red/Blue | 173 |
| 22 | 6 | 6 | Z | 22 | Slate/Red | 54 | Red/Slate | 174 |
| 22 | 7 | 7 | AA | 22 | Brown/Black | 54 | Black/Brown | 175 |
| 22 | 8 | 8 | BB | 22 | Green/Yellow | 54 | Yellow/Green | 176 |

Figure 3 (cont.)

| | | | | | | | | | | | |
|---|---|---|---|---|---|---|---|---|---|---|---|
| Port-16 1-24 | 1 | AA | Blue/White | 26 | White/Blue | 625 | | | | 23 | T | 23 | Slate/Black | 55 | Black/Slate | 177 |
| Port-16 1-24 | 2 | AA | Orange/White | 27 | White/Orange | 626 | | | | 23 | U | 23 | Brown/Yellow | 55 | Yellow/Brown | 178 |
| Port-16 1-24 | 3 | AA | Green/White | 28 | White/Green | 627 | | | | 23 | V | 23 | Green/Violet | 55 | Violet/Green | 179 |
| Port-16 1-24 | 4 | AA | Brown/White | 29 | White/Brown | 628 | | | | 23 | X | 23 | Green/White | 55 | White/Green | 180 |
| Port-16 1-24 | 5 | AA | Slate/White | 30 | White/Slate | 629 | | | | 23 | Y | 23 | Orange/Red | 55 | Red/Orange | 181 |
| Port-16 1-24 | 6 | AA | Blue/Red | 31 | Red/Blue | 630 | | | | 23 | Z | 23 | Blue/Black | 55 | Black/Blue | 182 |
| Port-16 1-24 | 7 | AA | Orange/Red | 32 | Red/Orange | 631 | | | | 23 | AA | 23 | Slate/Black | 55 | Black/Slate | 183 |
| Port-16 1-24 | 8 | AA | Green/Red | 33 | Red/Green | 632 | | | | 23 | BB | 23 | Brown/Yellow | 55 | Yellow/Brown | 184 |
| Port-16 1-24 | 9 | AA | Brown/Red | 34 | Red/Brown | 633 | | | | 24 | T | 24 | Blue/Yellow | 56 | Yellow/Blue | 185 |
| Port-16 1-24 | 10 | AA | Slate/Red | 35 | Red/Slate | 634 | | | | 24 | U | 24 | Slate/Yellow | 56 | Yellow/Slate | 186 |
| Port-16 1-24 | 11 | AA | Blue/Black | 36 | Black/Blue | 635 | | | | 24 | V | 24 | Brown/Violet | 56 | Violet/Brown | 187 |
| Port-16 1-24 | 12 | AA | Orange/Black | 37 | Black/Orange | 636 | | | | 24 | X | 24 | Brown/White | 56 | White/Brown | 188 |
| Port-16 1-24 | 13 | AA | Green/Black | 38 | Black/Green | 637 | | | | 24 | Y | 24 | Green/Red | 56 | Red/Green | 189 |
| Port-16 1-24 | 14 | AA | Brown/Black | 39 | Black/Brown | 638 | | | | 24 | Z | 24 | Orange/Black | 56 | Black/Orange | 190 |
| Port-16 1-24 | 15 | AA | Slate/Black | 40 | Black/Slate | 639 | | | | 24 | AA | 24 | Blue/Yellow | 56 | Yellow/Blue | 191 |
| Port-16 1-24 | 16 | AA | Blue/Yellow | 41 | Yellow/Blue | 640 | | | | 24 | BB | 24 | Slate/Yellow | 56 | Yellow/Slate | 192 |
| Port-16 1-24 | 17 | AA | Orange/Yellow | 42 | Yellow/Orange | 641 | | | | 25 | T | 25 | Orange/Yellow | 57 | Yellow/Orange | 193 |
| Port-16 1-24 | 18 | AA | Green/Yellow | 43 | Yellow/Green | 642 | | | | 25 | U | 25 | Blue/Violet | 57 | Violet/Blue | 194 |
| Port-16 1-24 | 19 | AA | Brown/Yellow | 44 | Yellow/Brown | 643 | | | | 25 | W | 25 | Blue/White | 57 | White/Blue | 195 |
| Port-16 1-24 | 20 | AA | Slate/Yellow | 45 | Yellow/Slate | 644 | | | | 25 | X | 25 | Slate/White | 57 | White/Slate | 196 |
| Port-16 1-24 | 21 | AA | Blue/Violet | 46 | Violet/Blue | 645 | | | | 25 | Y | 25 | Brown/Red | 57 | Red/Brown | 197 |
| Port-16 1-24 | 22 | AA | Orange/Violet | 47 | Violet/Orange | 646 | | | | 25 | Z | 25 | Green/Black | 57 | Black/Green | 198 |
| Port-16 1-24 | 23 | AA | Green/Violet | 48 | Violet/Green | 647 | | | | 25 | AA | 25 | Orange/Yellow | 57 | Yellow/Orange | 199 |
| Port-16 1-24 | 24 | AA | Brown/Violet | 49 | Violet/Brown | 648 | | | | 25 | BB | 25 | Blue/Violet | 57 | Violet/Blue | 200 |

| | | | | | | | | | | | | | | |
|---|---|---|---|---|---|---|---|---|---|---|---|---|---|---|
| Port-16 25-48 | 1 | BB | Blue/White | 26 | White/Blue | 649 | | 26 | 1 | 1 | T | 26 | Green/Yellow | 58 | Yellow/Green | 201 |
| Port-16 25-48 | 2 | BB | Orange/White | 27 | White/Orange | 650 | | 26 | 2 | 2 | U | 26 | Orange/Violet | 58 | Violet/Orange | 202 |
| Port-16 25-48 | 3 | BB | Green/White | 28 | White/Green | 651 | | 26 | 3 | 3 | W | 26 | Orange/White | 58 | White/Orange | 203 |
| Port-16 25-48 | 4 | BB | Brown/White | 29 | White/Brown | 652 | | 26 | 4 | 4 | X | 26 | Blue/Red | 58 | Red/Blue | 204 |
| Port-16 25-48 | 5 | BB | Slate/White | 30 | White/Slate | 653 | | 26 | 5 | 5 | Y | 26 | Slate/Red | 58 | Red/Slate | 205 |
| Port-16 25-48 | 6 | BB | Blue/Red | 31 | Red/Blue | 654 | | 26 | 6 | 6 | Z | 26 | Brown/Black | 58 | Black/Brown | 206 |
| Port-16 25-48 | 7 | BB | Orange/Red | 32 | Red/Orange | 655 | | 26 | 7 | 7 | AA | 26 | Green/Yellow | 58 | Yellow/Green | 207 |
| Port-16 25-48 | 8 | BB | Green/Red | 33 | Red/Green | 656 | | 26 | 8 | 8 | BB | 26 | Orange/Violet | 58 | Violet/Orange | 208 |
| Port-16 25-48 | 9 | BB | Brown/Red | 34 | Red/Brown | 657 | | 27 | 1 | 1 | T | 27 | Brown/Yellow | 59 | Yellow/Brown | 209 |
| Port-16 25-48 | 10 | BB | Slate/Red | 35 | Red/Slate | 658 | | 27 | 2 | 2 | U | 27 | Green/Violet | 59 | Violet/Green | 210 |
| Port-16 25-48 | 11 | BB | Blue/Black | 36 | Black/Blue | 659 | | 27 | 3 | 3 | W | 27 | Green/White | 59 | White/Green | 211 |
| Port-16 25-48 | 12 | BB | Orange/Black | 37 | Black/Orange | 660 | | 27 | 4 | 4 | X | 27 | Orange/Red | 59 | Red/Orange | 212 |
| Port-16 25-48 | 13 | BB | Green/Black | 38 | Black/Green | 661 | | 27 | 5 | 5 | Y | 27 | Blue/Black | 59 | Black/Blue | 213 |
| Port-16 25-48 | 14 | BB | Brown/Black | 39 | Black/Brown | 662 | | 27 | 6 | 6 | Z | 27 | Slate/Black | 59 | Black/Slate | 214 |
| Port-16 25-48 | 15 | BB | Slate/Black | 40 | Black/Slate | 663 | | 27 | 7 | 7 | AA | 27 | Brown/Yellow | 59 | Yellow/Brown | 215 |
| Port-16 25-48 | 16 | BB | Blue/Yellow | 41 | Yellow/Blue | 664 | | 27 | 8 | 8 | BB | 27 | Green/Violet | 59 | Violet/Green | 216 |
| Port-16 25-48 | 17 | BB | Orange/Yellow | 42 | Yellow/Orange | 665 | | 28 | 1 | 1 | T | 28 | Slate/Yellow | 60 | Yellow/Slate | 217 |
| Port-16 25-48 | 18 | BB | Green/Yellow | 43 | Yellow/Green | 666 | | 28 | 2 | 2 | U | 28 | Brown/Violet | 60 | Violet/Brown | 218 |
| Port-16 25-48 | 19 | BB | Brown/Yellow | 44 | Yellow/Brown | 667 | | 28 | 3 | 3 | W | 28 | Brown/White | 60 | White/Brown | 219 |
| Port-16 25-48 | 20 | BB | Slate/Yellow | 45 | Yellow/Slate | 668 | | 28 | 4 | 4 | X | 28 | Green/Red | 60 | Red/Green | 220 |
| Port-16 25-48 | 21 | BB | Blue/Violet | 46 | Violet/Blue | 669 | | 28 | 5 | 5 | Y | 28 | Orange/Black | 60 | Black/Orange | 221 |
| Port-16 25-48 | 22 | BB | Orange/Violet | 47 | Violet/Orange | 670 | | 28 | 6 | 6 | Z | 28 | Blue/Yellow | 60 | Yellow/Blue | 222 |
| Port-16 25-48 | 23 | BB | Green/Violet | 48 | Violet/Green | 671 | | 28 | 7 | 7 | AA | 28 | Slate/Yellow | 60 | Yellow/Slate | 223 |
| Port-16 25-48 | 24 | BB | Brown/Violet | 49 | Violet/Brown | 672 | | 28 | 8 | 8 | BB | 28 | Brown/Violet | 60 | Violet/Brown | 224 |

| Connector | Pins | Cable | Color | Pins | Color | Circuit |
|---|---|---|---|---|---|---|
| Port-1 1-24 | 1 | A | Blue/White | 26 | White/Blue | 1 |
| Port-1 1-24 | 2 | A | Orange/White | 27 | White/Orange | 2 |
| Port-1 1-24 | 3 | A | Green/White | 28 | White/Green | 3 |
| Port-1 1-24 | 4 | A | Brown/White | 29 | White/Brown | 4 |
| Port-1 1-24 | 5 | A | Slate/White | 30 | White/Slate | 5 |
| Port-1 1-24 | 6 | A | Blue/Red | 31 | Red/Blue | 6 |
| Port-1 1-24 | 7 | A | Orange/Red | 32 | Red/Orange | 7 |
| Port-1 1-24 | 8 | A | Green/Red | 33 | Red/Green | 8 |
| Port-1 1-24 | 9 | A | Brown/Red | 34 | Red/Brown | 9 |
| Port-1 1-24 | 10 | A | Slate/Red | 35 | Red/Slate | 10 |
| Port-1 1-24 | 11 | A | Blue/Black | 36 | Black/Blue | 11 |
| Port-1 1-24 | 12 | A | Orange/Black | 37 | Black/Orange | 12 |
| Port-1 1-24 | 13 | A | Green/Black | 38 | Black/Green | 13 |
| Port-1 1-24 | 14 | A | Brown/Black | 39 | Black/Brown | 14 |
| Port-1 1-24 | 15 | A | Slate/Black | 40 | Black/Slate | 15 |
| Port-1 1-24 | 16 | A | Blue/Yellow | 41 | Yellow/Blue | 16 |
| Port-1 1-24 | 17 | A | Orange/Yellow | 42 | Yellow/Orange | 17 |
| Port-1 1-24 | 18 | A | Green/Yellow | 43 | Yellow/Green | 18 |
| Port-1 1-24 | 19 | A | Brown/Yellow | 44 | Yellow/Brown | 19 |
| Port-1 1-24 | 20 | A | Slate/Yellow | 45 | Yellow/Slate | 20 |
| Port-1 1-24 | 21 | A | Blue/Violet | 46 | Violet/Blue | 21 |
| Port-1 1-24 | 22 | A | Orange/Violet | 47 | Violet/Orange | 22 |
| Port-1 1-24 | 23 | A | Green/Violet | 48 | Violet/Green | 23 |
| Port-1 1-24 | 24 | A | Brown/Violet | 49 | Violet/Brown | 24 |

106, 114, 122

| Slot Number | Port | Connector | Cable | Pins | Color | Pins | Color | Circuit |
|---|---|---|---|---|---|---|---|---|
| 1 | 1 | 1 | A | 1 | Blue/White | 33 | White/Blue | 1 |
| 1 | 2 | 2 | A | 1 | Orange/Violet | 33 | Violet/Orange | 2 |
| 1 | 3 | 3 | B | 1 | Brown/Yellow | 33 | Yellow/Brown | 3 |
| 1 | 4 | 4 | C | 1 | Blue/Yellow | 33 | Yellow/Blue | 4 |
| 1 | 5 | 5 | D | 1 | Green/Black | 33 | Black/Green | 5 |
| 1 | 6 | 6 | E | 1 | Slate/Red | 33 | Red/Slate | 6 |
| 1 | 7 | 7 | F | 1 | Orange/Red | 33 | Red/Orange | 7 |
| 1 | 8 | 8 | G | 1 | Brown/White | 33 | White/Brown | 8 |
| 2 | 1 | 1 | A | 2 | Orange/White | 34 | White/Orange | 9 |
| 2 | 2 | 2 | A | 2 | Green/Violet | 34 | Violet/Green | 10 |
| 2 | 3 | 3 | B | 2 | Slate/Yellow | 34 | Yellow/Slate | 11 |
| 2 | 4 | 4 | C | 2 | Orange/Yellow | 34 | Yellow/Orange | 12 |
| 2 | 5 | 5 | D | 2 | Brown/Black | 34 | Black/Brown | 13 |
| 2 | 6 | 6 | E | 2 | Blue/Black | 34 | Black/Blue | 14 |
| 2 | 7 | 7 | F | 2 | Green/Red | 34 | Red/Green | 15 |
| 2 | 8 | 8 | G | 2 | Slate/White | 34 | White/Slate | 16 |
| 3 | 1 | 1 | A | 3 | Green/White | 35 | White/Green | 17 |
| 3 | 2 | 2 | A | 3 | Brown/Violet | 35 | Violet/Brown | 18 |
| 3 | 3 | 3 | B | 3 | Blue/Violet | 35 | Violet/Blue | 19 |
| 3 | 4 | 4 | C | 3 | Green/Yellow | 35 | Yellow/Green | 20 |
| 3 | 5 | 5 | D | 3 | Slate/Black | 35 | Black/Slate | 21 |
| 3 | 6 | 6 | E | 3 | Orange/Black | 35 | Black/Orange | 22 |
| 3 | 7 | 7 | F | 3 | Brown/Red | 35 | Red/Brown | 23 |
| 3 | 8 | 8 | G | 3 | Blue/Red | 35 | Red/Blue | 24 |

| Port | # | B | Color | # |
|---|---|---|---|---|
| Port-1 25-48 | 1 | B | Blue/White | 26 |
| Port-1 25-48 | 2 | B | Orange/White | 27 |
| Port-1 25-48 | 3 | B | Green/White | 28 |
| Port-1 25-48 | 4 | B | Brown/White | 29 |
| Port-1 25-48 | 5 | B | Slate/White | 30 |
| Port-1 25-48 | 6 | B | Blue/Red | 31 |
| Port-1 25-48 | 7 | B | Orange/Red | 32 |
| Port-1 25-48 | 8 | B | Green/Red | 33 |
| Port-1 25-48 | 9 | B | Brown/Red | 34 |
| Port-1 25-48 | 10 | B | Slate/Red | 35 |
| Port-1 25-48 | 11 | B | Blue/Black | 36 |
| Port-1 25-48 | 12 | B | Orange/Black | 37 |
| Port-1 25-48 | 13 | B | Green/Black | 38 |
| Port-1 25-48 | 14 | B | Brown/Black | 39 |
| Port-1 25-48 | 15 | B | Slate/Black | 40 |
| Port-1 25-48 | 16 | B | Blue/Yellow | 41 |
| Port-1 25-48 | 17 | B | Orange/Yellow | 42 |
| Port-1 25-48 | 18 | B | Green/Yellow | 43 |
| Port-1 25-48 | 19 | B | Brown/Yellow | 44 |
| Port-1 25-48 | 20 | B | Slate/Yellow | 45 |
| Port-1 25-48 | 21 | B | Blue/Violet | 46 |
| Port-1 25-48 | 22 | B | Orange/Violet | 47 |
| Port-1 25-48 | 23 | B | Green/Violet | 48 |
| Port-1 25-48 | 24 | B | Brown/Violet | 49 |

106, 114, 122:

| # | # | | # | Color | # | Color | # |
|---|---|---|---|---|---|---|---|
| 4 | 1 | 1 | 4 | Brown/White | 36 | White/Brown | 25 |
| 4 | 2 | 2 | 4 | Blue/White | 36 | White/Blue | 26 |
| 4 | 3 | 3 | 4 | Orange/Violet | 36 | Violet/Orange | 27 |
| 4 | 4 | 4 | 4 | Brown/Yellow | 36 | Yellow/Brown | 28 |
| 4 | 5 | 5 | 4 | Blue/Yellow | 36 | Yellow/Blue | 29 |
| 4 | 6 | 6 | 4 | Green/Black | 36 | Black/Green | 30 |
| 4 | 7 | 7 | 4 | Slate/Red | 36 | Red/Slate | 31 |
| 4 | 8 | 8 | 4 | Orange/Red | 36 | Red/Orange | 32 |
| 5 | 1 | 1 | 5 | Slate/White | 37 | White/Slate | 33 |
| 5 | 2 | 2 | 5 | Orange/White | 37 | White/Orange | 34 |
| 5 | 3 | 3 | 5 | Green/Violet | 37 | Violet/Green | 35 |
| 5 | 4 | 4 | 5 | Slate/Yellow | 37 | Yellow/Slate | 36 |
| 5 | 5 | 5 | 5 | Orange/Yellow | 37 | Yellow/Orange | 37 |
| 5 | 6 | 6 | 5 | Brown/Black | 37 | Black/Brown | 38 |
| 5 | 7 | 7 | 5 | Blue/Black | 37 | Black/Blue | 39 |
| 5 | 8 | 8 | 5 | Green/Red | 37 | Red/Green | 40 |
| 6 | 1 | 1 | 6 | Blue/Red | 38 | Red/Blue | 41 |
| 6 | 2 | 2 | 6 | Green/White | 38 | White/Green | 42 |
| 6 | 3 | 3 | 6 | Brown/Violet | 38 | Violet/Brown | 43 |
| 6 | 4 | 4 | 6 | Blue/Violet | 38 | Violet/Blue | 44 |
| 6 | 5 | 5 | 6 | Green/Yellow | 38 | Yellow/Green | 45 |
| 6 | 6 | 6 | 6 | Slate/Black | 38 | Black/Slate | 46 |
| 6 | 7 | 7 | 6 | Orange/Black | 38 | Black/Orange | 47 |
| 6 | 8 | 8 | 6 | Brown/Red | 38 | Red/Brown | 48 |

| | | | | | |
|---|---|---|---|---|---|
| Port-2 1-24 | 1 | C | Blue/White | 26 | White/Blue | 49 |
| Port-2 1-24 | 2 | C | Orange/White | 27 | White/Orange | 50 |
| Port-2 1-24 | 3 | C | Green/White | 28 | White/Green | 51 |
| Port-2 1-24 | 4 | C | Brown/White | 29 | White/Brown | 52 |
| Port-2 1-24 | 5 | C | Slate/White | 30 | White/Slate | 53 |
| Port-2 1-24 | 6 | C | Blue/Red | 31 | Red/Blue | 54 |
| Port-2 1-24 | 7 | C | Orange/Red | 32 | Red/Orange | 55 |
| Port-2 1-24 | 8 | C | Green/Red | 33 | Red/Green | 56 |
| Port-2 1-24 | 9 | C | Brown/Red | 34 | Red/Brown | 57 |
| Port-2 1-24 | 10 | C | Slate/Red | 35 | Red/Slate | 58 |
| Port-2 1-24 | 11 | C | Blue/Black | 36 | Black/Blue | 59 |
| Port-2 1-24 | 12 | C | Orange/Black | 37 | Black/Orange | 60 |
| Port-2 1-24 | 13 | C | Green/Black | 38 | Black/Green | 61 |
| Port-2 1-24 | 14 | C | Brown/Black | 39 | Black/Brown | 62 |
| Port-2 1-24 | 15 | C | Slate/Black | 40 | Black/Slate | 63 |
| Port-2 1-24 | 16 | C | Blue/Yellow | 41 | Yellow/Blue | 64 |
| Port-2 1-24 | 17 | C | Orange/Yellow | 42 | Yellow/Orange | 65 |
| Port-2 1-24 | 18 | C | Green/Yellow | 43 | Yellow/Green | 66 |
| Port-2 1-24 | 19 | C | Brown/Yellow | 44 | Yellow/Brown | 67 |
| Port-2 1-24 | 20 | C | Slate/Yellow | 45 | Yellow/Slate | 68 |
| Port-2 1-24 | 21 | C | Blue/Violet | 46 | Violet/Blue | 69 |
| Port-2 1-24 | 22 | C | Orange/Violet | 47 | Violet/Orange | 70 |
| Port-2 1-24 | 23 | C | Green/Violet | 48 | Violet/Green | 71 |
| Port-2 1-24 | 24 | C | Brown/Violet | 49 | Violet/Brown | 72 |

104, 112, 120

| | | | | | | | |
|---|---|---|---|---|---|---|---|
| 7 | 1 | 1 | A | 7 | Orange/Red | 39 | Red/Orange | 49 |
| 7 | 2 | 2 | B | 7 | Brown/White | 39 | White/Brown | 50 |
| 7 | 3 | 3 | C | 7 | Blue/White | 39 | White/Blue | 51 |
| 7 | 4 | 4 | C | 7 | Orange/Violet | 39 | Violet/Orange | 52 |
| 7 | 5 | 5 | D | 7 | Brown/Yellow | 39 | Yellow/Brown | 53 |
| 7 | 6 | 6 | E | 7 | Blue/Yellow | 39 | Yellow/Blue | 54 |
| 7 | 7 | 7 | F | 7 | Green/Black | 39 | Black/Green | 55 |
| 7 | 8 | 8 | G | 7 | Slate/Red | 39 | Red/Slate | 56 |
| 8 | 1 | 1 | A | 8 | Green/Red | 40 | Red/Green | 57 |
| 8 | 2 | 2 | B | 8 | Slate/White | 40 | White/Slate | 58 |
| 8 | 3 | 3 | C | 8 | Orange/White | 40 | White/Orange | 59 |
| 8 | 4 | 4 | C | 8 | Green/Violet | 40 | Violet/Green | 60 |
| 8 | 5 | 5 | D | 8 | Slate/Yellow | 40 | Yellow/Slate | 61 |
| 8 | 6 | 6 | E | 8 | Orange/Yellow | 40 | Yellow/Orange | 62 |
| 8 | 7 | 7 | F | 8 | Brown/Black | 40 | Black/Brown | 63 |
| 8 | 8 | 8 | G | 8 | Blue/Black | 40 | Black/Blue | 64 |
| 9 | 1 | 1 | A | 9 | Brown/Red | 41 | Red/Brown | 65 |
| 9 | 2 | 2 | B | 9 | Blue/Red | 41 | Red/Blue | 66 |
| 9 | 3 | 3 | C | 9 | Green/White | 41 | White/Green | 67 |
| 9 | 4 | 4 | C | 9 | Brown/Violet | 41 | Violet/Brown | 68 |
| 9 | 5 | 5 | D | 9 | Blue/Violet | 41 | Violet/Blue | 69 |
| 9 | 6 | 6 | E | 9 | Green/Yellow | 41 | Yellow/Green | 70 |
| 9 | 7 | 7 | F | 9 | Slate/Black | 41 | Black/Slate | 71 |
| 9 | 8 | 8 | G | 9 | Orange/Black | 41 | Black/Orange | 72 |

| | | | | |
|---|---|---|---|---|
| Port-2 25-48 | 1 | D | Blue/White | 26 | White/Blue | 73 |
| Port-2 25-48 | 2 | D | Orange/White | 27 | White/Orange | 74 |
| Port-2 25-48 | 3 | D | Green/White | 28 | White/Green | 75 |
| Port-2 25-48 | 4 | D | Brown/White | 29 | White/Brown | 76 |
| Port-2 25-48 | 5 | D | Slate/White | 30 | White/Slate | 77 |
| Port-2 25-48 | 6 | D | Blue/Red | 31 | Red/Blue | 78 |
| Port-2 25-48 | 7 | D | Orange/Red | 32 | Red/Orange | 79 |
| Port-2 25-48 | 8 | D | Green/Red | 33 | Red/Green | 80 |
| Port-2 25-48 | 9 | D | Brown/Red | 34 | Red/Brown | 81 |
| Port-2 25-48 | 10 | D | Slate/Red | 35 | Red/Slate | 82 |
| Port-2 25-48 | 11 | D | Blue/Black | 36 | Black/Blue | 83 |
| Port-2 25-48 | 12 | D | Orange/Black | 37 | Black/Orange | 84 |
| Port-2 25-48 | 13 | D | Green/Black | 38 | Black/Green | 85 |
| Port-2 25-48 | 14 | D | Brown/Black | 39 | Black/Brown | 86 |
| Port-2 25-48 | 15 | D | Slate/Black | 40 | Black/Slate | 87 |
| Port-2 25-48 | 16 | D | Blue/Yellow | 41 | Yellow/Blue | 88 |
| Port-2 25-48 | 17 | D | Orange/Yellow | 42 | Yellow/Orange | 89 |
| Port-2 25-48 | 18 | D | Green/Yellow | 43 | Yellow/Green | 90 |
| Port-2 25-48 | 19 | D | Brown/Yellow | 44 | Yellow/Brown | 91 |
| Port-2 25-48 | 20 | D | Slate/Yellow | 45 | Yellow/Slate | 92 |
| Port-2 25-48 | 21 | D | Blue/Violet | 46 | Violet/Blue | 93 |
| Port-2 25-48 | 22 | D | Orange/Violet | 47 | Violet/Orange | 94 |
| Port-2 25-48 | 23 | D | Green/Violet | 48 | Violet/Green | 95 |
| Port-2 25-48 | 24 | D | Brown/Violet | 49 | Violet/Brown | 96 |

106, 114, 122

| | | | | | | |
|---|---|---|---|---|---|---|
| 10 | 1 | 1 | A | 10 | Slate/Red | 42 | Red/Slate | 73 |
| 10 | 2 | 2 | B | 10 | Orange/Red | 42 | Red/Orange | 74 |
| 10 | 3 | 3 | C | 10 | Brown/White | 42 | White/Brown | 75 |
| 10 | 4 | 4 | D | 10 | Blue/White | 42 | White/Blue | 76 |
| 10 | 5 | 5 | D | 10 | Orange/Violet | 42 | Violet/Orange | 77 |
| 10 | 6 | 6 | E | 10 | Brown/Yellow | 42 | Yellow/Brown | 78 |
| 10 | 7 | 7 | F | 10 | Blue/Yellow | 42 | Yellow/Blue | 79 |
| 10 | 8 | 8 | G | 10 | Green/Black | 42 | Black/Green | 80 |
| 11 | 1 | 1 | A | 11 | Blue/Black | 43 | Black/Blue | 81 |
| 11 | 2 | 2 | B | 11 | Green/Red | 43 | Red/Green | 82 |
| 11 | 3 | 3 | C | 11 | Slate/White | 43 | White/Slate | 83 |
| 11 | 4 | 4 | D | 11 | Orange/White | 43 | White/Orange | 84 |
| 11 | 5 | 5 | D | 11 | Green/Violet | 43 | Violet/Green | 85 |
| 11 | 6 | 6 | E | 11 | Slate/Yellow | 43 | Yellow/Slate | 86 |
| 11 | 7 | 7 | F | 11 | Orange/Yellow | 43 | Yellow/Orange | 87 |
| 11 | 8 | 8 | G | 11 | Brown/Black | 43 | Black/Brown | 88 |
| 12 | 1 | 1 | A | 12 | Orange/Black | 44 | Black/Orange | 89 |
| 12 | 2 | 2 | B | 12 | Brown/Red | 44 | Red/Brown | 90 |
| 12 | 3 | 3 | C | 12 | Blue/Red | 44 | Red/Blue | 91 |
| 12 | 4 | 4 | D | 12 | Green/White | 44 | White/Green | 92 |
| 12 | 5 | 5 | D | 12 | Brown/Violet | 44 | Violet/Brown | 93 |
| 12 | 6 | 6 | E | 12 | Blue/Violet | 44 | Violet/Blue | 94 |
| 12 | 7 | 7 | F | 12 | Green/Yellow | 44 | Yellow/Green | 95 |
| 12 | 8 | 8 | G | 12 | Slate/Black | 44 | Black/Slate | 96 |

| Port-3 1-24 | 1 | E | Blue/White | 26 | White/Blue | 97 |
|---|---|---|---|---|---|---|
| Port-3 1-24 | 2 | E | Orange/White | 27 | White/Orange | 98 |
| Port-3 1-24 | 3 | E | Green/White | 28 | White/Green | 99 |
| Port-3 1-24 | 4 | E | Brown/White | 29 | White/Brown | 100 |
| Port-3 1-24 | 5 | E | Slate/White | 30 | White/Slate | 101 |
| Port-3 1-24 | 6 | E | Blue/Red | 31 | Red/Blue | 102 |
| Port-3 1-24 | 7 | E | Orange/Red | 32 | Red/Orange | 103 |
| Port-3 1-24 | 8 | E | Green/Red | 33 | Red/Green | 104 |
| Port-3 1-24 | 9 | E | Brown/Red | 34 | Red/Brown | 105 |
| Port-3 1-24 | 10 | E | Slate/Red | 35 | Red/Slate | 106 |
| Port-3 1-24 | 11 | E | Blue/Black | 36 | Black/Blue | 107 |
| Port-3 1-24 | 12 | E | Orange/Black | 37 | Black/Orange | 108 |
| Port-3 1-24 | 13 | E | Green/Black | 38 | Black/Green | 109 |
| Port-3 1-24 | 14 | E | Brown/Black | 39 | Black/Brown | 110 |
| Port-3 1-24 | 15 | E | Slate/Black | 40 | Black/Slate | 111 |
| Port-3 1-24 | 16 | E | Blue/Yellow | 41 | Yellow/Blue | 112 |
| Port-3 1-24 | 17 | E | Orange/Yellow | 42 | Yellow/Orange | 113 |
| Port-3 1-24 | 18 | E | Green/Yellow | 43 | Yellow/Green | 114 |
| Port-3 1-24 | 19 | E | Brown/Yellow | 44 | Yellow/Brown | 115 |
| Port-3 1-24 | 20 | E | Slate/Yellow | 45 | Yellow/Slate | 116 |
| Port-3 1-24 | 21 | E | Blue/Violet | 46 | Violet/Blue | 117 |
| Port-3 1-24 | 22 | E | Orange/Violet | 47 | Violet/Orange | 118 |
| Port-3 1-24 | 23 | E | Green/Violet | 48 | Violet/Green | 119 |
| Port-3 1-24 | 24 | E | Brown/Violet | 49 | Violet/Brown | 120 |

106, 114, 122 →

| 13 | 1 | 1 | A | 13 | Green/Black | 45 | Black/Green | 97 |
|---|---|---|---|---|---|---|---|---|
| 13 | 2 | 2 | B | 13 | Slate/Red | 45 | Red/Slate | 98 |
| 13 | 3 | 3 | C | 13 | Orange/Red | 45 | Red/Orange | 99 |
| 13 | 4 | 4 | D | 13 | Brown/White | 45 | White/Brown | 100 |
| 13 | 5 | 5 | E | 13 | Blue/White | 45 | White/Blue | 101 |
| 13 | 6 | 6 | E | 13 | Orange/Violet | 45 | Violet/Orange | 102 |
| 13 | 7 | 7 | F | 13 | Brown/Yellow | 45 | Yellow/Brown | 103 |
| 13 | 8 | 8 | G | 13 | Blue/Yellow | 45 | Yellow/Blue | 104 |
| 14 | 1 | 1 | A | 14 | Brown/Black | 46 | Black/Brown | 105 |
| 14 | 2 | 2 | B | 14 | Blue/Black | 46 | Black/Blue | 106 |
| 14 | 3 | 3 | C | 14 | Green/Red | 46 | Red/Green | 107 |
| 14 | 4 | 4 | D | 14 | Slate/White | 46 | White/Slate | 108 |
| 14 | 5 | 5 | E | 14 | Orange/White | 46 | White/Orange | 109 |
| 14 | 6 | 6 | E | 14 | Green/Violet | 46 | Violet/Green | 110 |
| 14 | 7 | 7 | F | 14 | Slate/Yellow | 46 | Yellow/Slate | 111 |
| 14 | 8 | 8 | G | 14 | Orange/Yellow | 46 | Yellow/Orange | 112 |
| 15 | 1 | 1 | A | 15 | Slate/Black | 47 | Black/Slate | 113 |
| 15 | 2 | 2 | B | 15 | Orange/Black | 47 | Black/Orange | 114 |
| 15 | 3 | 3 | C | 15 | Brown/Red | 47 | Red/Brown | 115 |
| 15 | 4 | 4 | D | 15 | Blue/Red | 47 | Red/Blue | 116 |
| 15 | 5 | 5 | E | 15 | Green/White | 47 | White/Green | 117 |
| 15 | 6 | 6 | E | 15 | Brown/Violet | 47 | Violet/Brown | 118 |
| 15 | 7 | 7 | F | 15 | Blue/Violet | 47 | Violet/Blue | 119 |
| 15 | 8 | 8 | G | 15 | Green/Yellow | 47 | Yellow/Green | 120 |

104, 112, 120

| | | | | | |
|---|---|---|---|---|---|
| Port-3 25-48 | 1 | F | Blue/White | 26 | 121 |
| Port-3 25-48 | 2 | F | Orange/White | 27 | 122 |
| Port-3 25-48 | 3 | F | Green/White | 28 | 123 |
| Port-3 25-48 | 4 | F | Brown/White | 29 | 124 |
| Port-3 25-48 | 5 | F | Slate/White | 30 | 125 |
| Port-3 25-48 | 6 | F | Blue/Red | 31 | 126 |
| Port-3 25-48 | 7 | F | Orange/Red | 32 | 127 |
| Port-3 25-48 | 8 | F | Green/Red | 33 | 128 |
| Port-3 25-48 | 9 | F | Brown/Red | 34 | 129 |
| Port-3 25-48 | 10 | F | Slate/Red | 35 | 130 |
| Port-3 25-48 | 11 | F | Blue/Black | 36 | 131 |
| Port-3 25-48 | 12 | F | Orange/Black | 37 | 132 |
| Port-3 25-48 | 13 | F | Green/Black | 38 | 133 |
| Port-3 25-48 | 14 | F | Brown/Black | 39 | 134 |
| Port-3 25-48 | 15 | F | Slate/Black | 40 | 135 |
| Port-3 25-48 | 16 | F | Blue/Yellow | 41 | 136 |
| Port-3 25-48 | 17 | F | Orange/Yellow | 42 | 137 |
| Port-3 25-48 | 18 | F | Green/Yellow | 43 | 138 |
| Port-3 25-48 | 19 | F | Brown/Yellow | 44 | 139 |
| Port-3 25-48 | 20 | F | Slate/Yellow | 45 | 140 |
| Port-3 25-48 | 21 | F | Blue/Violet | 46 | 141 |
| Port-3 25-48 | 22 | F | Orange/Violet | 47 | 142 |
| Port-3 25-48 | 23 | F | Green/Violet | 48 | 143 |
| Port-3 25-48 | 24 | F | Brown/Violet | 49 | 144 |

106, 114, 122

| | | | | | | | |
|---|---|---|---|---|---|---|---|
| 16 | 1 | 1 | A | 16 | Blue/Yellow | 48 | Yellow/Blue |
| 16 | 2 | 2 | B | 16 | Green/Black | 48 | Black/Green |
| 16 | 3 | 3 | C | 16 | Slate/Red | 48 | Red/Slate |
| 16 | 4 | 4 | D | 16 | Orange/Red | 48 | Red/Orange |
| 16 | 5 | 5 | E | 16 | Brown/White | 48 | White/Brown |
| 16 | 6 | 6 | F | 16 | Blue/White | 48 | White/Blue |
| 16 | 7 | 7 | F | 16 | Orange/Violet | 48 | Violet/Orange |
| 16 | 8 | 8 | G | 16 | Brown/Yellow | 48 | Yellow/Brown |
| 17 | 1 | 1 | A | 17 | Orange/Yellow | 49 | Yellow/Orange |
| 17 | 2 | 2 | B | 17 | Brown/Black | 49 | Black/Brown |
| 17 | 3 | 3 | C | 17 | Blue/Black | 49 | Black/Blue |
| 17 | 4 | 4 | D | 17 | Green/Red | 49 | Red/Green |
| 17 | 5 | 5 | E | 17 | Slate/White | 49 | White/Slate |
| 17 | 6 | 6 | F | 17 | Orange/White | 49 | White/Orange |
| 17 | 7 | 7 | F | 17 | Green/Violet | 49 | Violet/Green |
| 17 | 8 | 8 | G | 17 | Slate/Yellow | 49 | Yellow/Slate |
| 18 | 1 | 1 | A | 18 | Green/Yellow | 50 | Yellow/Green |
| 18 | 2 | 2 | B | 18 | Slate/Black | 50 | Black/Slate |
| 18 | 3 | 3 | C | 18 | Orange/Black | 50 | Black/Orange |
| 18 | 4 | 4 | D | 18 | Brown/Red | 50 | Red/Brown |
| 18 | 5 | 5 | E | 18 | Blue/Red | 50 | Red/Blue |
| 18 | 6 | 6 | F | 18 | Green/White | 50 | White/Green |
| 18 | 7 | 7 | F | 18 | Brown/Violet | 50 | Violet/Brown |
| 18 | 8 | 8 | G | 18 | Blue/Violet | 50 | Violet/Blue |

| | | | | |
|---|---|---|---|---|
| Port-4 1-24 | 1 | G | Blue/White | 26 | White/Blue | 145 |
| Port-4 1-24 | 2 | G | Orange/White | 27 | White/Orange | 146 |
| Port-4 1-24 | 3 | G | Green/White | 28 | White/Green | 147 |
| Port-4 1-24 | 4 | G | Brown/White | 29 | White/Brown | 148 |
| Port-4 1-24 | 5 | G | Slate/White | 30 | White/Slate | 149 |
| Port-4 1-24 | 6 | G | Blue/Red | 31 | Red/Blue | 150 |
| Port-4 1-24 | 7 | G | Orange/Red | 32 | Red/Orange | 151 |
| Port-4 1-24 | 8 | G | Green/Red | 33 | Red/Green | 152 |
| Port-4 1-24 | 9 | G | Brown/Red | 34 | Red/Brown | 153 |
| Port-4 1-24 | 10 | G | Slate/Red | 35 | Red/Slate | 154 |
| Port-4 1-24 | 11 | G | Blue/Black | 36 | Black/Blue | 155 |
| Port-4 1-24 | 12 | G | Orange/Black | 37 | Black/Orange | 156 |
| Port-4 1-24 | 13 | G | Green/Black | 38 | Black/Green | 157 |
| Port-4 1-24 | 14 | G | Brown/Black | 39 | Black/Brown | 158 |
| Port-4 1-24 | 15 | G | Slate/Black | 40 | Black/Slate | 159 |
| Port-4 1-24 | 16 | G | Blue/Yellow | 41 | Yellow/Blue | 160 |
| Port-4 1-24 | 17 | G | Orange/Yellow | 42 | Yellow/Orange | 161 |
| Port-4 1-24 | 18 | G | Green/Yellow | 43 | Yellow/Green | 162 |
| Port-4 1-24 | 19 | G | Brown/Yellow | 44 | Yellow/Brown | 163 |
| Port-4 1-24 | 20 | G | Slate/Yellow | 45 | Yellow/Slate | 164 |
| Port-4 1-24 | 21 | G | Blue/Violet | 46 | Violet/Blue | 165 |
| Port-4 1-24 | 22 | G | Orange/Violet | 47 | Violet/Orange | 166 |
| Port-4 1-24 | 23 | G | Green/Violet | 48 | Violet/Green | 167 |
| Port-4 1-24 | 24 | G | Brown/Violet | 49 | Violet/Brown | 168 |

106, 114, 122

| | | | | | | |
|---|---|---|---|---|---|---|
| 19 | 1 | 1 | A | 19 | Brown/Yellow | 51 | Yellow/Brown | 145 |
| 19 | 2 | 2 | B | 19 | Blue/Yellow | 51 | Yellow/Blue | 146 |
| 19 | 3 | 3 | C | 19 | Green/Black | 51 | Black/Green | 147 |
| 19 | 4 | 4 | D | 19 | Slate/Red | 51 | Red/Slate | 148 |
| 19 | 5 | 5 | E | 19 | Orange/Red | 51 | Red/Orange | 149 |
| 19 | 6 | 6 | F | 19 | Brown/White | 51 | White/Brown | 150 |
| 19 | 7 | 7 | G | 19 | Blue/White | 51 | White/Blue | 151 |
| 19 | 8 | 8 | G | 19 | Orange/Violet | 51 | Violet/Orange | 152 |
| 20 | 1 | 1 | A | 20 | Slate/Yellow | 52 | Yellow/Slate | 153 |
| 20 | 2 | 2 | B | 20 | Orange/Yellow | 52 | Yellow/Orange | 154 |
| 20 | 3 | 3 | C | 20 | Brown/Black | 52 | Black/Brown | 155 |
| 20 | 4 | 4 | D | 20 | Blue/Black | 52 | Black/Blue | 156 |
| 20 | 5 | 5 | E | 20 | Green/Red | 52 | Red/Green | 157 |
| 20 | 6 | 6 | F | 20 | Slate/White | 52 | White/Slate | 158 |
| 20 | 7 | 7 | G | 20 | Orange/White | 52 | White/Orange | 159 |
| 20 | 8 | 8 | G | 20 | Green/Violet | 52 | Violet/Green | 160 |
| 21 | 1 | 1 | A | 21 | Blue/Violet | 53 | Violet/Blue | 161 |
| 21 | 2 | 2 | B | 21 | Green/Yellow | 53 | Yellow/Green | 162 |
| 21 | 3 | 3 | C | 21 | Slate/Black | 53 | Black/Slate | 163 |
| 21 | 4 | 4 | D | 21 | Orange/Black | 53 | Black/Orange | 164 |
| 21 | 5 | 5 | E | 21 | Brown/Red | 53 | Red/Brown | 165 |
| 21 | 6 | 6 | F | 21 | Blue/Red | 53 | Red/Blue | 166 |
| 21 | 7 | 7 | G | 21 | Green/White | 53 | White/Green | 167 |
| 21 | 8 | 8 | G | 21 | Brown/Violet | 53 | Violet/Brown | 168 |

Figure 4 (cont.)

| | | | | | | | | | | | | | |
|---|---|---|---|---|---|---|---|---|---|---|---|---|---|
| Port-4 25-48 | 1 | H | Blue/White | 26 | White/Blue | 169 | | 1 | 1 | 1 | H | Blue/White | 33 | White/Blue | 1 |
| Port-4 25-48 | 2 | H | Orange/White | 27 | White/Orange | 170 | | 1 | 2 | 1 | H | Orange/Violet | 33 | Violet/Orange | 2 |
| Port-4 25-48 | 3 | H | Green/White | 28 | White/Green | 171 | | 1 | 3 | 1 | I | Brown/Yellow | 33 | Yellow/Brown | 3 |
| Port-4 25-48 | 4 | H | Brown/White | 29 | White/Brown | 172 | | 1 | 4 | 1 | J | Blue/Yellow | 33 | Yellow/Blue | 4 |
| Port-4 25-48 | 5 | H | Slate/White | 30 | White/Slate | 173 | | 1 | 5 | 1 | K | Green/Black | 33 | Black/Green | 5 |
| Port-4 25-48 | 6 | H | Blue/Red | 31 | Red/Blue | 174 | | 1 | 6 | 1 | L | Slate/Red | 33 | Red/Slate | 6 |
| Port-4 25-48 | 7 | H | Orange/Red | 32 | Red/Orange | 175 | | 1 | 7 | 1 | M | Orange/Red | 33 | Red/Orange | 7 |
| Port-4 25-48 | 8 | H | Green/Red | 33 | Red/Green | 176 | | 1 | 8 | 1 | N | Brown/White | 33 | White/Brown | 8 |
| Port-4 25-48 | 9 | H | Brown/Red | 34 | Red/Brown | 177 | | 2 | 1 | 2 | H | Orange/White | 34 | White/Orange | 9 |
| Port-4 25-48 | 10 | H | Slate/Red | 35 | Red/Slate | 178 | | 2 | 2 | 2 | I | Green/Violet | 34 | Violet/Green | 10 |
| Port-4 25-48 | 11 | H | Blue/Black | 36 | Black/Blue | 179 | | 2 | 3 | 2 | I | Slate/Yellow | 34 | Yellow/Slate | 11 |
| Port-4 25-48 | 12 | H | Orange/Black | 37 | Black/Orange | 180 | | 2 | 4 | 2 | J | Orange/Yellow | 34 | Yellow/Orange | 12 |
| Port-4 25-48 | 13 | H | Green/Black | 38 | Black/Green | 181 | | 2 | 5 | 2 | K | Brown/Black | 34 | Black/Brown | 13 |
| Port-4 25-48 | 14 | H | Brown/Black | 39 | Black/Brown | 182 | | 2 | 6 | 2 | L | Blue/Black | 34 | Black/Blue | 14 |
| Port-4 25-48 | 15 | H | Slate/Black | 40 | Black/Slate | 183 | | 2 | 7 | 2 | M | Green/Red | 34 | Red/Green | 15 |
| Port-4 25-48 | 16 | H | Blue/Yellow | 41 | Yellow/Blue | 184 | | 2 | 8 | 2 | N | Slate/White | 34 | White/Slate | 16 |
| Port-4 25-48 | 17 | H | Orange/Yellow | 42 | Yellow/Orange | 185 | | 3 | 1 | 3 | H | Green/White | 35 | White/Green | 17 |
| Port-4 25-48 | 18 | H | Green/Yellow | 43 | Yellow/Green | 186 | | 3 | 2 | 3 | I | Brown/Violet | 35 | Violet/Brown | 18 |
| Port-4 25-48 | 19 | H | Brown/Yellow | 44 | Yellow/Brown | 187 | | 3 | 3 | 3 | I | Blue/Violet | 35 | Violet/Blue | 19 |
| Port-4 25-48 | 20 | H | Slate/Yellow | 45 | Yellow/Slate | 188 | | 3 | 4 | 3 | J | Green/Yellow | 35 | Yellow/Green | 20 |
| Port-4 25-48 | 21 | H | Blue/Violet | 46 | Violet/Blue | 189 | | 3 | 5 | 3 | K | Slate/Black | 35 | Black/Slate | 21 |
| Port-4 25-48 | 22 | H | Orange/Violet | 47 | Violet/Orange | 190 | | 3 | 6 | 3 | L | Orange/Black | 35 | Black/Orange | 22 |
| Port-4 25-48 | 23 | H | Green/Violet | 48 | Violet/Green | 191 | | 3 | 7 | 3 | M | Brown/Red | 35 | Red/Brown | 23 |
| Port-4 25-48 | 24 | H | Brown/Violet | 49 | Violet/Brown | 192 | | 3 | 8 | 3 | N | Blue/Red | 35 | Red/Blue | 24 |

| | | | | | |
|---|---|---|---|---|---|
| Port-5 1-24 | 1 | - | Blue/White | 26 | 193 |
| Port-5 1-24 | 2 | - | Orange/White | 27 | 194 |
| Port-5 1-24 | 3 | - | Green/White | 28 | 195 |
| Port-5 1-24 | 4 | - | Brown/White | 29 | 196 |
| Port-5 1-24 | 5 | - | Slate/White | 30 | 197 |
| Port-5 1-24 | 6 | - | Blue/Red | 31 | 198 |
| Port-5 1-24 | 7 | - | Orange/Red | 32 | 199 |
| Port-5 1-24 | 8 | - | Green/Red | 33 | 200 |
| Port-5 1-24 | 9 | - | Brown/Red | 34 | 201 |
| Port-5 1-24 | 10 | - | Slate/Red | 35 | 202 |
| Port-5 1-24 | 11 | - | Blue/Black | 36 | 203 |
| Port-5 1-24 | 12 | - | Orange/Black | 37 | 204 |
| Port-5 1-24 | 13 | - | Green/Black | 38 | 205 |
| Port-5 1-24 | 14 | - | Brown/Black | 39 | 206 |
| Port-5 1-24 | 15 | - | Slate/Black | 40 | 207 |
| Port-5 1-24 | 16 | - | Blue/Yellow | 41 | 208 |
| Port-5 1-24 | 17 | - | Orange/Yellow | 42 | 209 |
| Port-5 1-24 | 18 | - | Green/Yellow | 43 | 210 |
| Port-5 1-24 | 19 | - | Brown/Yellow | 44 | 211 |
| Port-5 1-24 | 20 | - | Slate/Yellow | 45 | 212 |
| Port-5 1-24 | 21 | - | Blue/Violet | 46 | 213 |
| Port-5 1-24 | 22 | - | Orange/Violet | 47 | 214 |
| Port-5 1-24 | 23 | - | Green/Violet | 48 | 215 |
| Port-5 1-24 | 24 | - | Brown/Violet | 49 | 216 |

106, 114, 122

| | | | | | | | |
|---|---|---|---|---|---|---|---|
| 4 | 1 | 1 | H | 4 | Brown/White | 36 | White/Brown 25 |
| 4 | 2 | 2 | I | 4 | Blue/White | 36 | White/Blue 26 |
| 4 | 3 | 3 | J | 4 | Orange/Violet | 36 | Violet/Orange 27 |
| 4 | 4 | 4 | K | 4 | Brown/Yellow | 36 | Yellow/Brown 28 |
| 4 | 5 | 5 | L | 4 | Blue/Yellow | 36 | Yellow/Blue 29 |
| 4 | 6 | 6 | M | 4 | Green/Black | 36 | Black/Green 30 |
| 4 | 7 | 7 | N | 4 | Slate/Red | 36 | Red/Slate 31 |
| 4 | 8 | 8 | H | 4 | Orange/Red | 36 | Red/Orange 32 |
| 5 | 1 | 1 | I | 5 | Slate/White | 37 | White/Slate 33 |
| 5 | 2 | 2 | J | 5 | Orange/White | 37 | White/Orange 34 |
| 5 | 3 | 3 | K | 5 | Green/Violet | 37 | Violet/Green 35 |
| 5 | 4 | 4 | L | 5 | Slate/Yellow | 37 | Yellow/Slate 36 |
| 5 | 5 | 5 | M | 5 | Orange/Yellow | 37 | Yellow/Orange 37 |
| 5 | 6 | 6 | N | 5 | Brown/Black | 37 | Black/Brown 38 |
| 5 | 7 | 7 | H | 5 | Blue/Black | 37 | Black/Blue 39 |
| 5 | 8 | 8 | I | 5 | Green/Red | 37 | Red/Green 40 |
| 6 | 1 | 1 | J | 6 | Blue/Red | 38 | Red/Blue 41 |
| 6 | 2 | 2 | K | 6 | Green/White | 38 | White/Green 42 |
| 6 | 3 | 3 | L | 6 | Brown/Violet | 38 | Violet/Brown 43 |
| 6 | 4 | 4 | M | 6 | Blue/Violet | 38 | Violet/Blue 44 |
| 6 | 5 | 5 | N | 6 | Green/Yellow | 38 | Yellow/Green 45 |
| 6 | 6 | 6 | H | 6 | Slate/Black | 38 | Black/Slate 46 |
| 6 | 7 | 7 | I | 6 | Orange/Black | 38 | Black/Orange 47 |
| 6 | 8 | 8 | J | 6 | Brown/Red | 38 | Red/Brown 48 |

| | | | | | | | | | | | | |
|---|---|---|---|---|---|---|---|---|---|---|---|---|
| Port-5 25-48 | 1 | J | Blue/White | 26 | White/Blue | 217 | 7 | 1 | 1 | H | 7 | Orange/Red | 39 | Red/Orange | 49 |
| Port-5 25-48 | 2 | J | Orange/White | 27 | White/Orange | 218 | 7 | 2 | 2 | I | 7 | Brown/White | 39 | White/Brown | 50 |
| Port-5 25-48 | 3 | J | Green/White | 28 | White/Green | 219 | 7 | 3 | 3 | J | 7 | Blue/White | 39 | White/Blue | 51 |
| Port-5 25-48 | 4 | J | Brown/White | 29 | White/Brown | 220 | 7 | 4 | 4 | J | 7 | Orange/Violet | 39 | Violet/Orange | 52 |
| Port-5 25-48 | 5 | J | Slate/White | 30 | White/Slate | 221 | 7 | 5 | 5 | K | 7 | Brown/Yellow | 39 | Yellow/Brown | 53 |
| Port-5 25-48 | 6 | J | Blue/Red | 31 | Red/Blue | 222 | 7 | 6 | 6 | L | 7 | Blue/Yellow | 39 | Yellow/Blue | 54 |
| Port-5 25-48 | 7 | J | Orange/Red | 32 | Red/Orange | 223 | 7 | 7 | 7 | M | 7 | Green/Black | 39 | Black/Green | 55 |
| Port-5 25-48 | 8 | J | Green/Red | 33 | Red/Green | 224 | 7 | 8 | 8 | N | 7 | Slate/Red | 39 | Red/Slate | 56 |
| Port-5 25-48 | 9 | J | Brown/Red | 34 | Red/Brown | 225 | 8 | 1 | 1 | H | 8 | Green/Red | 40 | Red/Green | 57 |
| Port-5 25-48 | 10 | J | Slate/Red | 35 | Red/Slate | 226 | 8 | 2 | 2 | I | 8 | Slate/White | 40 | White/Slate | 58 |
| Port-5 25-48 | 11 | J | Blue/Black | 36 | Black/Blue | 227 | 8 | 3 | 3 | J | 8 | Orange/White | 40 | White/Orange | 59 |
| Port-5 25-48 | 12 | J | Orange/Black | 37 | Black/Orange | 228 | 8 | 4 | 4 | J | 8 | Green/Violet | 40 | Violet/Green | 60 |
| Port-5 25-48 | 13 | J | Green/Black | 38 | Black/Green | 229 | 8 | 5 | 5 | K | 8 | Slate/Yellow | 40 | Yellow/Slate | 61 |
| Port-5 25-48 | 14 | J | Brown/Black | 39 | Black/Brown | 230 | 8 | 6 | 6 | L | 8 | Orange/Yellow | 40 | Yellow/Orange | 62 |
| Port-5 25-48 | 15 | J | Slate/Black | 40 | Black/Slate | 231 | 8 | 7 | 7 | M | 8 | Brown/Black | 40 | Black/Brown | 63 |
| Port-5 25-48 | 16 | J | Blue/Yellow | 41 | Yellow/Blue | 232 | 8 | 8 | 8 | N | 8 | Blue/Black | 40 | Black/Blue | 64 |
| Port-5 25-48 | 17 | J | Orange/Yellow | 42 | Yellow/Orange | 233 | 9 | 1 | 1 | H | 9 | Brown/Red | 41 | Red/Brown | 65 |
| Port-5 25-48 | 18 | J | Green/Yellow | 43 | Yellow/Green | 234 | 9 | 2 | 2 | I | 9 | Blue/Red | 41 | Red/Blue | 66 |
| Port-5 25-48 | 19 | J | Brown/Yellow | 44 | Yellow/Brown | 235 | 9 | 3 | 3 | J | 9 | Green/White | 41 | White/Green | 67 |
| Port-5 25-48 | 20 | J | Slate/Yellow | 45 | Yellow/Slate | 236 | 9 | 4 | 4 | J | 9 | Brown/Violet | 41 | Violet/Brown | 68 |
| Port-5 25-48 | 21 | J | Blue/Violet | 46 | Violet/Blue | 237 | 9 | 5 | 5 | K | 9 | Blue/Violet | 41 | Violet/Blue | 69 |
| Port-5 25-48 | 22 | J | Orange/Violet | 47 | Violet/Orange | 238 | 9 | 6 | 6 | L | 9 | Green/Yellow | 41 | Yellow/Green | 70 |
| Port-5 25-48 | 23 | J | Green/Violet | 48 | Violet/Green | 239 | 9 | 7 | 7 | M | 9 | Slate/Black | 41 | Black/Slate | 71 |
| Port-5 25-48 | 24 | J | Brown/Violet | 49 | Violet/Brown | 240 | 9 | 8 | 8 | N | 9 | Orange/Black | 41 | Black/Orange | 72 |

| | | | | | | | | | | | | |
|---|---|---|---|---|---|---|---|---|---|---|---|---|
| Port-6 1-24 | 1 | K | Blue/White | 26 | White/Blue | 241 | 10 | 1 | 1 | H | 10 | 42 | Slate/Red | 42 | Red/Slate | 73 |
| Port-6 1-24 | 2 | K | Orange/White | 27 | White/Orange | 242 | 10 | 2 | 2 | I | 10 | 42 | Orange/Red | 42 | Red/Orange | 74 |
| Port-6 1-24 | 3 | K | Green/White | 28 | White/Green | 243 | 10 | 3 | 3 | J | 10 | 42 | Brown/White | 42 | White/Brown | 75 |
| Port-6 1-24 | 4 | K | Brown/White | 29 | White/Brown | 244 | 10 | 4 | 4 | K | 10 | 42 | Blue/White | 42 | White/Blue | 76 |
| Port-6 1-24 | 5 | K | Slate/White | 30 | White/Slate | 245 | 10 | 5 | 5 | K | 10 | 42 | Orange/Violet | 42 | Violet/Orange | 77 |
| Port-6 1-24 | 6 | K | Blue/Red | 31 | Red/Blue | 246 | 10 | 6 | 6 | L | 10 | 42 | Brown/Yellow | 42 | Yellow/Brown | 78 |
| Port-6 1-24 | 7 | K | Orange/Red | 32 | Red/Orange | 247 | 10 | 7 | 7 | M | 10 | 42 | Blue/Yellow | 42 | Yellow/Blue | 79 |
| Port-6 1-24 | 8 | K | Green/Red | 33 | Red/Green | 248 | 10 | 8 | 8 | N | 10 | 42 | Green/Black | 42 | Black/Green | 80 |
| Port-6 1-24 | 9 | K | Brown/Red | 34 | Red/Brown | 249 | 11 | 1 | 1 | H | 11 | 43 | Blue/Black | 43 | Black/Blue | 81 |
| Port-6 1-24 | 10 | K | Slate/Red | 35 | Red/Slate | 250 | 11 | 2 | 2 | I | 11 | 43 | Green/Red | 43 | Red/Green | 82 |
| Port-6 1-24 | 11 | K | Blue/Black | 36 | Black/Blue | 251 | 11 | 3 | 3 | J | 11 | 43 | Slate/White | 43 | White/Slate | 83 |
| Port-6 1-24 | 12 | K | Orange/Black | 37 | Black/Orange | 252 | 11 | 4 | 4 | K | 11 | 43 | Orange/White | 43 | White/Orange | 84 |
| Port-6 1-24 | 13 | K | Green/Black | 38 | Black/Green | 253 | 11 | 5 | 5 | K | 11 | 43 | Green/Violet | 43 | Violet/Green | 85 |
| Port-6 1-24 | 14 | K | Brown/Black | 39 | Black/Brown | 254 | 11 | 6 | 6 | L | 11 | 43 | Slate/Yellow | 43 | Yellow/Slate | 86 |
| Port-6 1-24 | 15 | K | Slate/Black | 40 | Black/Slate | 255 | 11 | 7 | 7 | M | 11 | 43 | Orange/Yellow | 43 | Yellow/Orange | 87 |
| Port-6 1-24 | 16 | K | Blue/Yellow | 41 | Yellow/Blue | 256 | 11 | 8 | 8 | N | 11 | 43 | Brown/Black | 43 | Black/Brown | 88 |
| Port-6 1-24 | 17 | K | Orange/Yellow | 42 | Yellow/Orange | 257 | 12 | 1 | 1 | H | 12 | 44 | Orange/Black | 44 | Black/Orange | 89 |
| Port-6 1-24 | 18 | K | Green/Yellow | 43 | Yellow/Green | 258 | 12 | 2 | 2 | I | 12 | 44 | Brown/Red | 44 | Red/Brown | 90 |
| Port-6 1-24 | 19 | K | Brown/Yellow | 44 | Yellow/Brown | 259 | 12 | 3 | 3 | J | 12 | 44 | Blue/Red | 44 | Red/Blue | 91 |
| Port-6 1-24 | 20 | K | Slate/Yellow | 45 | Yellow/Slate | 260 | 12 | 4 | 4 | K | 12 | 44 | Green/White | 44 | White/Green | 92 |
| Port-6 1-24 | 21 | K | Blue/Violet | 46 | Violet/Blue | 261 | 12 | 5 | 5 | K | 12 | 44 | Brown/Violet | 44 | Violet/Brown | 93 |
| Port-6 1-24 | 22 | K | Orange/Violet | 47 | Violet/Orange | 262 | 12 | 6 | 6 | L | 12 | 44 | Blue/Violet | 44 | Violet/Blue | 94 |
| Port-6 1-24 | 23 | K | Green/Violet | 48 | Violet/Green | 263 | 12 | 7 | 7 | M | 12 | 44 | Blue/Yellow | 44 | Yellow/Blue | 95 |
| Port-6 1-24 | 24 | K | Brown/Violet | 49 | Violet/Brown | 264 | 12 | 8 | 8 | N | 12 | 44 | Slate/Black | 44 | Black/Slate | 96 |

| | | | | | | | | | | | | | |
|---|---|---|---|---|---|---|---|---|---|---|---|---|---|
| Port-6 25-48 | 1 | L | Blue/White | 26 | White/Blue | 265 | | 13 | 1 | 1 | H | 13 | Green/Black | 45 | Black/Green | 97 |
| Port-6 25-48 | 2 | L | Orange/White | 27 | White/Orange | 266 | | 13 | 2 | 2 | I | 13 | Slate/Red | 45 | Red/Slate | 98 |
| Port-6 25-48 | 3 | L | Green/White | 28 | White/Green | 267 | | 13 | 3 | 3 | J | 13 | Orange/Red | 45 | Red/Orange | 99 |
| Port-6 25-48 | 4 | L | Brown/White | 29 | White/Brown | 268 | | 13 | 4 | 4 | K | 13 | Brown/White | 45 | White/Brown | 100 |
| Port-6 25-48 | 5 | L | Slate/White | 30 | White/Slate | 269 | | 13 | 5 | 5 | L | 13 | Blue/White | 45 | White/Blue | 101 |
| Port-6 25-48 | 6 | L | Blue/Red | 31 | Red/Blue | 270 | | 13 | 6 | 6 | L | 13 | Orange/Violet | 45 | Violet/Orange | 102 |
| Port-6 25-48 | 7 | L | Orange/Red | 32 | Red/Orange | 271 | | 13 | 7 | 7 | M | 13 | Brown/Yellow | 45 | Yellow/Brown | 103 |
| Port-6 25-48 | 8 | L | Green/Red | 33 | Red/Green | 272 | | 13 | 8 | 8 | N | 13 | Blue/Yellow | 45 | Yellow/Blue | 104 |
| Port-6 25-48 | 9 | L | Brown/Red | 34 | Red/Brown | 273 | | 14 | 1 | 1 | H | 14 | Brown/Black | 46 | Black/Brown | 105 |
| Port-6 25-48 | 10 | L | Slate/Red | 35 | Red/Slate | 274 | | 14 | 2 | 2 | I | 14 | Blue/Black | 46 | Black/Blue | 106 |
| Port-6 25-48 | 11 | L | Blue/Black | 36 | Black/Blue | 275 | | 14 | 3 | 3 | J | 14 | Green/Red | 46 | Red/Green | 107 |
| Port-6 25-48 | 12 | L | Orange/Black | 37 | Black/Orange | 276 | | 14 | 4 | 4 | K | 14 | Slate/White | 46 | White/Slate | 108 |
| Port-6 25-48 | 13 | L | Green/Black | 38 | Black/Green | 277 | | 14 | 5 | 5 | L | 14 | Orange/White | 46 | White/Orange | 109 |
| Port-6 25-48 | 14 | L | Brown/Black | 39 | Black/Brown | 278 | | 14 | 6 | 6 | L | 14 | Green/Violet | 46 | Violet/Green | 110 |
| Port-6 25-48 | 15 | L | Slate/Blue | 40 | Black/Slate | 279 | | 14 | 7 | 7 | M | 14 | Slate/Yellow | 46 | Yellow/Slate | 111 |
| Port-6 25-48 | 16 | L | Blue/Yellow | 41 | Yellow/Blue | 280 | | 14 | 8 | 8 | N | 14 | Orange/Yellow | 46 | Yellow/Orange | 112 |
| Port-6 25-48 | 17 | L | Orange/Yellow | 42 | Yellow/Orange | 281 | | 15 | 1 | 1 | H | 15 | Slate/Black | 47 | Black/Slate | 113 |
| Port-6 25-48 | 18 | L | Green/Yellow | 43 | Yellow/Green | 282 | | 15 | 2 | 2 | I | 15 | Orange/Black | 47 | Black/Orange | 114 |
| Port-6 25-48 | 19 | L | Brown/Yellow | 44 | Yellow/Brown | 283 | | 15 | 3 | 3 | J | 15 | Brown/Red | 47 | Red/Brown | 115 |
| Port-6 25-48 | 20 | L | Slate/Yellow | 45 | Yellow/Slate | 284 | | 15 | 4 | 4 | K | 15 | Blue/Red | 47 | Red/Blue | 116 |
| Port-6 25-48 | 21 | L | Blue/Violet | 46 | Violet/Blue | 285 | | 15 | 5 | 5 | L | 15 | Green/White | 47 | White/Green | 117 |
| Port-6 25-48 | 22 | L | Orange/Violet | 47 | Violet/Orange | 286 | | 15 | 6 | 6 | L | 15 | Brown/Violet | 47 | Violet/Brown | 118 |
| Port-6 25-48 | 23 | L | Green/Violet | 48 | Violet/Green | 287 | | 15 | 7 | 7 | M | 15 | Blue/Violet | 47 | Violet/Blue | 119 |
| Port-6 25-48 | 24 | L | Brown/Violet | 49 | Violet/Brown | 288 | | 15 | 8 | 8 | N | 15 | Green/Yellow | 47 | Yellow/Green | 120 |

104, 112, 120

106, 114, 122

| | | | | | | | | | | | | | |
|---|---|---|---|---|---|---|---|---|---|---|---|---|---|
| Port-7 1-24 | 1 | M | Blue/White | 26 | White/Blue | 289 | 16 | 1 | 1 | 16 | Blue/Yellow | 48 | Yellow/Blue | 121 |
| Port-7 1-24 | 2 | M | Orange/White | 27 | White/Orange | 290 | 16 | 2 | 2 | 16 | Green/Black | 48 | Black/Green | 122 |
| Port-7 1-24 | 3 | M | Green/White | 28 | White/Green | 291 | 16 | 3 | 3 | 16 | Slate/Red | 48 | Red/Slate | 123 |
| Port-7 1-24 | 4 | M | Brown/White | 29 | White/Brown | 292 | 16 | 4 | 4 | 16 | Orange/Red | 48 | Red/Orange | 124 |
| Port-7 1-24 | 5 | M | Slate/White | 30 | White/Slate | 293 | 16 | 5 | 5 | 16 | Brown/White | 48 | White/Brown | 125 |
| Port-7 1-24 | 6 | M | Blue/Red | 31 | Red/Blue | 294 | 16 | 6 | 6 | 16 | Blue/White | 48 | White/Blue | 126 |
| Port-7 1-24 | 7 | M | Orange/Red | 32 | Red/Orange | 295 | 16 | 7 | 7 | 16 | Orange/Violet | 48 | Violet/Orange | 127 |
| Port-7 1-24 | 8 | M | Green/Red | 33 | Red/Green | 296 | 16 | 8 | 8 | 16 | Brown/Yellow | 48 | Yellow/Brown | 128 |
| Port-7 1-24 | 9 | M | Brown/Red | 34 | Red/Brown | 297 | 17 | 1 | 1 | 17 | Orange/Yellow | 49 | Yellow/Orange | 129 |
| Port-7 1-24 | 10 | M | Slate/Red | 35 | Red/Slate | 298 | 17 | 2 | 2 | 17 | Brown/Black | 49 | Black/Brown | 130 |
| Port-7 1-24 | 11 | M | Blue/Black | 36 | Black/Blue | 299 | 17 | 3 | 3 | 17 | Blue/Black | 49 | Black/Blue | 131 |
| Port-7 1-24 | 12 | M | Orange/Black | 37 | Black/Orange | 300 | 17 | 4 | 4 | 17 | Green/Red | 49 | Red/Green | 132 |
| Port-7 1-24 | 13 | M | Green/Black | 38 | Black/Green | 301 | 17 | 5 | 5 | 17 | Slate/White | 49 | White/Slate | 133 |
| Port-7 1-24 | 14 | M | Brown/Black | 39 | Black/Brown | 302 | 17 | 6 | 6 | 17 | Orange/White | 49 | White/Orange | 134 |
| Port-7 1-24 | 15 | M | Slate/Black | 40 | Black/Slate | 303 | 17 | 7 | 7 | 17 | Green/Violet | 49 | Violet/Green | 135 |
| Port-7 1-24 | 16 | M | Blue/Yellow | 41 | Yellow/Blue | 304 | 17 | 8 | 8 | 17 | Slate/Yellow | 49 | Yellow/Slate | 136 |
| Port-7 1-24 | 17 | M | Orange/Yellow | 42 | Yellow/Orange | 305 | 18 | 1 | 1 | 18 | Green/Yellow | 50 | Yellow/Green | 137 |
| Port-7 1-24 | 18 | M | Green/Yellow | 43 | Yellow/Green | 306 | 18 | 2 | 2 | 18 | Slate/Black | 50 | Black/Slate | 138 |
| Port-7 1-24 | 19 | M | Brown/Yellow | 44 | Yellow/Brown | 307 | 18 | 3 | 3 | 18 | Orange/Black | 50 | Black/Orange | 139 |
| Port-7 1-24 | 20 | M | Slate/Yellow | 45 | Yellow/Slate | 308 | 18 | 4 | 4 | 18 | Brown/Red | 50 | Red/Brown | 140 |
| Port-7 1-24 | 21 | M | Blue/Violet | 46 | Violet/Blue | 309 | 18 | 5 | 5 | 18 | Blue/Red | 50 | Red/Blue | 141 |
| Port-7 1-24 | 22 | M | Orange/Violet | 47 | Violet/Orange | 310 | 18 | 6 | 6 | 18 | Green/White | 50 | White/Green | 142 |
| Port-7 1-24 | 23 | M | Green/Violet | 48 | Violet/Green | 311 | 18 | 7 | 7 | 18 | Brown/Violet | 50 | Violet/Brown | 143 |
| Port-7 1-24 | 24 | M | Brown/Violet | 49 | Violet/Brown | 312 | 18 | 8 | 8 | 18 | Blue/Violet | 50 | Violet/Blue | 144 |

Figure 4 (cont.)

| | | | | | | | | | | | | |
|---|---|---|---|---|---|---|---|---|---|---|---|---|
| Port-7 25-48 | 1 | N | Blue/White | 26 | White/Blue | 313 | 19 | 1 | 1 | H | 19 | Brown/Yellow | 51 | Yellow/Brown | 145 |
| Port-7 25-48 | 2 | N | Orange/White | 27 | White/Orange | 314 | 19 | 2 | 2 | I | 19 | Blue/Yellow | 51 | Yellow/Blue | 146 |
| Port-7 25-48 | 3 | N | Green/White | 28 | White/Green | 315 | 19 | 3 | 3 | J | 19 | Green/Black | 51 | Black/Green | 147 |
| Port-7 25-48 | 4 | N | Brown/White | 29 | White/Brown | 316 | 19 | 4 | 4 | K | 19 | Slate/Red | 51 | Red/Slate | 148 |
| Port-7 25-48 | 5 | N | Slate/White | 30 | White/Slate | 317 | 19 | 5 | 5 | L | 19 | Orange/Red | 51 | Red/Orange | 149 |
| Port-7 25-48 | 6 | N | Blue/Red | 31 | Red/Blue | 318 | 19 | 6 | 6 | M | 19 | Brown/White | 51 | White/Brown | 150 |
| Port-7 25-48 | 7 | N | Orange/Red | 32 | Red/Orange | 319 | 19 | 7 | 7 | N | 19 | Blue/White | 51 | White/Blue | 151 |
| Port-7 25-48 | 8 | N | Green/Red | 33 | Red/Green | 320 | 19 | 8 | 8 | N | 19 | Orange/Violet | 51 | Violet/Orange | 152 |
| Port-7 25-48 | 9 | N | Brown/Red | 34 | Red/Brown | 321 | 20 | 1 | 1 | H | 20 | Slate/Yellow | 52 | Yellow/Slate | 153 |
| Port-7 25-48 | 10 | N | Slate/Red | 35 | Red/Slate | 322 | 20 | 2 | 2 | I | 20 | Orange/Yellow | 52 | Yellow/Orange | 154 |
| Port-7 25-48 | 11 | N | Blue/Black | 36 | Black/Blue | 323 | 20 | 3 | 3 | J | 20 | Brown/Black | 52 | Black/Brown | 155 |
| Port-7 25-48 | 12 | N | Orange/Black | 37 | Black/Orange | 324 | 20 | 4 | 4 | K | 20 | Blue/Black | 52 | Black/Blue | 156 |
| Port-7 25-48 | 13 | N | Green/Black | 38 | Black/Green | 325 | 20 | 5 | 5 | L | 20 | Green/Red | 52 | Red/Green | 157 |
| Port-7 25-48 | 14 | N | Brown/Black | 39 | Black/Brown | 326 | 20 | 6 | 6 | M | 20 | Slate/White | 52 | White/Slate | 158 |
| Port-7 25-48 | 15 | N | Slate/Black | 40 | Black/Slate | 327 | 20 | 7 | 7 | N | 20 | Orange/White | 52 | White/Orange | 159 |
| Port-7 25-48 | 16 | N | Blue/Yellow | 41 | Yellow/Blue | 328 | 20 | 8 | 8 | N | 20 | Green/Violet | 52 | Violet/Green | 160 |
| Port-7 25-48 | 17 | N | Orange/Yellow | 42 | Yellow/Orange | 329 | 21 | 1 | 1 | H | 21 | Blue/Violet | 53 | Violet/Blue | 161 |
| Port-7 25-48 | 18 | N | Green/Yellow | 43 | Yellow/Green | 330 | 21 | 2 | 2 | I | 21 | Green/Yellow | 53 | Yellow/Green | 162 |
| Port-7 25-48 | 19 | N | Brown/Yellow | 44 | Yellow/Brown | 331 | 21 | 3 | 3 | J | 21 | Slate/Black | 53 | Black/Slate | 163 |
| Port-7 25-48 | 20 | N | Slate/Yellow | 45 | Yellow/Slate | 332 | 21 | 4 | 4 | K | 21 | Orange/Black | 53 | Black/Orange | 164 |
| Port-7 25-48 | 21 | N | Blue/Violet | 46 | Violet/Blue | 333 | 21 | 5 | 5 | L | 21 | Brown/Red | 53 | Red/Brown | 165 |
| Port-7 25-48 | 22 | N | Orange/Violet | 47 | Violet/Orange | 334 | 21 | 6 | 6 | M | 21 | Blue/Red | 53 | Red/Blue | 166 |
| Port-7 25-48 | 23 | N | Green/Violet | 48 | Violet/Green | 335 | 21 | 7 | 7 | N | 21 | Green/White | 53 | White/Green | 167 |
| Port-7 25-48 | 24 | N | Brown/Violet | 49 | Violet/Brown | 336 | 21 | 8 | 8 | N | 21 | Brown/Violet | 53 | Violet/Brown | 168 |

Figure 4 (cont.)

| 104, 112, 120 | | | | | | 106, 114, 122 | | | | | | |
|---|---|---|---|---|---|---|---|---|---|---|---|---|
| Port-10 1-24 | 1 | O | Blue/White | 26 | White/Blue | 337 | 1 | 1 | 1 | O | 1 | Blue/White | 33 | White/Blue | 1 |
| Port-10 1-24 | 2 | O | Orange/White | 27 | White/Orange | 338 | 1 | 2 | 2 | O | 1 | Orange/Violet | 33 | Violet/Orange | 2 |
| Port-10 1-24 | 3 | O | Green/White | 28 | White/Green | 339 | 1 | 3 | 3 | P | 1 | Brown/Yellow | 33 | Yellow/Brown | 3 |
| Port-10 1-24 | 4 | O | Brown/White | 29 | White/Brown | 340 | 1 | 4 | 4 | Q | 1 | Blue/Yellow | 33 | Yellow/Blue | 4 |
| Port-10 1-24 | 5 | O | Slate/White | 30 | White/Slate | 341 | 1 | 5 | 5 | R | 1 | Green/Black | 33 | Black/Green | 5 |
| Port-10 1-24 | 6 | O | Blue/Red | 31 | Red/Blue | 342 | 1 | 6 | 6 | S | 1 | Slate/Red | 33 | Red/Slate | 6 |
| Port-10 1-24 | 7 | O | Orange/Red | 32 | Red/Orange | 343 | 1 | 7 | 7 | T | 1 | Orange/Red | 33 | Red/Orange | 7 |
| Port-10 1-24 | 8 | O | Green/Red | 33 | Red/Green | 344 | 1 | 8 | 8 | U | 1 | Brown/White | 33 | White/Brown | 8 |
| Port-10 1-24 | 9 | O | Brown/Red | 34 | Red/Brown | 345 | 2 | 1 | 1 | O | 2 | Orange/White | 33 | White/Orange | 9 |
| Port-10 1-24 | 10 | O | Slate/Red | 35 | Red/Slate | 346 | 2 | 2 | 2 | P | 2 | Green/Violet | 34 | Violet/Green | 10 |
| Port-10 1-24 | 11 | O | Blue/Black | 36 | Black/Blue | 347 | 2 | 3 | 3 | Q | 2 | Slate/Yellow | 34 | Yellow/Slate | 11 |
| Port-10 1-24 | 12 | O | Orange/Black | 37 | Black/Orange | 348 | 2 | 4 | 4 | R | 2 | Orange/Yellow | 34 | Yellow/Orange | 12 |
| Port-10 1-24 | 13 | O | Green/Black | 38 | Black/Green | 349 | 2 | 5 | 5 | S | 2 | Brown/Black | 34 | Black/Brown | 13 |
| Port-10 1-24 | 14 | O | Brown/Black | 39 | Black/Brown | 350 | 2 | 6 | 6 | T | 2 | Blue/Black | 34 | Black/Blue | 14 |
| Port-10 1-24 | 15 | O | Slate/Black | 40 | Black/Slate | 351 | 2 | 7 | 7 | U | 2 | Green/Red | 34 | Red/Green | 15 |
| Port-10 1-24 | 16 | O | Blue/Yellow | 41 | Yellow/Blue | 352 | 2 | 8 | 8 | O | 3 | Slate/White | 34 | White/Slate | 16 |
| Port-10 1-24 | 17 | O | Orange/Yellow | 42 | Yellow/Orange | 353 | 3 | 1 | 1 | O | 3 | Green/White | 35 | White/Green | 17 |
| Port-10 1-24 | 18 | O | Green/Yellow | 43 | Yellow/Green | 354 | 3 | 2 | 2 | P | 3 | Brown/Violet | 35 | Violet/Brown | 18 |
| Port-10 1-24 | 19 | O | Brown/Yellow | 44 | Yellow/Brown | 355 | 3 | 3 | 3 | Q | 3 | Blue/Violet | 35 | Violet/Blue | 19 |
| Port-10 1-24 | 20 | O | Slate/Yellow | 45 | Yellow/Slate | 356 | 3 | 4 | 4 | R | 3 | Green/Yellow | 35 | Yellow/Green | 20 |
| Port-10 1-24 | 21 | O | Blue/Violet | 46 | Violet/Blue | 357 | 3 | 5 | 5 | S | 3 | Slate/Black | 35 | Black/Slate | 21 |
| Port-10 1-24 | 22 | O | Orange/Violet | 47 | Violet/Orange | 358 | 3 | 6 | 6 | T | 3 | Orange/Black | 35 | Black/Orange | 22 |
| Port-10 1-24 | 23 | O | Green/Violet | 48 | Violet/Green | 359 | 3 | 7 | 7 | U | 3 | Brown/Red | 35 | Red/Brown | 23 |
| Port-10 1-24 | 24 | O | Brown/Violet | 49 | Violet/Brown | 360 | 3 | 8 | 8 | O | 3 | Blue/Red | 35 | Red/Blue | 24 |

Figure 4 (cont.)

| | | | | | | | | | | | | |
|---|---|---|---|---|---|---|---|---|---|---|---|---|
| Port-10 25-48 | 1 | P | Blue/White | 26 | White/Blue | 361 | 4 | 1 | 1 | O | 4 | Brown/White | 36 | White/Brown | 25 |
| Port-10 25-48 | 2 | P | Orange/White | 27 | White/Orange | 362 | 4 | 2 | 2 | P | 4 | Blue/White | 36 | White/Blue | 26 |
| Port-10 25-48 | 3 | P | Green/White | 28 | White/Green | 363 | 4 | 3 | 3 | P | 4 | Orange/Violet | 36 | Violet/Orange | 27 |
| Port-10 25-48 | 4 | P | Brown/White | 29 | White/Brown | 364 | 4 | 4 | 4 | Q | 4 | Brown/Yellow | 36 | Yellow/Brown | 28 |
| Port-10 25-48 | 5 | P | Slate/White | 30 | White/Slate | 365 | 4 | 5 | 5 | R | 4 | Blue/Yellow | 36 | Yellow/Blue | 29 |
| Port-10 25-48 | 6 | P | Blue/Red | 31 | Red/Blue | 366 | 4 | 6 | 6 | S | 4 | Green/Black | 36 | Black/Green | 30 |
| Port-10 25-48 | 7 | P | Orange/Red | 32 | Red/Orange | 367 | 4 | 7 | 7 | T | 4 | Slate/Red | 36 | Red/Slate | 31 |
| Port-10 25-48 | 8 | P | Green/Red | 33 | Red/Green | 368 | 4 | 8 | 8 | U | 4 | Orange/Red | 36 | Red/Orange | 32 |
| Port-10 25-48 | 9 | P | Brown/Red | 34 | Red/Brown | 369 | 5 | 1 | 1 | O | 5 | Slate/White | 37 | White/Slate | 33 |
| Port-10 25-48 | 10 | P | Slate/Red | 35 | Red/Slate | 370 | 5 | 2 | 2 | P | 5 | Orange/White | 37 | White/Orange | 34 |
| Port-10 25-48 | 11 | P | Blue/Black | 36 | Black/Blue | 371 | 5 | 3 | 3 | P | 5 | Green/Violet | 37 | Violet/Green | 35 |
| Port-10 25-48 | 12 | P | Orange/Black | 37 | Black/Orange | 372 | 5 | 4 | 4 | Q | 5 | Slate/Yellow | 37 | Yellow/Slate | 36 |
| Port-10 25-48 | 13 | P | Green/Black | 38 | Black/Green | 373 | 5 | 5 | 5 | R | 5 | Orange/Yellow | 37 | Yellow/Orange | 37 |
| Port-10 25-48 | 14 | P | Brown/Black | 39 | Black/Brown | 374 | 5 | 6 | 6 | S | 5 | Brown/Black | 37 | Black/Brown | 38 |
| Port-10 25-48 | 15 | P | Slate/Black | 40 | Black/Slate | 375 | 5 | 7 | 7 | T | 5 | Blue/Black | 37 | Black/Blue | 39 |
| Port-10 25-48 | 16 | P | Blue/Yellow | 41 | Yellow/Blue | 376 | 5 | 8 | 8 | U | 5 | Green/Red | 37 | Red/Green | 40 |
| Port-10 25-48 | 17 | P | Orange/Yellow | 42 | Yellow/Orange | 377 | 6 | 1 | 1 | O | 6 | Blue/Red | 38 | Red/Blue | 41 |
| Port-10 25-48 | 18 | P | Green/Yellow | 43 | Yellow/Green | 378 | 6 | 2 | 2 | P | 6 | Green/White | 38 | White/Green | 42 |
| Port-10 25-48 | 19 | P | Brown/Yellow | 44 | Yellow/Brown | 379 | 6 | 3 | 3 | P | 6 | Brown/Violet | 38 | Violet/Brown | 43 |
| Port-10 25-48 | 20 | P | Slate/Yellow | 45 | Yellow/Slate | 380 | 6 | 4 | 4 | Q | 6 | Blue/Violet | 38 | Violet/Blue | 44 |
| Port-10 25-48 | 21 | P | Blue/Violet | 46 | Violet/Blue | 381 | 6 | 5 | 5 | R | 6 | Green/Yellow | 38 | Yellow/Green | 45 |
| Port-10 25-48 | 22 | P | Orange/Violet | 47 | Violet/Orange | 382 | 6 | 6 | 6 | S | 6 | Slate/Black | 38 | Black/Slate | 46 |
| Port-10 25-48 | 23 | P | Green/Violet | 48 | Violet/Green | 383 | 6 | 7 | 7 | T | 6 | Orange/Black | 38 | Black/Orange | 47 |
| Port-10 25-48 | 24 | P | Brown/Violet | 49 | Violet/Brown | 384 | 6 | 8 | 8 | U | 6 | Brown/Red | 38 | Red/Brown | 48 |

| | | | | | | | | | | | | |
|---|---|---|---|---|---|---|---|---|---|---|---|---|
| Port-11 1-24 | 1 | Q | Blue/White | 26 | White/Blue | 385 | | | | | Orange/Red | 39 | Red/Orange | 49 |
| Port-11 1-24 | 2 | Q | Orange/White | 27 | White/Orange | 386 | | | | | Brown/White | 39 | White/Brown | 50 |
| Port-11 1-24 | 3 | Q | Green/White | 28 | White/Green | 387 | | | | | Blue/White | 39 | White/Blue | 51 |
| Port-11 1-24 | 4 | Q | Brown/White | 29 | White/Brown | 388 | | | | | Orange/Violet | 39 | Violet/Orange | 52 |
| Port-11 1-24 | 5 | Q | Slate/White | 30 | White/Slate | 389 | | | | | Brown/Yellow | 39 | Yellow/Brown | 53 |
| Port-11 1-24 | 6 | Q | Blue/Red | 31 | Red/Blue | 390 | | | | | Blue/Yellow | 39 | Yellow/Blue | 54 |
| Port-11 1-24 | 7 | Q | Orange/Red | 32 | Red/Orange | 391 | | | | | Green/Black | 39 | Black/Green | 55 |
| Port-11 1-24 | 8 | Q | Green/Red | 33 | Red/Green | 392 | | | | | Slate/Red | 39 | Red/Slate | 56 |
| Port-11 1-24 | 9 | Q | Brown/Red | 34 | Red/Brown | 393 | | | | | Green/Red | 40 | Red/Green | 57 |
| Port-11 1-24 | 10 | Q | Slate/Red | 35 | Red/Slate | 394 | | | | | Slate/White | 40 | White/Slate | 58 |
| Port-11 1-24 | 11 | Q | Blue/Black | 36 | Black/Blue | 395 | | | | | Orange/White | 40 | White/Orange | 59 |
| Port-11 1-24 | 12 | Q | Orange/Black | 37 | Black/Orange | 396 | | | | | Green/Violet | 40 | Violet/Green | 60 |
| Port-11 1-24 | 13 | Q | Green/Black | 38 | Black/Green | 397 | | | | | Slate/Yellow | 40 | Yellow/Slate | 61 |
| Port-11 1-24 | 14 | Q | Brown/Black | 39 | Black/Brown | 398 | | | | | Orange/Yellow | 40 | Yellow/Orange | 62 |
| Port-11 1-24 | 15 | Q | Slate/Black | 40 | Black/Slate | 399 | | | | | Brown/Black | 40 | Black/Brown | 63 |
| Port-11 1-24 | 16 | Q | Blue/Yellow | 41 | Yellow/Blue | 400 | | | | | Blue/Black | 40 | Black/Blue | 64 |
| Port-11 1-24 | 17 | Q | Orange/Yellow | 42 | Yellow/Orange | 401 | | | | | Brown/Red | 41 | Red/Brown | 65 |
| Port-11 1-24 | 18 | Q | Green/Yellow | 43 | Yellow/Green | 402 | | | | | Blue/Red | 41 | Red/Blue | 66 |
| Port-11 1-24 | 19 | Q | Brown/Yellow | 44 | Yellow/Brown | 403 | | | | | Green/White | 41 | White/Green | 67 |
| Port-11 1-24 | 20 | Q | Slate/Yellow | 45 | Yellow/Slate | 404 | | | | | Brown/Violet | 41 | Violet/Brown | 68 |
| Port-11 1-24 | 21 | Q | Blue/Violet | 46 | Violet/Blue | 405 | | | | | Blue/Violet | 41 | Violet/Blue | 69 |
| Port-11 1-24 | 22 | Q | Orange/Violet | 47 | Violet/Orange | 406 | | | | | Green/Yellow | 41 | Yellow/Green | 70 |
| Port-11 1-24 | 23 | Q | Green/Violet | 48 | Violet/Green | 407 | | | | | Slate/Black | 41 | Black/Slate | 71 |
| Port-11 1-24 | 24 | Q | Brown/Violet | 49 | Violet/Brown | 408 | | | | | Orange/Black | 41 | Black/Orange | 72 |

| | | | | | |
|---|---|---|---|---|---|
| Port-11 25-48 | 1 | R | Blue/White | 26 | White/Blue |
| Port-11 25-48 | 2 | R | Orange/White | 27 | White/Orange |
| Port-11 25-48 | 3 | R | Green/White | 28 | White/Green |
| Port-11 25-48 | 4 | R | Brown/White | 29 | White/Brown |
| Port-11 25-48 | 5 | R | Slate/White | 30 | White/Slate |
| Port-11 25-48 | 6 | R | Blue/Red | 31 | Red/Blue |
| Port-11 25-48 | 7 | R | Orange/Red | 32 | Red/Orange |
| Port-11 25-48 | 8 | R | Green/Red | 33 | Red/Green |
| Port-11 25-48 | 9 | R | Brown/Red | 34 | Red/Brown |
| Port-11 25-48 | 10 | R | Slate/Red | 35 | Red/Slate |
| Port-11 25-48 | 11 | R | Blue/Black | 36 | Black/Blue |
| Port-11 25-48 | 12 | R | Orange/Black | 37 | Black/Orange |
| Port-11 25-48 | 13 | R | Green/Black | 38 | Black/Green |
| Port-11 25-48 | 14 | R | Brown/Black | 39 | Black/Brown |
| Port-11 25-48 | 15 | R | Slate/Black | 40 | Black/Slate |
| Port-11 25-48 | 16 | R | Blue/Yellow | 41 | Yellow/Blue |
| Port-11 25-48 | 17 | R | Orange/Yellow | 42 | Yellow/Orange |
| Port-11 25-48 | 18 | R | Green/Yellow | 43 | Yellow/Green |
| Port-11 25-48 | 19 | R | Brown/Yellow | 44 | Yellow/Brown |
| Port-11 25-48 | 20 | R | Slate/Yellow | 45 | Yellow/Slate |
| Port-11 25-48 | 21 | R | Blue/Violet | 46 | Violet/Blue |
| Port-11 25-48 | 22 | R | Orange/Violet | 47 | Violet/Orange |
| Port-11 25-48 | 23 | R | Green/Violet | 48 | Violet/Green |
| Port-11 25-48 | 24 | R | Brown/Violet | 49 | Violet/Brown |

106, 114, 122 →

| | | | | | | |
|---|---|---|---|---|---|---|
| 10 | 1 | 1 | O | 10 | Slate/Red | 42 | Red/Slate | 73 |
| 10 | 2 | 2 | P | 10 | Orange/Red | 42 | Red/Orange | 74 |
| 10 | 3 | 3 | Q | 10 | Brown/White | 42 | White/Brown | 75 |
| 10 | 4 | 4 | R | 10 | Blue/White | 42 | White/Blue | 76 |
| 10 | 5 | 5 | R | 10 | Orange/Violet | 42 | Violet/Orange | 77 |
| 10 | 6 | 6 | S | 10 | Brown/Yellow | 42 | Yellow/Brown | 78 |
| 10 | 7 | 7 | T | 10 | Blue/Yellow | 42 | Yellow/Blue | 79 |
| 10 | 8 | 8 | U | 10 | Green/Black | 42 | Black/Green | 80 |
| 11 | 1 | 1 | O | 11 | Blue/Black | 43 | Black/Blue | 81 |
| 11 | 2 | 2 | P | 11 | Green/Red | 43 | Red/Green | 82 |
| 11 | 3 | 3 | Q | 11 | Slate/White | 43 | White/Slate | 83 |
| 11 | 4 | 4 | R | 11 | Orange/White | 43 | White/Orange | 84 |
| 11 | 5 | 5 | R | 11 | Green/Violet | 43 | Violet/Green | 85 |
| 11 | 6 | 6 | S | 11 | Slate/Yellow | 43 | Yellow/Slate | 86 |
| 11 | 7 | 7 | T | 11 | Orange/Yellow | 43 | Yellow/Orange | 87 |
| 11 | 8 | 8 | U | 11 | Brown/Black | 43 | Black/Brown | 88 |
| 12 | 1 | 1 | O | 12 | Orange/Black | 44 | Black/Orange | 89 |
| 12 | 2 | 2 | P | 12 | Brown/Red | 44 | Red/Brown | 90 |
| 12 | 3 | 3 | Q | 12 | Blue/Red | 44 | Red/Blue | 91 |
| 12 | 4 | 4 | R | 12 | Green/White | 44 | White/Green | 92 |
| 12 | 5 | 5 | R | 12 | Brown/Violet | 44 | Violet/Brown | 93 |
| 12 | 6 | 6 | S | 12 | Blue/Violet | 44 | Violet/Blue | 94 |
| 12 | 7 | 7 | T | 12 | Green/Yellow | 44 | Yellow/Green | 95 |
| 12 | 8 | 8 | U | 12 | Slate/Black | 44 | Black/Slate | 96 |

| | | | | | | | | | | | | |
|---|---|---|---|---|---|---|---|---|---|---|---|---|
| Port-12 1-24 | 1 | S | Blue/White | 26 | White/Blue | 433 | 13 | 1 | 1 | O | 13 | Green/Black | 45 | Black/Green | 97 |
| Port-12 1-24 | 2 | S | Orange/White | 27 | White/Orange | 434 | 13 | 2 | 2 | P | 13 | Slate/Red | 45 | Red/Slate | 98 |
| Port-12 1-24 | 3 | S | Green/White | 28 | White/Green | 435 | 13 | 3 | 3 | Q | 13 | Orange/Red | 45 | Red/Orange | 99 |
| Port-12 1-24 | 4 | S | Brown/White | 29 | White/Brown | 436 | 13 | 4 | 4 | R | 13 | Brown/White | 45 | White/Brown | 100 |
| Port-12 1-24 | 5 | S | Slate/White | 30 | White/Slate | 437 | 13 | 5 | 5 | S | 13 | Blue/White | 45 | White/Blue | 101 |
| Port-12 1-24 | 6 | S | Blue/Red | 31 | Red/Blue | 438 | 13 | 6 | 6 | S | 13 | Orange/Violet | 45 | Violet/Orange | 102 |
| Port-12 1-24 | 7 | S | Orange/Red | 32 | Red/Orange | 439 | 13 | 7 | 7 | T | 13 | Brown/Yellow | 45 | Yellow/Brown | 103 |
| Port-12 1-24 | 8 | S | Green/Red | 33 | Red/Green | 440 | 13 | 8 | 8 | U | 13 | Blue/Yellow | 45 | Yellow/Blue | 104 |
| Port-12 1-24 | 9 | S | Brown/Red | 34 | Red/Brown | 441 | 14 | 1 | 1 | O | 14 | Brown/Black | 46 | Black/Brown | 105 |
| Port-12 1-24 | 10 | S | Slate/Red | 35 | Red/Slate | 442 | 14 | 2 | 2 | P | 14 | Blue/Black | 46 | Black/Blue | 106 |
| Port-12 1-24 | 11 | S | Blue/Black | 36 | Black/Blue | 443 | 14 | 3 | 3 | Q | 14 | Green/Red | 46 | Red/Green | 107 |
| Port-12 1-24 | 12 | S | Orange/Black | 37 | Black/Orange | 444 | 14 | 4 | 4 | R | 14 | Slate/White | 46 | White/Slate | 108 |
| Port-12 1-24 | 13 | S | Green/Black | 38 | Black/Green | 445 | 14 | 5 | 5 | S | 14 | Orange/White | 46 | White/Orange | 109 |
| Port-12 1-24 | 14 | S | Brown/Black | 39 | Black/Brown | 446 | 14 | 6 | 6 | S | 14 | Green/Violet | 46 | Violet/Green | 110 |
| Port-12 1-24 | 15 | S | Slate/Black | 40 | Black/Slate | 447 | 14 | 7 | 7 | T | 14 | Slate/Yellow | 46 | Yellow/Slate | 111 |
| Port-12 1-24 | 16 | S | Blue/Yellow | 41 | Yellow/Blue | 448 | 14 | 8 | 8 | U | 14 | Orange/Yellow | 46 | Yellow/Orange | 112 |
| Port-12 1-24 | 17 | S | Orange/Yellow | 42 | Yellow/Orange | 449 | 15 | 1 | 1 | O | 15 | Slate/Black | 47 | Black/Slate | 113 |
| Port-12 1-24 | 18 | S | Green/Yellow | 43 | Yellow/Green | 450 | 15 | 2 | 2 | P | 15 | Orange/Black | 47 | Black/Orange | 114 |
| Port-12 1-24 | 19 | S | Brown/Yellow | 44 | Yellow/Brown | 451 | 15 | 3 | 3 | Q | 15 | Brown/Red | 47 | Red/Brown | 115 |
| Port-12 1-24 | 20 | S | Slate/Yellow | 45 | Yellow/Slate | 452 | 15 | 4 | 4 | R | 15 | Blue/Red | 47 | Red/Blue | 116 |
| Port-12 1-24 | 21 | S | Blue/Violet | 46 | Violet/Blue | 453 | 15 | 5 | 5 | S | 15 | Green/White | 47 | White/Green | 117 |
| Port-12 1-24 | 22 | S | Orange/Violet | 47 | Violet/Orange | 454 | 15 | 6 | 6 | S | 15 | Brown/Violet | 47 | Violet/Brown | 118 |
| Port-12 1-24 | 23 | S | Green/Violet | 48 | Violet/Green | 455 | 15 | 7 | 7 | T | 15 | Blue/Violet | 47 | Violet/Blue | 119 |
| Port-12 1-24 | 24 | S | Brown/Violet | 49 | Violet/Brown | 456 | 15 | 8 | 8 | U | 15 | Green/Yellow | 47 | Yellow/Green | 120 |

104, 112, 120

| | | | | |
|---|---|---|---|---|
| Port-12 25-48 | 1 | T | Blue/White | 26 |
| Port-12 25-48 | 2 | T | Orange/White | 27 |
| Port-12 25-48 | 3 | T | Green/White | 28 |
| Port-12 25-48 | 4 | T | Brown/White | 29 |
| Port-12 25-48 | 5 | T | Slate/White | 30 |
| Port-12 25-48 | 6 | T | Blue/Red | 31 |
| Port-12 25-48 | 7 | T | Orange/Red | 32 |
| Port-12 25-48 | 8 | T | Green/Red | 33 |
| Port-12 25-48 | 9 | T | Brown/Red | 34 |
| Port-12 25-48 | 10 | T | Slate/Red | 35 |
| Port-12 25-48 | 11 | T | Blue/Black | 36 |
| Port-12 25-48 | 12 | T | Orange/Black | 37 |
| Port-12 25-48 | 13 | T | Green/Black | 38 |
| Port-12 25-48 | 14 | T | Brown/Black | 39 |
| Port-12 25-48 | 15 | T | Slate/Black | 40 |
| Port-12 25-48 | 16 | T | Blue/Yellow | 41 |
| Port-12 25-48 | 17 | T | Orange/Yellow | 42 |
| Port-12 25-48 | 18 | T | Green/Yellow | 43 |
| Port-12 25-48 | 19 | T | Brown/Yellow | 44 |
| Port-12 25-48 | 20 | T | Slate/Yellow | 45 |
| Port-12 25-48 | 21 | T | Blue/Violet | 46 |
| Port-12 25-48 | 22 | T | Orange/Violet | 47 |
| Port-12 25-48 | 23 | T | Green/Violet | 48 |
| Port-12 25-48 | 24 | T | Brown/Violet | 49 |

106, 114, 122

| | | | | | | | | |
|---|---|---|---|---|---|---|---|---|
| White/Blue | 457 | 16 | 1 | 1 | O | 16 | Blue/Yellow | 48 | Yellow/Blue | 121 |
| White/Orange | 458 | 16 | 2 | 2 | P | 16 | Green/Black | 48 | Black/Green | 122 |
| White/Green | 459 | 16 | 3 | 3 | Q | 16 | Slate/Red | 48 | Red/Slate | 123 |
| White/Brown | 460 | 16 | 4 | 4 | R | 16 | Orange/Red | 48 | Red/Orange | 124 |
| White/Slate | 461 | 16 | 5 | 5 | S | 16 | Brown/White | 48 | White/Brown | 125 |
| Red/Blue | 462 | 16 | 6 | 6 | T | 16 | Blue/White | 48 | White/Blue | 126 |
| Red/Orange | 463 | 16 | 7 | 7 | T | 16 | Orange/Violet | 48 | Violet/Orange | 127 |
| Red/Green | 464 | 16 | 8 | 8 | U | 16 | Brown/Yellow | 48 | Yellow/Brown | 128 |
| Red/Brown | 465 | 17 | 1 | 1 | O | 17 | Orange/Yellow | 49 | Yellow/Orange | 129 |
| Red/Slate | 466 | 17 | 2 | 2 | P | 17 | Brown/Black | 49 | Black/Brown | 130 |
| Black/Blue | 467 | 17 | 3 | 3 | Q | 17 | Blue/Black | 49 | Black/Blue | 131 |
| Black/Orange | 468 | 17 | 4 | 4 | R | 17 | Green/Red | 49 | Red/Green | 132 |
| Black/Green | 469 | 17 | 5 | 5 | S | 17 | Slate/White | 49 | White/Slate | 133 |
| Black/Brown | 470 | 17 | 6 | 6 | T | 17 | Orange/White | 49 | White/Orange | 134 |
| Black/Slate | 471 | 17 | 7 | 7 | T | 17 | Green/Violet | 49 | Violet/Green | 135 |
| Yellow/Blue | 472 | 17 | 8 | 8 | U | 17 | Slate/Yellow | 49 | Yellow/Slate | 136 |
| Yellow/Orange | 473 | 18 | 1 | 1 | O | 18 | Green/Yellow | 50 | Yellow/Green | 137 |
| Yellow/Green | 474 | 18 | 2 | 2 | P | 18 | Slate/Black | 50 | Black/Slate | 138 |
| Yellow/Brown | 475 | 18 | 3 | 3 | Q | 18 | Orange/Black | 50 | Black/Orange | 139 |
| Yellow/Slate | 476 | 18 | 4 | 4 | R | 18 | Brown/Red | 50 | Red/Brown | 140 |
| Violet/Blue | 477 | 18 | 5 | 5 | S | 18 | Blue/Red | 50 | Red/Blue | 141 |
| Violet/Orange | 478 | 18 | 6 | 6 | T | 18 | Green/White | 50 | White/Green | 142 |
| Violet/Green | 479 | 18 | 7 | 7 | T | 18 | Brown/Violet | 50 | Violet/Brown | 143 |
| Violet/Brown | 480 | 18 | 8 | 8 | U | 18 | Blue/Violet | 50 | Violet/Blue | 144 |

| Port-13 1-24 | 1 | U | Blue/White | 26 | White/Blue | 481 | 19 | 1 | 1 | O | 19 | Brown/Yellow | 51 | Yellow/Brown | 145 |
|---|---|---|---|---|---|---|---|---|---|---|---|---|---|---|---|
| Port-13 1-24 | 2 | U | Orange/White | 27 | White/Orange | 482 | 19 | 2 | 2 | P | 19 | Blue/Yellow | 51 | Yellow/Blue | 146 |
| Port-13 1-24 | 3 | U | Green/White | 28 | White/Green | 483 | 19 | 3 | 3 | Q | 19 | Green/Black | 51 | Black/Green | 147 |
| Port-13 1-24 | 4 | U | Brown/White | 29 | White/Brown | 484 | 19 | 4 | 4 | R | 19 | Slate/Red | 51 | Red/Slate | 148 |
| Port-13 1-24 | 5 | U | Slate/White | 30 | White/Slate | 485 | 19 | 5 | 5 | S | 19 | Orange/Red | 51 | Red/Orange | 149 |
| Port-13 1-24 | 6 | U | Blue/Red | 31 | Red/Blue | 486 | 19 | 6 | 6 | T | 19 | Brown/White | 51 | White/Brown | 150 |
| Port-13 1-24 | 7 | U | Orange/Red | 32 | Red/Orange | 487 | 19 | 7 | 7 | U | 19 | Blue/White | 51 | White/Blue | 151 |
| Port-13 1-24 | 8 | U | Green/Red | 33 | Red/Green | 488 | 19 | 8 | 8 | U | 19 | Orange/Violet | 51 | Violet/Orange | 152 |
| Port-13 1-24 | 9 | U | Brown/Red | 34 | Red/Brown | 489 | 20 | 1 | 1 | O | 20 | Slate/Yellow | 52 | Yellow/Slate | 153 |
| Port-13 1-24 | 10 | U | Slate/Red | 35 | Red/Slate | 490 | 20 | 2 | 2 | P | 20 | Orange/Yellow | 52 | Yellow/Orange | 154 |
| Port-13 1-24 | 11 | U | Blue/Black | 36 | Black/Blue | 491 | 20 | 3 | 3 | Q | 20 | Brown/Black | 52 | Black/Brown | 155 |
| Port-13 1-24 | 12 | U | Orange/Black | 37 | Black/Orange | 492 | 20 | 4 | 4 | R | 20 | Blue/Black | 52 | Black/Blue | 156 |
| Port-13 1-24 | 13 | U | Green/Black | 38 | Black/Green | 493 | 20 | 5 | 5 | S | 20 | Green/Red | 52 | Red/Green | 157 |
| Port-13 1-24 | 14 | U | Brown/Black | 39 | Black/Brown | 494 | 20 | 6 | 6 | T | 20 | Slate/White | 52 | White/Slate | 158 |
| Port-13 1-24 | 15 | U | Slate/Black | 40 | Black/Slate | 495 | 20 | 7 | 7 | U | 20 | Orange/White | 52 | White/Orange | 159 |
| Port-13 1-24 | 16 | U | Blue/Yellow | 41 | Yellow/Blue | 496 | 20 | 8 | 8 | U | 20 | Green/Violet | 52 | Violet/Green | 160 |
| Port-13 1-24 | 17 | U | Orange/Yellow | 42 | Yellow/Orange | 497 | 21 | 1 | 1 | O | 21 | Blue/Violet | 53 | Violet/Blue | 161 |
| Port-13 1-24 | 18 | U | Green/Yellow | 43 | Yellow/Green | 498 | 21 | 2 | 2 | P | 21 | Green/Yellow | 53 | Yellow/Green | 162 |
| Port-13 1-24 | 19 | U | Brown/Yellow | 44 | Yellow/Brown | 499 | 21 | 3 | 3 | Q | 21 | Slate/Black | 53 | Black/Slate | 163 |
| Port-13 1-24 | 20 | U | Slate/Yellow | 45 | Yellow/Slate | 500 | 21 | 4 | 4 | R | 21 | Orange/Black | 53 | Black/Orange | 164 |
| Port-13 1-24 | 21 | U | Blue/Violet | 46 | Violet/Blue | 501 | 21 | 5 | 5 | S | 21 | Brown/Red | 53 | Red/Brown | 165 |
| Port-13 1-24 | 22 | U | Orange/Violet | 47 | Violet/Orange | 502 | 21 | 6 | 6 | T | 21 | Blue/Red | 53 | Red/Blue | 166 |
| Port-13 1-24 | 23 | U | Green/Violet | 48 | Violet/Green | 503 | 21 | 7 | 7 | U | 21 | Green/White | 53 | White/Green | 167 |
| Port-13 1-24 | 24 | U | Brown/Violet | 49 | Violet/Brown | 504 | 21 | 8 | 8 | U | 21 | Brown/Violet | 53 | Violet/Brown | 168 |

| | | | | 106, 114, 122 | | | | | |
|---|---|---|---|---|---|---|---|---|---|
| Port-13 25-48 | 1 | V | Blue/White | 26 | White/Blue | 1 | 1 | V | Blue/White | 33 | White/Blue | 1 |
| Port-13 25-48 | 2 | V | Orange/White | 27 | White/Orange | 1 | 2 | V | Orange/Violet | 33 | Violet/Orange | 2 |
| Port-13 25-48 | 3 | V | Green/White | 28 | White/Green | 1 | 3 | W | Brown/Yellow | 33 | Yellow/Brown | 3 |
| Port-13 25-48 | 4 | V | Brown/White | 29 | White/Brown | 1 | 4 | X | Blue/Yellow | 33 | Yellow/Blue | 4 |
| Port-13 25-48 | 5 | V | Slate/White | 30 | White/Slate | 1 | 5 | Y | Green/Black | 33 | Black/Green | 5 |
| Port-13 25-48 | 6 | V | Blue/Red | 31 | Red/Blue | 1 | 6 | Z | Slate/Red | 33 | Red/Slate | 6 |
| Port-13 25-48 | 7 | V | Orange/Red | 32 | Red/Orange | 1 | 7 | AA | Orange/Red | 33 | Red/Orange | 7 |
| Port-13 25-48 | 8 | V | Green/Red | 33 | Red/Green | 1 | 8 | BB | Brown/White | 33 | White/Brown | 8 |
| Port-13 25-48 | 9 | V | Brown/Red | 34 | Red/Brown | 2 | 1 | V | Orange/White | 34 | White/Orange | 9 |
| Port-13 25-48 | 10 | V | Slate/Red | 35 | Red/Slate | 2 | 2 | W | Green/Violet | 34 | Violet/Green | 10 |
| Port-13 25-48 | 11 | V | Blue/Black | 36 | Black/Blue | 2 | 3 | W | Slate/Yellow | 34 | Yellow/Slate | 11 |
| Port-13 25-48 | 12 | V | Orange/Black | 37 | Black/Orange | 2 | 4 | X | Orange/Yellow | 34 | Yellow/Orange | 12 |
| Port-13 25-48 | 13 | V | Green/Black | 38 | Black/Green | 2 | 5 | Y | Brown/Black | 34 | Black/Brown | 13 |
| Port-13 25-48 | 14 | V | Brown/Black | 39 | Black/Brown | 2 | 6 | Z | Blue/Black | 34 | Black/Blue | 14 |
| Port-13 25-48 | 15 | V | Slate/Black | 40 | Black/Slate | 2 | 7 | AA | Green/Red | 34 | Red/Green | 15 |
| Port-13 25-48 | 16 | V | Blue/Yellow | 41 | Yellow/Blue | 2 | 8 | BB | Slate/White | 34 | White/Slate | 16 |
| Port-13 25-48 | 17 | V | Orange/Yellow | 42 | Yellow/Orange | 3 | 1 | V | Green/White | 35 | White/Green | 17 |
| Port-13 25-48 | 18 | V | Green/Yellow | 43 | Yellow/Green | 3 | 2 | V | Brown/Violet | 35 | Violet/Brown | 18 |
| Port-13 25-48 | 19 | V | Brown/Yellow | 44 | Yellow/Brown | 3 | 3 | W | Blue/Violet | 35 | Violet/Blue | 19 |
| Port-13 25-48 | 20 | V | Slate/Yellow | 45 | Yellow/Slate | 3 | 4 | X | Green/Yellow | 35 | Yellow/Green | 20 |
| Port-13 25-48 | 21 | V | Blue/Violet | 46 | Violet/Blue | 3 | 5 | Y | Slate/Black | 35 | Black/Slate | 21 |
| Port-13 25-48 | 22 | V | Orange/Violet | 47 | Violet/Orange | 3 | 6 | Z | Orange/Black | 35 | Black/Orange | 22 |
| Port-13 25-48 | 23 | V | Green/Violet | 48 | Violet/Green | 3 | 7 | AA | Brown/Red | 35 | Red/Brown | 23 |
| Port-13 25-48 | 24 | V | Brown/Violet | 49 | Violet/Brown | 3 | 8 | BB | Blue/Red | 35 | Red/Blue | 24 |

Figure 4 (cont.)

| | | | | | | | | | | | | | | |
|---|---|---|---|---|---|---|---|---|---|---|---|---|---|---|
| Port-14 1-24 | 1 | W | Blue/White | 26 | White/Blue | 529 | 4 | 1 | 1 | V | 4 | Brown/White | 36 | White/Brown | 25 |
| Port-14 1-24 | 2 | W | Orange/White | 27 | White/Orange | 530 | 4 | 2 | 2 | W | 4 | Blue/White | 36 | White/Blue | 26 |
| Port-14 1-24 | 3 | W | Green/White | 28 | White/Green | 531 | 4 | 3 | 3 | W | 4 | Orange/Violet | 36 | Violet/Orange | 27 |
| Port-14 1-24 | 4 | W | Brown/White | 29 | White/Brown | 532 | 4 | 4 | 4 | X | 4 | Brown/Yellow | 36 | Yellow/Brown | 28 |
| Port-14 1-24 | 5 | W | Slate/White | 30 | White/Slate | 533 | 4 | 5 | 5 | Y | 4 | Blue/Yellow | 36 | Yellow/Blue | 29 |
| Port-14 1-24 | 6 | W | Blue/Red | 31 | Red/Blue | 534 | 4 | 6 | 6 | Z | 4 | Green/Black | 36 | Black/Green | 30 |
| Port-14 1-24 | 7 | W | Orange/Red | 32 | Red/Orange | 535 | 4 | 7 | 7 | AA | 4 | Slate/Red | 36 | Red/Slate | 31 |
| Port-14 1-24 | 8 | W | Green/Red | 33 | Red/Green | 536 | 4 | 8 | 8 | BB | 4 | Orange/Red | 36 | Red/Orange | 32 |
| Port-14 1-24 | 9 | W | Brown/Red | 34 | Red/Brown | 537 | 5 | 1 | 1 | V | 5 | Slate/White | 37 | White/Slate | 33 |
| Port-14 1-24 | 10 | W | Slate/Red | 35 | Red/Slate | 538 | 5 | 2 | 2 | W | 5 | Orange/White | 37 | White/Orange | 34 |
| Port-14 1-24 | 11 | W | Blue/Black | 36 | Black/Blue | 539 | 5 | 3 | 3 | W | 5 | Green/Violet | 37 | Violet/Green | 35 |
| Port-14 1-24 | 12 | W | Orange/Black | 37 | Black/Orange | 540 | 5 | 4 | 4 | X | 5 | Slate/Yellow | 37 | Yellow/Slate | 36 |
| Port-14 1-24 | 13 | W | Green/Black | 38 | Black/Green | 541 | 5 | 5 | 5 | Y | 5 | Orange/Yellow | 37 | Yellow/Orange | 37 |
| Port-14 1-24 | 14 | W | Brown/Black | 39 | Black/Brown | 542 | 5 | 6 | 6 | Z | 5 | Brown/Black | 37 | Black/Brown | 38 |
| Port-14 1-24 | 15 | W | Slate/Black | 40 | Black/Slate | 543 | 5 | 7 | 7 | AA | 5 | Blue/Black | 37 | Black/Blue | 39 |
| Port-14 1-24 | 16 | W | Blue/Yellow | 41 | Yellow/Blue | 544 | 5 | 8 | 8 | BB | 5 | Green/Red | 37 | Red/Green | 40 |
| Port-14 1-24 | 17 | W | Orange/Yellow | 42 | Yellow/Orange | 545 | 6 | 1 | 1 | V | 6 | Blue/Red | 38 | Red/Blue | 41 |
| Port-14 1-24 | 18 | W | Green/Yellow | 43 | Yellow/Green | 546 | 6 | 2 | 2 | W | 6 | Green/White | 38 | White/Green | 42 |
| Port-14 1-24 | 19 | W | Brown/Yellow | 44 | Yellow/Brown | 547 | 6 | 3 | 3 | W | 6 | Brown/Violet | 38 | Violet/Brown | 43 |
| Port-14 1-24 | 20 | W | Slate/Yellow | 45 | Yellow/Slate | 548 | 6 | 4 | 4 | X | 6 | Blue/Violet | 38 | Violet/Blue | 44 |
| Port-14 1-24 | 21 | W | Blue/Violet | 46 | Violet/Blue | 549 | 6 | 5 | 5 | Y | 6 | Green/Yellow | 38 | Yellow/Green | 45 |
| Port-14 1-24 | 22 | W | Orange/Violet | 47 | Violet/Orange | 550 | 6 | 6 | 6 | Z | 6 | Slate/Black | 38 | Black/Slate | 46 |
| Port-14 1-24 | 23 | W | Green/Violet | 48 | Violet/Green | 551 | 6 | 7 | 7 | AA | 6 | Orange/Black | 38 | Black/Orange | 47 |
| Port-14 1-24 | 24 | W | Brown/Violet | 49 | Violet/Brown | 552 | 6 | 8 | 8 | BB | 6 | Brown/Red | 38 | Red/Brown | 48 |

| | | | 104, 112, 120 | | | | | | | 106, 114, 122 | | |
|---|---|---|---|---|---|---|---|---|---|---|---|---|
| Port-14 25-48 | 1 | X | Blue/White | 26 | 553 | 7 | 1 | 1 | V | 7 | Orange/Red | 39 | Red/Orange | 49 |
| Port-14 25-48 | 2 | X | Orange/White | 27 | 554 | 7 | 2 | 2 | W | 7 | Brown/White | 39 | White/Brown | 50 |
| Port-14 25-48 | 3 | X | Green/White | 28 | 555 | 7 | 3 | 3 | X | 7 | Blue/White | 39 | White/Blue | 51 |
| Port-14 25-48 | 4 | X | Brown/White | 29 | 556 | 7 | 4 | 4 | X | 7 | Orange/Violet | 39 | Violet/Orange | 52 |
| Port-14 25-48 | 5 | X | Slate/White | 30 | 557 | 7 | 5 | 5 | Y | 7 | Brown/Yellow | 39 | Yellow/Brown | 53 |
| Port-14 25-48 | 6 | X | Blue/Red | 31 | 558 | 7 | 6 | 6 | Z | 7 | Blue/Yellow | 39 | Yellow/Blue | 54 |
| Port-14 25-48 | 7 | X | Orange/Red | 32 | 559 | 7 | 7 | 7 | AA | 7 | Green/Black | 39 | Black/Green | 55 |
| Port-14 25-48 | 8 | X | Green/Red | 33 | 560 | 7 | 8 | 8 | BB | 7 | Slate/Red | 39 | Red/Slate | 56 |
| Port-14 25-48 | 9 | X | Brown/Red | 34 | 561 | 8 | 1 | 1 | V | 8 | Green/Red | 40 | Red/Green | 57 |
| Port-14 25-48 | 10 | X | Slate/Red | 35 | 562 | 8 | 2 | 2 | W | 8 | Slate/White | 40 | White/Slate | 58 |
| Port-14 25-48 | 11 | X | Blue/Black | 36 | 563 | 8 | 3 | 3 | X | 8 | Orange/White | 40 | White/Orange | 59 |
| Port-14 25-48 | 12 | X | Orange/Black | 37 | 564 | 8 | 4 | 4 | X | 8 | Green/Violet | 40 | Violet/Green | 60 |
| Port-14 25-48 | 13 | X | Green/Black | 38 | 565 | 8 | 5 | 5 | Y | 8 | Slate/Yellow | 40 | Yellow/Slate | 61 |
| Port-14 25-48 | 14 | X | Brown/Black | 39 | 566 | 8 | 6 | 6 | Z | 8 | Orange/Yellow | 40 | Yellow/Orange | 62 |
| Port-14 25-48 | 15 | X | Slate/Black | 40 | 567 | 8 | 7 | 7 | AA | 8 | Brown/Black | 40 | Black/Brown | 63 |
| Port-14 25-48 | 16 | X | Blue/Yellow | 41 | 568 | 8 | 8 | 8 | BB | 8 | Blue/Black | 40 | Black/Blue | 64 |
| Port-14 25-48 | 17 | X | Orange/Yellow | 42 | 569 | 9 | 1 | 1 | V | 9 | Brown/Red | 41 | Red/Brown | 65 |
| Port-14 25-48 | 18 | X | Green/Yellow | 43 | 570 | 9 | 2 | 2 | W | 9 | Blue/Red | 41 | Red/Blue | 66 |
| Port-14 25-48 | 19 | X | Brown/Yellow | 44 | 571 | 9 | 3 | 3 | X | 9 | Green/White | 41 | White/Green | 67 |
| Port-14 25-48 | 20 | X | Slate/Yellow | 45 | 572 | 9 | 4 | 4 | X | 9 | Brown/Violet | 41 | Violet/Brown | 68 |
| Port-14 25-48 | 21 | X | Blue/Violet | 46 | 573 | 9 | 5 | 5 | Y | 9 | Blue/Violet | 41 | Violet/Blue | 69 |
| Port-14 25-48 | 22 | X | Orange/Violet | 47 | 574 | 9 | 6 | 6 | Z | 9 | Green/Yellow | 41 | Yellow/Green | 70 |
| Port-14 25-48 | 23 | X | Green/Violet | 48 | 575 | 9 | 7 | 7 | AA | 9 | Slate/Black | 41 | Black/Slate | 71 |
| Port-14 25-48 | 24 | X | Brown/Violet | 49 | 576 | 9 | 8 | 8 | BB | 9 | Orange/Black | 41 | Black/Orange | 72 |

Figure 4 (cont.)

104, 112, 120 | | | | | | 106, 114, 122 | | | | | | | |
---|---|---|---|---|---|---|---|---|---|---|---|---|---
Port-15 1-24 | 1 | Y | Blue/White | 26 | White/Blue | 10 | 1 | 1 | V | 10 | Slate/Red | 42 | Red/Slate | 73
Port-15 1-24 | 2 | Y | Orange/White | 27 | White/Orange | 10 | 2 | 2 | W | 10 | Orange/Red | 42 | Red/Orange | 74
Port-15 1-24 | 3 | Y | Green/White | 28 | White/Green | 10 | 3 | 3 | X | 10 | Brown/White | 42 | White/Brown | 75
Port-15 1-24 | 4 | Y | Brown/White | 29 | White/Brown | 10 | 4 | 4 | Y | 10 | Blue/White | 42 | White/Blue | 76
Port-15 1-24 | 5 | Y | Slate/White | 30 | White/Slate | 10 | 5 | 5 | Y | 10 | Orange/Violet | 42 | Violet/Orange | 77
Port-15 1-24 | 6 | Y | Blue/Red | 31 | Red/Blue | 10 | 6 | 6 | Z | 10 | Brown/Yellow | 42 | Yellow/Brown | 78
Port-15 1-24 | 7 | Y | Orange/Red | 32 | Red/Orange | 10 | 7 | 7 | AA | 10 | Blue/Yellow | 42 | Yellow/Blue | 79
Port-15 1-24 | 8 | Y | Green/Red | 33 | Red/Green | 10 | 8 | 8 | BB | 10 | Green/Black | 42 | Black/Green | 80
Port-15 1-24 | 9 | Y | Brown/Red | 34 | Red/Brown | 11 | 1 | 1 | V | 11 | Blue/Black | 43 | Black/Blue | 81
Port-15 1-24 | 10 | Y | Slate/Red | 35 | Red/Slate | 11 | 2 | 2 | W | 11 | Green/Red | 43 | Red/Green | 82
Port-15 1-24 | 11 | Y | Blue/Black | 36 | Black/Blue | 11 | 3 | 3 | X | 11 | Slate/White | 43 | White/Slate | 83
Port-15 1-24 | 12 | Y | Orange/Black | 37 | Black/Orange | 11 | 4 | 4 | Y | 11 | Orange/White | 43 | White/Orange | 84
Port-15 1-24 | 13 | Y | Green/Black | 38 | Black/Green | 11 | 5 | 5 | Y | 11 | Green/Violet | 43 | Violet/Green | 85
Port-15 1-24 | 14 | Y | Brown/Black | 39 | Black/Brown | 11 | 6 | 6 | Z | 11 | Slate/Yellow | 43 | Yellow/Slate | 86
Port-15 1-24 | 15 | Y | Slate/Black | 40 | Black/Slate | 11 | 7 | 7 | AA | 11 | Orange/Yellow | 43 | Yellow/Orange | 87
Port-15 1-24 | 16 | Y | Blue/Yellow | 41 | Yellow/Blue | 11 | 8 | 8 | BB | 11 | Brown/Black | 43 | Black/Brown | 88
Port-15 1-24 | 17 | Y | Orange/Yellow | 42 | Yellow/Orange | 12 | 1 | 1 | V | 12 | Orange/Black | 44 | Black/Orange | 89
Port-15 1-24 | 18 | Y | Green/Yellow | 43 | Yellow/Green | 12 | 2 | 2 | W | 12 | Brown/Red | 44 | Red/Brown | 90
Port-15 1-24 | 19 | Y | Brown/Yellow | 44 | Yellow/Brown | 12 | 3 | 3 | X | 12 | Blue/Red | 44 | Red/Blue | 91
Port-15 1-24 | 20 | Y | Slate/Yellow | 45 | Yellow/Slate | 12 | 4 | 4 | Y | 12 | Green/White | 44 | White/Green | 92
Port-15 1-24 | 21 | Y | Blue/Violet | 46 | Violet/Blue | 12 | 5 | 5 | Y | 12 | Brown/Violet | 44 | Violet/Brown | 93
Port-15 1-24 | 22 | Y | Orange/Violet | 47 | Violet/Orange | 12 | 6 | 6 | Z | 12 | Blue/Violet | 44 | Violet/Blue | 94
Port-15 1-24 | 23 | Y | Green/Violet | 48 | Violet/Green | 12 | 7 | 7 | AA | 12 | Green/Yellow | 44 | Yellow/Green | 95
Port-15 1-24 | 24 | Y | Brown/Violet | 49 | Violet/Brown | 12 | 8 | 8 | BB | 12 | Slate/Black | 44 | Black/Slate | 96

| | | | | |
|---|---|---|---|---|
| Port-15 25-48 | 1 | N | Blue/White | 26 | White/Blue |
| Port-15 25-48 | 2 | N | Orange/White | 27 | White/Orange |
| Port-15 25-48 | 3 | N | Green/White | 28 | White/Green |
| Port-15 25-48 | 4 | N | Brown/White | 29 | White/Brown |
| Port-15 25-48 | 5 | N | Slate/White | 30 | White/Slate |
| Port-15 25-48 | 6 | N | Blue/Red | 31 | Red/Blue |
| Port-15 25-48 | 7 | N | Orange/Red | 32 | Red/Orange |
| Port-15 25-48 | 8 | N | Green/Red | 33 | Red/Green |
| Port-15 25-48 | 9 | N | Brown/Red | 34 | Red/Brown |
| Port-15 25-48 | 10 | N | Slate/Red | 35 | Red/Slate |
| Port-15 25-48 | 11 | N | Blue/Black | 36 | Black/Blue |
| Port-15 25-48 | 12 | N | Orange/Black | 37 | Black/Orange |
| Port-15 25-48 | 13 | N | Green/Black | 38 | Black/Green |
| Port-15 25-48 | 14 | N | Brown/Black | 39 | Black/Brown |
| Port-15 25-48 | 15 | N | Slate/Black | 40 | Black/Slate |
| Port-15 25-48 | 16 | N | Blue/Yellow | 41 | Yellow/Blue |
| Port-15 25-48 | 17 | N | Orange/Yellow | 42 | Yellow/Orange |
| Port-15 25-48 | 18 | N | Green/Yellow | 43 | Yellow/Green |
| Port-15 25-48 | 19 | N | Brown/Yellow | 44 | Yellow/Brown |
| Port-15 25-48 | 20 | N | Slate/Yellow | 45 | Yellow/Slate |
| Port-15 25-48 | 21 | N | Blue/Violet | 46 | Violet/Blue |
| Port-15 25-48 | 22 | N | Orange/Violet | 47 | Violet/Orange |
| Port-15 25-48 | 23 | N | Green/Violet | 48 | Violet/Green |
| Port-15 25-48 | 24 | N | Brown/Violet | 49 | Violet/Brown |

106, 114, 122

| | | | | | | | |
|---|---|---|---|---|---|---|---|
| 13 | 1 | 1 | V | Green/Black | 45 | Black/Green | 97 |
| 13 | 2 | 2 | W | Slate/Red | 45 | Red/Slate | 98 |
| 13 | 3 | 3 | X | Orange/Red | 45 | Red/Orange | 99 |
| 13 | 4 | 4 | Y | Brown/White | 45 | White/Brown | 100 |
| 13 | 5 | 5 | Z | Blue/White | 45 | White/Blue | 101 |
| 13 | 6 | 6 | Z | Orange/Violet | 45 | Violet/Orange | 102 |
| 13 | 7 | 7 | AA | Brown/Yellow | 45 | Yellow/Brown | 103 |
| 13 | 8 | 8 | BB | Blue/Yellow | 45 | Yellow/Blue | 104 |
| 14 | 1 | 1 | V | Brown/Black | 46 | Black/Brown | 105 |
| 14 | 2 | 2 | W | Blue/Black | 46 | Black/Blue | 106 |
| 14 | 3 | 3 | X | Green/Red | 46 | Red/Green | 107 |
| 14 | 4 | 4 | Y | Slate/White | 46 | White/Slate | 108 |
| 14 | 5 | 5 | Z | Orange/White | 46 | White/Orange | 109 |
| 14 | 6 | 6 | Z | Green/Violet | 46 | Violet/Green | 110 |
| 14 | 7 | 7 | AA | Slate/Yellow | 46 | Yellow/Slate | 111 |
| 14 | 8 | 8 | BB | Orange/Yellow | 46 | Yellow/Orange | 112 |
| 15 | 1 | 1 | V | Slate/Black | 47 | Black/Slate | 113 |
| 15 | 2 | 2 | W | Orange/Black | 47 | Black/Orange | 114 |
| 15 | 3 | 3 | X | Brown/Red | 47 | Red/Brown | 115 |
| 15 | 4 | 4 | Y | Blue/Red | 47 | Red/Blue | 116 |
| 15 | 5 | 5 | Z | Green/White | 47 | White/Green | 117 |
| 15 | 6 | 6 | Z | Brown/Violet | 47 | Violet/Brown | 118 |
| 15 | 7 | 7 | AA | Blue/Violet | 47 | Violet/Blue | 119 |
| 15 | 8 | 8 | BB | Green/Yellow | 47 | Yellow/Green | 120 |

Figure 4 (cont.)

| | | | | | | | | | | | |
|---|---|---|---|---|---|---|---|---|---|---|---|
| Port-16 1-24 | 1 | AA | Blue/White | 26 | White/Blue | 625 | 16 | 1 | 1 | V | 16 | Blue/Yellow | 48 | Yellow/Blue | 121 |
| Port-16 1-24 | 2 | AA | Orange/White | 27 | White/Orange | 626 | 16 | 2 | 2 | W | 16 | Green/Black | 48 | Black/Green | 122 |
| Port-16 1-24 | 3 | AA | Green/White | 28 | White/Green | 627 | 16 | 3 | 3 | X | 16 | Slate/Red | 48 | Red/Slate | 123 |
| Port-16 1-24 | 4 | AA | Brown/White | 29 | White/Brown | 628 | 16 | 4 | 4 | Y | 16 | Orange/Red | 48 | Red/Orange | 124 |
| Port-16 1-24 | 5 | AA | Slate/White | 30 | White/Slate | 629 | 16 | 5 | 5 | Z | 16 | Brown/White | 48 | White/Brown | 125 |
| Port-16 1-24 | 6 | AA | Blue/Red | 31 | Red/Blue | 630 | 16 | 6 | 6 | AA | 16 | Blue/White | 48 | White/Blue | 126 |
| Port-16 1-24 | 7 | AA | Orange/Red | 32 | Red/Orange | 631 | 16 | 7 | 7 | AA | 16 | Orange/Violet | 48 | Violet/Orange | 127 |
| Port-16 1-24 | 8 | AA | Green/Red | 33 | Red/Green | 632 | 16 | 8 | 8 | BB | 16 | Brown/Yellow | 48 | Yellow/Brown | 128 |
| Port-16 1-24 | 9 | AA | Brown/Red | 34 | Red/Brown | 633 | 17 | 1 | 1 | V | 17 | Orange/Yellow | 49 | Yellow/Orange | 129 |
| Port-16 1-24 | 10 | AA | Slate/Red | 35 | Red/Slate | 634 | 17 | 2 | 2 | W | 17 | Brown/Black | 49 | Black/Brown | 130 |
| Port-16 1-24 | 11 | AA | Blue/Black | 36 | Black/Blue | 635 | 17 | 3 | 3 | X | 17 | Blue/Black | 49 | Black/Blue | 131 |
| Port-16 1-24 | 12 | AA | Orange/Black | 37 | Black/Orange | 636 | 17 | 4 | 4 | Y | 17 | Green/Red | 49 | Red/Green | 132 |
| Port-16 1-24 | 13 | AA | Green/Black | 38 | Black/Green | 637 | 17 | 5 | 5 | Z | 17 | Slate/White | 49 | White/Slate | 133 |
| Port-16 1-24 | 14 | AA | Brown/Black | 39 | Black/Brown | 638 | 17 | 6 | 6 | AA | 17 | Orange/White | 49 | White/Orange | 134 |
| Port-16 1-24 | 15 | AA | Slate/Black | 40 | Black/Slate | 639 | 17 | 7 | 7 | AA | 17 | Green/Violet | 49 | Violet/Green | 135 |
| Port-16 1-24 | 16 | AA | Blue/Yellow | 41 | Yellow/Blue | 640 | 17 | 8 | 8 | BB | 17 | Slate/Yellow | 49 | Yellow/Slate | 136 |
| Port-16 1-24 | 17 | AA | Orange/Yellow | 42 | Yellow/Orange | 641 | 18 | 1 | 1 | V | 18 | Green/Yellow | 50 | Yellow/Green | 137 |
| Port-16 1-24 | 18 | AA | Green/Yellow | 43 | Yellow/Green | 642 | 18 | 2 | 2 | W | 18 | Slate/Black | 50 | Black/Slate | 138 |
| Port-16 1-24 | 19 | AA | Brown/Yellow | 44 | Yellow/Brown | 643 | 18 | 3 | 3 | X | 18 | Orange/Black | 50 | Black/Orange | 139 |
| Port-16 1-24 | 20 | AA | Slate/Yellow | 45 | Yellow/Slate | 644 | 18 | 4 | 4 | Y | 18 | Brown/Red | 50 | Red/Brown | 140 |
| Port-16 1-24 | 21 | AA | Blue/Violet | 46 | Violet/Blue | 645 | 18 | 5 | 5 | Z | 18 | Blue/Red | 50 | Red/Blue | 141 |
| Port-16 1-24 | 22 | AA | Orange/Violet | 47 | Violet/Orange | 646 | 18 | 6 | 6 | AA | 18 | Green/White | 50 | White/Green | 142 |
| Port-16 1-24 | 23 | AA | Green/Violet | 48 | Violet/Green | 647 | 18 | 7 | 7 | AA | 18 | Brown/Violet | 50 | Violet/Brown | 143 |
| Port-16 1-24 | 24 | AA | Brown/Violet | 49 | Violet/Brown | 648 | 18 | 8 | 8 | BB | 18 | Blue/Violet | 50 | Violet/Blue | 144 |

| | | | | | | | | | | | | |
|---|---|---|---|---|---|---|---|---|---|---|---|---|
| Port-16 25-48 | 1 | BB | Blue/White | 26 | White/Blue | 649 | 19 | 1 | 1 | V | Brown/Yellow | 51 | Yellow/Brown | 145 |
| Port-16 25-48 | 2 | BB | Orange/White | 27 | White/Orange | 650 | 19 | 2 | 2 | W | Blue/Yellow | 51 | Yellow/Blue | 146 |
| Port-16 25-48 | 3 | BB | Green/White | 28 | White/Green | 651 | 19 | 3 | 3 | X | Green/Black | 51 | Black/Green | 147 |
| Port-16 25-48 | 4 | BB | Brown/White | 29 | White/Brown | 652 | 19 | 4 | 4 | Y | Slate/Red | 51 | Red/Slate | 148 |
| Port-16 25-48 | 5 | BB | Slate/White | 30 | White/Slate | 653 | 19 | 5 | 5 | Z | Orange/Red | 51 | Red/Orange | 149 |
| Port-16 25-48 | 6 | BB | Blue/Red | 31 | Red/Blue | 654 | 19 | 6 | 6 | AA | Brown/White | 51 | White/Brown | 150 |
| Port-16 25-48 | 7 | BB | Orange/Red | 32 | Red/Orange | 655 | 19 | 7 | 7 | BB | Blue/White | 51 | White/Blue | 151 |
| Port-16 25-48 | 8 | BB | Green/Red | 33 | Red/Green | 656 | 19 | 8 | 8 | BB | Orange/Violet | 51 | Violet/Orange | 152 |
| Port-16 25-48 | 9 | BB | Brown/Red | 34 | Red/Brown | 657 | 20 | 1 | 1 | V | Slate/Yellow | 52 | Yellow/Slate | 153 |
| Port-16 25-48 | 10 | BB | Slate/Red | 35 | Red/Slate | 658 | 20 | 2 | 2 | W | Orange/Yellow | 52 | Yellow/Orange | 154 |
| Port-16 25-48 | 11 | BB | Blue/Black | 36 | Black/Blue | 659 | 20 | 3 | 3 | X | Brown/Black | 52 | Black/Brown | 155 |
| Port-16 25-48 | 12 | BB | Orange/Black | 37 | Black/Orange | 660 | 20 | 4 | 4 | Y | Blue/Black | 52 | Black/Blue | 156 |
| Port-16 25-48 | 13 | BB | Green/Black | 38 | Black/Green | 661 | 20 | 5 | 5 | Z | Green/Red | 52 | Red/Green | 157 |
| Port-16 25-48 | 14 | BB | Brown/Black | 39 | Black/Brown | 662 | 20 | 6 | 6 | AA | Slate/White | 52 | White/Slate | 158 |
| Port-16 25-48 | 15 | BB | Slate/Black | 40 | Black/Slate | 663 | 20 | 7 | 7 | BB | Orange/White | 52 | White/Orange | 159 |
| Port-16 25-48 | 16 | BB | Blue/Yellow | 41 | Yellow/Blue | 664 | 20 | 8 | 8 | BB | Green/Violet | 52 | Violet/Green | 160 |
| Port-16 25-48 | 17 | BB | Orange/Yellow | 42 | Yellow/Orange | 665 | 21 | 1 | 1 | V | Blue/Violet | 53 | Violet/Blue | 161 |
| Port-16 25-48 | 18 | BB | Green/Yellow | 43 | Yellow/Green | 666 | 21 | 2 | 2 | W | Green/Yellow | 53 | Yellow/Green | 162 |
| Port-16 25-48 | 19 | BB | Brown/Yellow | 44 | Yellow/Brown | 667 | 21 | 3 | 3 | X | Slate/Black | 53 | Black/Slate | 163 |
| Port-16 25-48 | 20 | BB | Slate/Yellow | 45 | Yellow/Slate | 668 | 21 | 4 | 4 | Y | Orange/Black | 53 | Black/Orange | 164 |
| Port-16 25-48 | 21 | BB | Blue/Violet | 46 | Violet/Blue | 669 | 21 | 5 | 5 | Z | Brown/Red | 53 | Red/Brown | 165 |
| Port-16 25-48 | 22 | BB | Orange/Violet | 47 | Violet/Orange | 670 | 21 | 6 | 6 | AA | Blue/Red | 53 | Red/Blue | 166 |
| Port-16 25-48 | 23 | BB | Green/Violet | 48 | Violet/Green | 671 | 21 | 7 | 7 | BB | Green/White | 53 | White/Green | 167 |
| Port-16 25-48 | 24 | BB | Brown/Violet | 49 | Violet/Brown | 672 | 21 | 8 | 8 | BB | Brown/Violet | 53 | Violet/Brown | 168 |

Figure 4 (cont.)

INTEGRATED DSLAM TO POTS SPLITTER CONNECTOR

FIELD OF THE INVENTION

The field of the invention is directed to a connector for interconnecting a digital subscriber line access multiplexer ("DSLAM") to a POTS splitter having a 64-pin or 50-pin female connector.

BACKGROUND OF THE INVENTION

Digital subscriber lines ("DSL") provide high speed internet connections to subscribers. Typically, a phone company provides a DSL modem to a residential/commercial customer that is connected it their computer. The DSL modem, also known as a DSL transceiver, is then connected to the phone company's central office through a pair of twisted wires of the plain old telephone system ("POTS"), which is sometimes called the "last mile" or "local loop." In addition, the phone lines for these residential/commercial customers may also be carried on the same pair of twisted wires. The voice and data signals are carried together on the twisted pair of wires to the central office ("CO") of the telephone company.

The CO then uses a POTS splitter shelves to separate the voice and data signals. These POTS splitter shelves typically use low-pass and high-pass filters to separate and direct the voice signals and the DSL signals onto different lines. POTS splitter shelves may also be located at the customer's location. The voice signals are then routed through the POTS and the data signals.

The data signals from the many customers are aggregated with a digital subscriber line access multiplexer ("DSLAM") that connects the multiple customer's DSL to a high-speed backbone line using multiplexing techniques. The DSLAM creates a network similar to a LAN, but not subject to Ethernet distance limits, thus providing an Internet connection for the subscribers.

Many different companies manufacture the DSLAM, POTS splitter shelf, or both. Oftentimes, through unintended or otherwise design, these products may be manufactured with some ports that are not enabled, thus requiring large users of these devices, such as large telephone companies to purchase additional units to meet the number of ports required by their customer demand. Also, some manufacturers may not want to always enable the ports on their competitor's high margin product, so that they can sell the high margin product themselves with ports enabled to communicate with their low margin products, such as the POTS splitters. Thus, interchangeability between these types of product may not exist, although a lower cost structure would be achieved if they were interchangeable. Further, if a large telephone company desired to lower its equipment costs by purchasing one of these devices from one manufacturer and another device from another manufacturer, it oftentimes may not do so.

SUMMARY

In one embodiment, the present Integrated DSLAM to POTS Splitter Connector ("DSLAM connector") interconnects a 50-pin male DSLAM amphenol connector to a 64-pin female POTS splitter amphenol connector. In another embodiment, the present DSLAM connector interconnects a 50-pin male DSLAM amphenol connector to a 50-pin female POTS splitter amphenol connector. The benefit is to get a much lower price point per port. The present DSLAM connector may also be embodied as a comprehensive connector kit that will reduce the cost of providing ADSL/ADSL2+/VDSL2 to customers. In these embodiments, multiple vendors' products may be connected together to provide lower cost per port expenses. Diversification is another benefit. Diversification by product pricing and the second is alternate supplier to the limitations in supply in the market place.

The present DSLAM connector provides a unique internal color coded wiring pin-out and internal termination of these cables and the application of connecting DSLAs and POTS splitter shelves. The present DSLAM connector has a unique internal wiring make-up or "wiring pin-outs."

BRIEF DESCRIPTION OF THE DRAWINGS

FIG. 3 illustrates a pin definition table for a DSLAM connector for an exemplary DSLAM to POTS splitter connection according to an embodiment of the present invention; and FIG. 4 illustrates a pin definition table for a DSLAM connector for an exemplary DSLAM to POTS splitter connection according to another embodiment of the present invention.

DETAILED DESCRIPTION OF THE DRAWINGS

Figure 1:
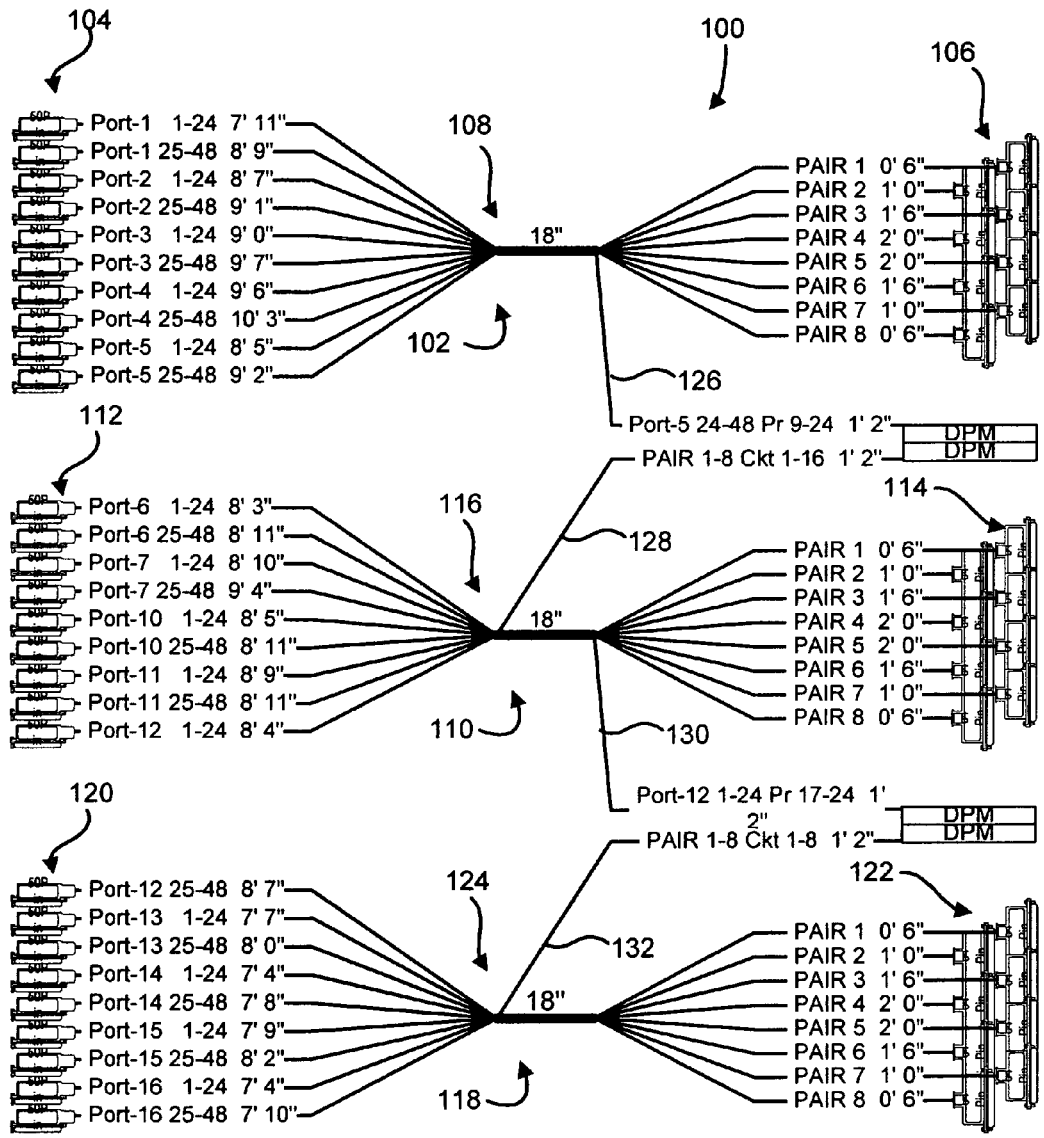
FIG. 1 illustrates an exemplary wiring schematic for a DSLAM connector according to an embodiment of the present invention.

In the drawings, like or similar elements are designated with identical reference numerals throughout the several views and figures thereof, and various depicted elements may not be drawn necessarily to scale. FIG. 1 illustrates an embodiment 100 of the present DSLAM connector that includes three sets of cables 102, 110, and 118. Cable 102 is comprised of ten DSLAM connectors 104 that are connected to 8 POTS splitter shelf connectors 106 by a set of wires 108. Cable 110 is comprised of nine DSLAM connectors 112 that are connected to 8 POTS splitter shelf connectors 114 by a set of wires 116. Cable 118 is comprised of nine DSLAM connectors 120 that are connected to 8 POTS splitter shelf connectors 122 by a set of wires 124. Additionally, a wire 126 is connected to wire 128, and wire 130 is connected to 132 at a DPM further in accordance with the pin definition of FIGS. 3 and 4. In one aspect, the DPM is a 4005-DPM cable splice connector manufactured by 3M Telecom.

In one embodiment, the DSLAM connectors 104, 112, and 120 of the present DSLAM connector DSLAM connector 100 are preferably comprised of 50-pin connector, such as a 50-pin male amphenol reverse hood connector. The DSLAM connectors 104, 112, and 120 have 50 pin locations for attaching 50 wires to provide 25 pairs of wires. In one embodiment, the POTS splitter shelf connectors 106, 114, and 122 of the present DSLAM connector 100 are preferably 64-pin female amphenol connectors. The wires 108, 116, and 124 are wired to each of the DSLAM connectors 104, 112, and 120 and POTS splitter shelf connectors 106, 114, and 122 according to the pin definition tables in FIGS. 3 and 4.

Figure 2:
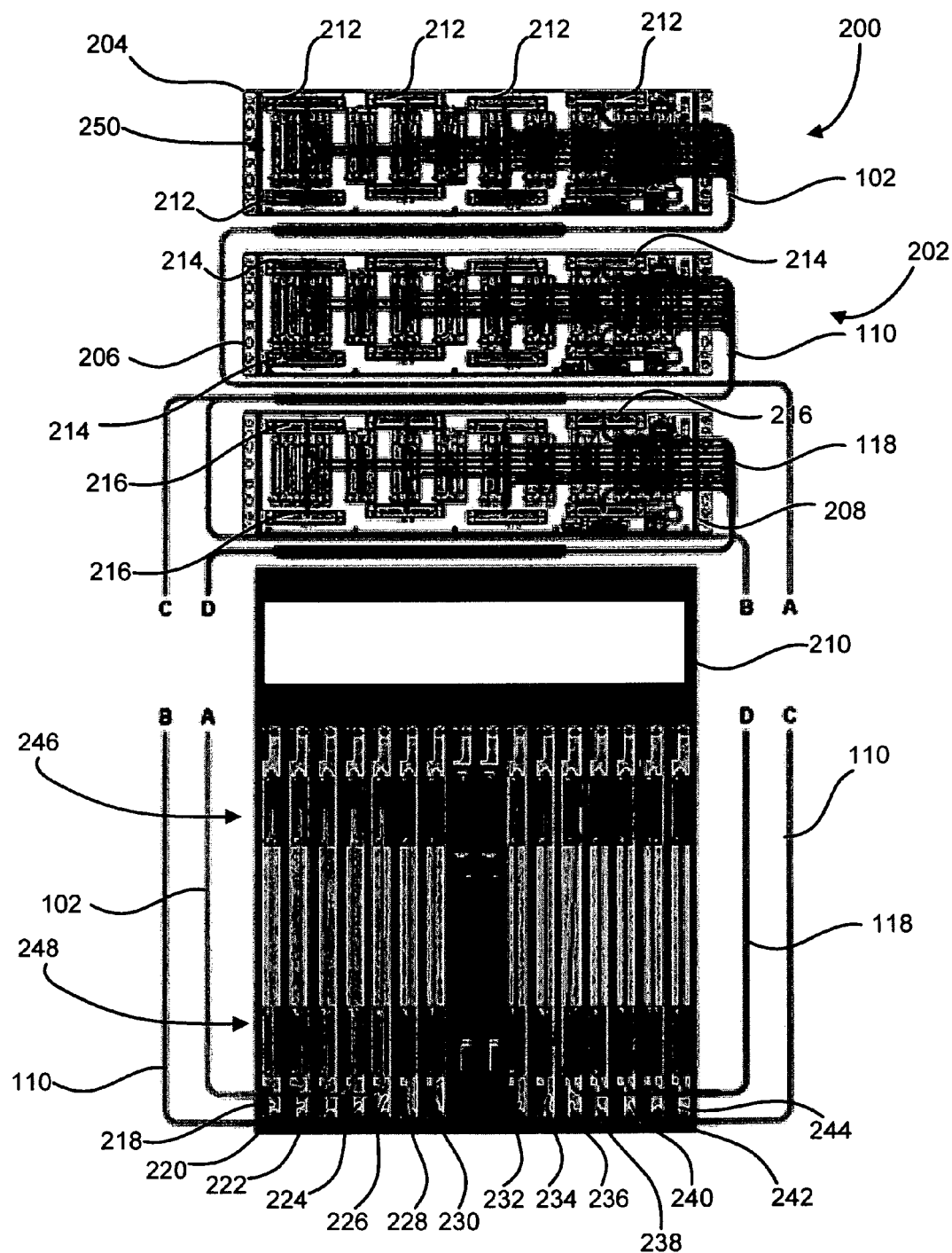
FIG. 2 illustrates an exemplary wiring diagram of a DSLAM to POTS splitter connection of FIG. 1 according to the embodiment of the present invention.

FIG. 2 illustrates an embodiment 200 of an exemplary wiring diagram of a DSLAM 210 to a set 202 of three POTS splitter shelves 204, 206, and 208. In this embodiment, three POTS splitter shelves 204, 206, and 208 are wired to one DSLAM 210; however, other numbers of POTS splitter shelves 204, 206, and 208 and DSLAM 210 may be used as well. POTS splitter shelf 204 includes 8 ports 212 shown located around the periphery of the back of the POTS splitter shelf 204. Each port 212 contains 22 slots for a combined 176 circuits. Each one of the eight ports 212 of the POTS splitter shelf 204 includes a 50-pin female connector for connecting with one of the eight POTS splitter shelf connectors 106 of cable 102. POTS splitter shelf 206 also includes 8 ports 214 shown located around the periphery of the back of the POTS splitter shelf 206. Each port 214 contains 22 slots for a combined 176 circuits. Each one of the eight ports 214 of the POTS splitter shelf 206 includes a 50-pin female connector for connecting with one of the eight POTS splitter shelf connectors 114 of cable 110. POTS splitter shelf 208 includes 8 ports 216 shown located around the periphery of the back of the POTS splitter shelf 208. Each port 216 contains 22 slots for a combined 176 circuits. Each one of the eight ports 216 of the POTS splitter shelf 208 includes a 50-pin female connector for connecting with one of the eight POTS splitter shelf connectors 122 of cable 118.

The cables 102, 110, and 118 are shown terminated in FIG. 2 prior to connecting to the remainder of the cables 102, 110, and 118. These terminations are noted as A, B, C, and D and ends A-A are connected together, ends B-B are connected together, ends G-C are connected together, and ends D-D are connected together. Cables 102, 110, and 118 are preferably continuous cables and are shown terminated for illustration purposes.

One end of cable 102 terminates in the POTS splitter shelf 204 as described above and the other end terminates in DSLAM 210 as follows. In this embodiment, DSLAM 210 preferably includes 14 line interface modules ("LIMs") shown as 218-242. Each LIM 218-242 includes a port 246 that includes wires 1-24 and a port 248 that includes wires 25-48. Referring to FIG. 1, DSLAM connector 104 (Port-1 1-24 7'11") is connected to LIM 218 port 246 and DSLAM connector 104 (Port-1 25-48 8'9") is connected to LIM 218 port 248; DSLAM connector 104 (Port-2 1-24 8'7") is connected to LIM 220 port 246 and DSLAM connector 104 (Port-2 25-48 9'1") is connected to LIM 220 port 248; DSLAM connector 104 (Port-3 1-24 9'0") is connected to LIM 222 port 246 and DSLAM connector 104 (Port-3 25-48 9'7") is connected to LIM 222 port 248; DSLAM connector 104 (Port-4 1-24 9'6") is connected to LIM 224 port 246 and DSLAM connector 104 (Port-4 25-48 10'3") is connected to LIM 224 port 248; and DSLAM connector 104 (Port-5 1-24 8'5") is connected to LIM 226 port 246 and DSLAM connector 104 (Port-5 25-48 9'2") is connected to LIM 226 port 248.

For the connection to the POTS splitter shelf 206, the following applies. DSLAM connector 104 (Port-6 1-24 8'3") is connected to LIM 228 port 246 and DSLAM connector 104 (Port-6 25-48 8'11") is connected to LIM 228 port 248; DSLAM connector 104 (Port-7 1-24 8'10") is connected to LIM 230 port 246 and DSLAM connector 104 (Port-7 25-48 9'4") is connected to LIM 230 port 248; DSLAM connector 104 (Port-10 1-24 8'5") is connected to LIM 232 port 246 and DSLAM connector 104 (Port-10 25-48 8'11") is connected to LIM 232 port 248; DSLAM connector 104 (Port-11 1-24 8'9") is connected to LIM 234 port 246 and DSLAM connector 104 (Port-11 25-48 8'11") is connected to LM 234 port 248; and DSLAM connector 104 (Port-12 1-24 8'4") is connected to LIM 236 port 246.

For the connection to the POTS splitter shelf 208, the following applies. DSLAM connector 104 (Port-12 25-48 8'7") is connected to LIM 236 port 248; DSLAM connector 104 (Port-13 1-24 7'7") is connected to LIM 238 port 246 and DSLAM connector 104 (Port-13 25-48 8'0") is connected to LIM 238 port 248; DSLAM connector 104 (Port-14 1-24 7'4") is connected to LIM 240 port 246 and DSLAM connector 104 (Port-14 25-48 7'8") is connected to LIM 240 port 248; DSLAM connector 104 (Port-15 1-24 7'9") is connected to LIM 242 port 246 and DSLAM connector 104 (Port-15 25-48 8'2") is connected to LIM 242 port 248; and DSLAM connector 104 (Port-16 1-24 7'4") is connected to LIM 244 port 246 and DSLAM connector 104 (Port-15 25-48 7'10") is connected to LIM 244 port 248.

The DSLAM 210 preferably supports data signals, including those associated with VPNs, intranets, extranets, and fast internet access. Also, DSLAM 210 preferably supports voice signals, such as voice over broadband, and voice-over DSL. DSLAM 210 also preferably supports video signals, including streaming multimedia, broadcast TV, and video-on-demand. An exemplary DSLAM 210 are those marketed as Stingers® by Lucent Technologies®.

Typically POTS splitter shelves 204, 206, and 208 split frequency spectrum from a channel perspective, usually by using magnetics. The magnetics are empty splitter cards that change the amplitude modulation scheme of the frequencies themselves between 0-4K for voice. The POTS splitter shelves 204, 206, and 208 preferably have asynchronous digital subscriber line ("ASDL") capability and are compatible with POTS. In addition to the eight ports 212, the POTS splitter shelves 204, 206, and 208 may further include twenty 50-pin connectors 250 for another connection embodiment. An exemplary POTS splitter shelves 204, 206, and 208 are those marketed as total Access 3050/3060 by Adtran®.

FIG. 3 illustrates an embodiment of a pin definition table showing the termination of each individual wire in cables 102, 110, and 118 of the present DSLAM connector 100. The left side of FIG. 3 defines the pin connections for the DSLAM connectors 104, 112, and 120 of the present DSLAM connector 100. The column tided, "Connector," contains identifier for the port of a particular wire. The column titled, "Pins," contains the pin number into which a particular wire is terminated. The second column titled, "Pins," contains the pin number of the corresponding wire for each circuit as noted in the column titled, "Circuit." In this embodiment, the DSLAM connectors 104, 112, and 120 are 50-pin connectors.

In FIG. 3, likewise wiring pairs in the second and third columns match up with the corresponding wiring pairs in the eleventh and twelfth columns. For example, the second column of the first row under the headings reflects "Pins 1" and the third column of the first row under the headings reflects a "Cable A." This wiring pair corresponds to the eleventh column of the first row under the headings that reflects "Pins 1" and the twelfth column of the first row under the heading that reflects a "Cable A." For another example, the second column of the second row under the headings reflects "Pins 2" and the third column of the second row under the headings reflects a "Cable A." This wiring pair corresponds to the eleventh column of the ninth row under the headings that reflects "Pins 2" and the twelfth column of the ninth row under the headings that reflects "Cable A." In this way, the wiring pairs of the second and fourth and the fifth and sixth columns match up with the wiring pairs of the twelfth and thirteenth and the fourteenth and fifteenth columns. The same applies to the wiring pairs in FIG. 4 below.

Referring to the right side of FIG. 3, pin connections for the POTS splitter shelf connectors 106, 114, and 122 of the present DSLAM connector 100 are identified. The first column titled, "Slot Number," contains the slot number associated with each wire. The second and third columns titled, "Port" and "Connector," contains the specific port and connector information for each associated wire. The fifth column titled, "Pins," contains the pin number of the corresponding wire for each circuit as noted in the column titled, "Circuit." In this embodiment, the POTS splitter shelf connectors 106, 114, and 122 are 64-pin connectors.

FIG. 4 illustrates another embodiment of a pin definition table showing the termination of each individual wire in cables 102, 110, and 118 of the present DSLAM connector DSLAM connector 100. The left side of FIG. 4 defines the pin connections for the DSLAM connectors 104, 112, and 120 of the present DSLAM connector 100. The column titled, "Connector," contains identifier for the port of a particular wire. The column titled, "Pins," contains the pin number into which a particular wire is terminated. The second column titled, "Pins," contains the pin number of the corresponding wire for each circuit as noted in the column titled, "Circuit." In this embodiment, the DSLAM connectors 104, 112, and 120 are 50-pin connectors.

Referring to the right side of FIG. 4, pin connections for the POTS splitter shelf connectors 106, 114, and 122 of the present DSLAM connector 100 are identified. The first column titled, "Slot Number," contains the slot number associated with each wire. The second and third columns titled, "Port" and "Connector," contains the specific port and connector information for each associated wire. The fifth column titled, "Pins," contains the pin number of the corresponding wire for each circuit as noted in the column titled, "Circuit." In this embodiment, the POTS splitter shelf connectors 106, 114, and 122 are 50-pin connectors.

There has been described a novel DSL connector. It should be understood that the particular embodiments described within this specification are for purposes of example and should not be construed to limit the invention. Further, it is evident that those skilled in the art may now make numerous uses and modifications of the specific embodiment described, without departing from the inventive concepts. For example, the number of POTS splitter shelves and DSLAMs may vary to further decrease the price per port of a particular application.

What is claimed is:

1. An integrated DSLAM to POTS splitter connector comprising:
   a first set of wires each having a first end terminating in a first 50-pin amphenol connector for connecting to said DSLAM, said wires each having a second end terminating in a 64-pin amphenol connector for connecting to a first POTS splitter, wherein one of said wires terminates in a first DPM;
   a second set of wires each having a first end terminating in a second 50-pin amphenol connector for connecting to said DSLAM, said wires each having a second end terminating in a 64-pin amphenol connector for connecting to a second POTS splitter, wherein one of said wires terminates in said first DPM and another one of said wires terminates in a second DPM; and
   a third set of wires each having a first end terminating in a third 50-pin amphenol connector for connecting to said DSLAM, said wires each having a second end terminating in a 64-pin amphenol connector for connecting to a third POTS splitter, wherein one of said wires terminates in said second DPM.

2. The integrated DSLAM to POTS splitter connector of claim 1 wherein said DSLAM comprises:
   a plurality of line interface modules.

3. The integrated DSLAM to POTS splitter connector of claim 2 wherein each of said plurality of line interface modules comprises:
   a first port and a second port.

4. The integrated DSLAM to POTS splitter connector of claim 2 wherein a portion of said second set of wires are further split into a first portion and a second portion of said second set of wires, at least one of said first portion and said second portion connecting to the same line interface module.

5. The integrated DSLAM to POTS splitter connector of claim 3, wherein at least one of said first portion and said second portion of said second set of wires connect to a different line interface module.

6. An integrated DSLAM to POTS splitter connector comprising:
   a first set of wires each having a first end terminating in a first 50-pin amphenol connector for connecting to said DSLAM, said wires each having a second end terminating in a 50-pin amphenol connector for connecting to a first POTS splitter, wherein one of said wires terminates in a first DPM;
   a second set of wires each having a first end terminating in a second 50-pin amphenol connector for connecting to said DSLAM, said wires each having a second end terminating in a 50-pin amphenol connector for connecting to a second POTS splitter, wherein one of said wires terminates in said first DPM and another one of said wires terminates in a second DPM; and
   a third set of wires each having a first end terminating in a third 50-pin amphenol connector for connecting to said DSLAM, said wires each having a second end terminating in a 50-pin amphenol connector for connecting to a third POTS splitter, wherein one of said wires terminates in said second DPM.

7. The integrated DSLAM to POTS splitter connector of claim 6 wherein said DSLAM comprises:
   a plurality of line interface modules.

8. The integrated DSLAM to POTS splitter connector of claim 7 wherein each of said plurality of line interface modules comprises:
   a first port and a second port.

9. The integrated DSLAM to POTS splitter connector of claim 7 wherein a portion of said second set of wires are further split into a first portion and a second portion of said second set of wires, at least one of said first portion and said second portion connecting to the same line interface module.

10. The integrated DSLAM to POTS splitter connector of claim 8, wherein at least one of said first portion and said second portion of said second set of wires connect to a different line interface module.

* * * * *